US012672169B2

(12) United States Patent
Ajami et al.

(10) Patent No.: US 12,672,169 B2
(45) Date of Patent: Jun. 30, 2026

(54) RESOURCE ALLOCATION TECHNIQUES TO SUPPORT MULTIPLE PEER-TO-PEER (P2P) SESSIONS

(71) Applicant: QUALCOMM Incorporated, San Diego, CA (US)

(72) Inventors: Abdel Karim Ajami, Lakeside, CA (US); Abhishek Pramod Patil, San Diego, CA (US); Alfred Asterjadhi, San Diego, CA (US); Gaurang Naik, San Diego, CA (US); George Cherian, San Diego, CA (US); Sai Yiu Duncan Ho, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 18/174,591

(22) Filed: Feb. 24, 2023

(65) Prior Publication Data

US 2024/0292456 A1      Aug. 29, 2024

(51) Int. Cl.
H04W 24/10          (2009.01)
H04W 74/0816        (2024.01)

(52) U.S. Cl.
CPC ....... H04W 74/0816 (2013.01); H04W 24/10 (2013.01)

(58) Field of Classification Search
CPC . H04W 74/0816; H04W 24/10; H04W 76/14; H04W 84/12
See application file for complete search history.

(56) References Cited

U.S. PATENT DOCUMENTS

2022/0053560 A1*  2/2022  Xin ................... H04W 74/0816
2022/0078844 A1*  3/2022  Cherian ............... H04W 74/08

OTHER PUBLICATIONS

Partial International Search Report—PCT/US2023/085918—ISA/ EPO—Apr. 30, 2024.
Yang J., et al., "TXOP Sharing for Use in MU P2P", IEEE, Internet, Mar. 23, 2021, pp. 1-7, XP093014976, the whole document.
International Search Report and Written Opinion—PCT/US2023/ 085918—ISA/EPO—Jun. 21, 2024.

* cited by examiner

*Primary Examiner* — Chuong A Ngo
(74) *Attorney, Agent, or Firm* — Holland & Hart LLP/Qualcomm

(57)          ABSTRACT

This disclosure provides methods, components, devices and systems for transmission opportunity (TXOP) sharing and resource allocation mechanisms in systems involving multiple peer-to-peer (P2P) sessions. Some aspects more specifically relate to how such mechanisms can facilitate multi-station (STA) TXOP sharing or STA offloading in accordance with relative resource availabilities across a set of access points (APs), or any combination thereof. In some implementations, an AP can allocate respective portions of a resource unit (RU) allocation (during a shared TXOP of the AP) to respective P2P sessions at multiple respective STAs. Additionally, or alternatively, an AP can use transmit power control to facilitate simultaneous TXOP sharing across multiple STAs. Additionally, or alternatively, first AP can offload a STA to a second AP in accordance with relative resource availabilities at the first AP and the second AP. As such, devices may achieve greater scalability for high-density P2P session deployments.

30 Claims, 16 Drawing Sheets

1000

```
                                          ┌ 1002
┌─────────────────────────────────────────┐
│ Receive a first request, from a first    │
│ wireless STA, for communication          │
│ resources associated with a first P2P    │
│ session and a second request, from a     │
│ second wireless STA, for communication   │
│ resources associated with a second P2P   │
│ session                                   │
└─────────────────────────────────────────┘
                    │
                    ▼                     ┌ 1004
┌─────────────────────────────────────────┐
│ Transmit, in accordance with the first   │
│ request and the second request, a first  │
│ frame allocating a first duration of a   │
│ TXOP of the wireless AP to the first     │
│ wireless STA and a second frame          │
│ allocating a second duration of the TXOP │
│ of the wireless AP to the second wireless│
│ STA, the first duration and the second   │
│ duration at least partially overlapping  │
└─────────────────────────────────────────┘
```

1000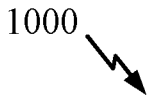

1002

Receive a first request, from a first wireless STA, for communication resources associated with a first P2P session and a second request, from a second wireless STA, for communication resources associated with a second P2P session

1004

Transmit, in accordance with the first request and the second request, a first frame allocating a first duration of a TXOP of the wireless AP to the first wireless STA and a second frame allocating a second duration of the TXOP of the wireless AP to the second wireless STA, the first duration and the second duration at least partially overlapping

*Figure 10*

1100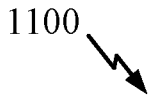
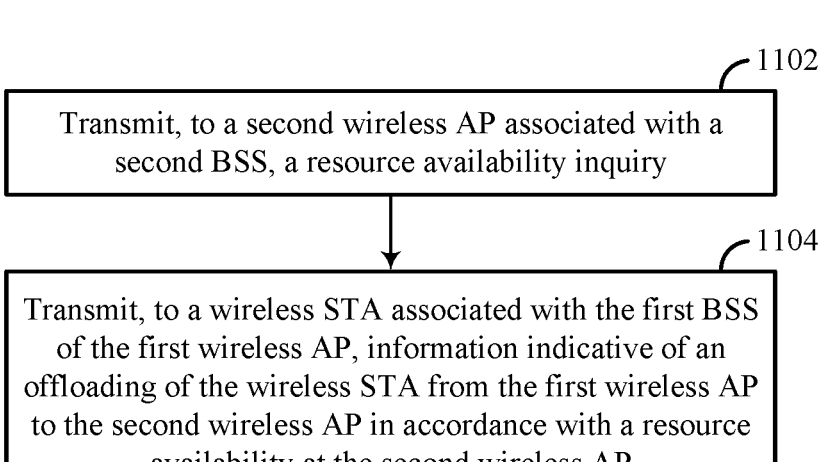
1102
Transmit, to a second wireless AP associated with a second BSS, a resource availability inquiry
1104
Transmit, to a wireless STA associated with the first BSS of the first wireless AP, information indicative of an offloading of the wireless STA from the first wireless AP to the second wireless AP in accordance with a resource availability at the second wireless AP
*Figure 11*

1200
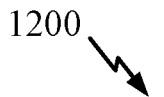
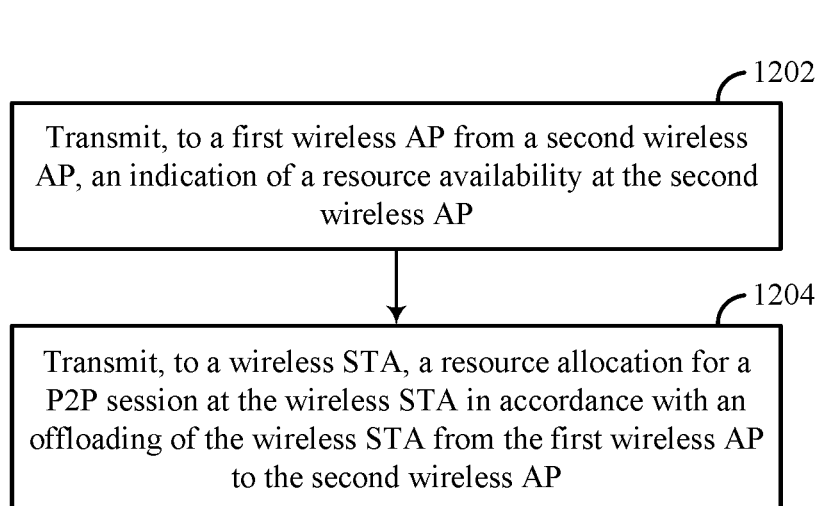
1202
Transmit, to a first wireless AP from a second wireless AP, an indication of a resource availability at the second wireless AP
1204
Transmit, to a wireless STA, a resource allocation for a P2P session at the wireless STA in accordance with an offloading of the wireless STA from the first wireless AP to the second wireless AP
*Figure 12*

1300

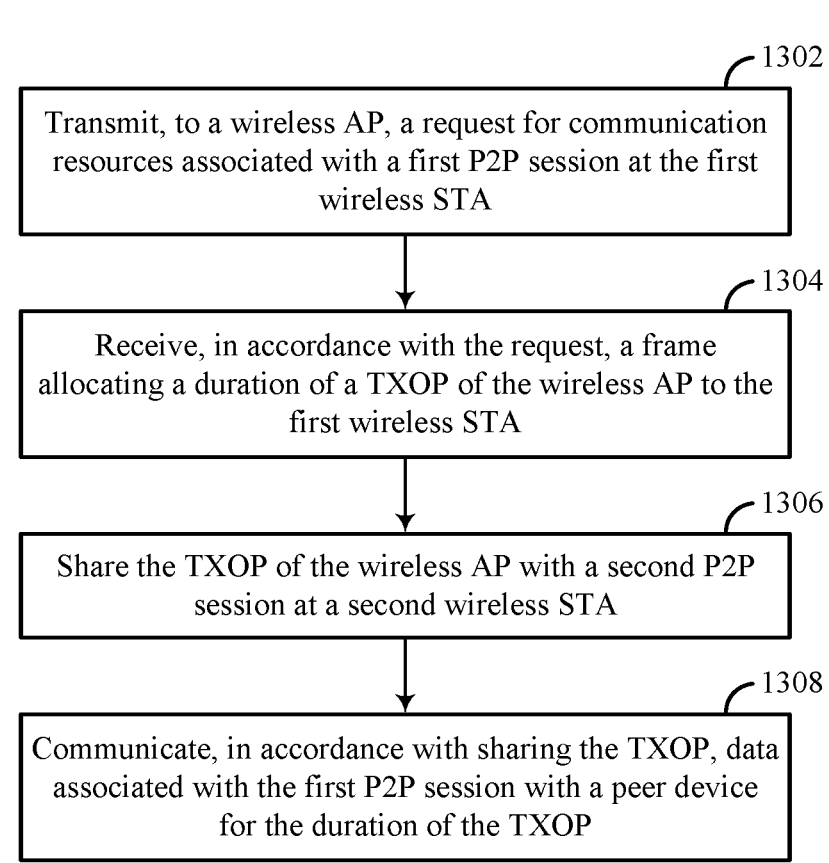

1302

Transmit, to a wireless AP, a request for communication resources associated with a first P2P session at the first wireless STA

1304

Receive, in accordance with the request, a frame allocating a duration of a TXOP of the wireless AP to the first wireless STA

1306

Share the TXOP of the wireless AP with a second P2P session at a second wireless STA

1308

Communicate, in accordance with sharing the TXOP, data associated with the first P2P session with a peer device for the duration of the TXOP

*Figure 13*

1400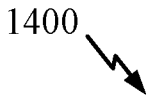

1402

Receive, from a first wireless AP associated with a first BSS, information indicative of an offloading of the wireless STA from the first wireless AP to a second wireless AP in accordance with a resource availability at the second wireless AP, the second wireless AP being associated with a second BSS

1404

Receive, from the second wireless AP, a resource allocation for a P2P session at the wireless STA in accordance with the offloading of the wireless STA from the first wireless AP to the second wireless AP

*Figure 14*

RESOURCE ALLOCATION TECHNIQUES TO SUPPORT MULTIPLE PEER-TO-PEER (P2P) SESSIONS

TECHNICAL FIELD

This disclosure relates generally to wireless communication, and more specifically, to resource allocation techniques to support multiple peer-to-peer (P2P) sessions.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first wireless station (STA). The first wireless STA includes at least one memory and at least one processor communicatively coupled with the at least one memory. The at least one processor may be operable to cause the first wireless STA to transmit, to a wireless access point (AP), a request for communication resources associated with a first peer-to-peer (P2P) session at the first wireless STA, receive, in accordance with the request, a frame allocating a duration of a transmission opportunity (TXOP) of the wireless AP to the first wireless STA, share the TXOP of the wireless AP with a second P2P session at a second wireless STA, and communicating, in accordance with share the TXOP, data associated with the first P2P session with a peer device for the duration of the TXOP.

Another innovative aspect of the subject matter described in this disclosure can be implemented in a method for wireless communication performable at a first wireless STA. The method may include transmitting, to a wireless AP, a request for communication resources associated with a first P2P session at the first wireless STA, receiving, in accordance with the request, a frame allocating a duration of a TXOP of the wireless AP to the first wireless STA, sharing the TXOP of the wireless AP with a second P2P session at a second wireless STA, and communicating, in accordance with sharing the TXOP, data associated with the first P2P session with a peer device for the duration of the TXOP.

Another innovative aspect of the subject matter described in this disclosure can be implemented in a first wireless STA. The first wireless STA may include means for transmitting, to a wireless AP, a request for communication resources associated with a first P2P session at the first wireless STA, means for receiving, in accordance with the request, a frame allocating a duration of a TXOP of the wireless AP to the first wireless STA, means for sharing the TXOP of the wireless AP with a second P2P session at a second wireless STA, and means for communicating, in accordance with sharing the TXOP, data associated with the first P2P session with a peer device for the duration of the TXOP.

Another innovative aspect of the subject matter described in this disclosure can be implemented in a non-transitory computer-readable medium storing code for wireless communication performable at a first wireless STA. The code may include instructions executable by a processor to transmit, to a wireless AP, a request for communication resources associated with a first P2P session at the first wireless STA, receive, in accordance with the request, a frame allocating a duration of a TXOP of the wireless AP to the first wireless STA, share the TXOP of the wireless AP with a second P2P session at a second wireless STA, and communicating, in accordance with share the TXOP, data associated with the first P2P session with a peer device for the duration of the TXOP.

Some examples of the method, first wireless STAs, and non-transitory computer-readable medium described herein may further include operations, features, means, or instructions for receiving, via the frame, an indication of a resource unit allocation associated with the TXOP of the wireless AP and transmitting, to the wireless AP via a portion of the resource unit allocation, a clear-to-send (CTS) frame associated with the frame, where sharing the TXOP of the wireless AP may be associated with transmitting the CTS frame via the portion of the resource unit allocation.

Some examples of the method, first wireless STAs, and non-transitory computer-readable medium described herein may further include operations, features, means, or instructions for transmitting, via the CTS frame, an indication of a bandwidth that the first wireless STA uses for the first P2P session, where sharing the TXOP of the wireless AP may be associated with transmitting the indication of the bandwidth that the first wireless STA uses for the first P2P session.

Some examples of the method, first wireless STAs, and non-transitory computer-readable medium described herein may further include operations, features, means, or instructions for receiving, via the frame, an indication of a resource unit allocation associated with the TXOP of the wireless AP, where the resource unit allocation indicates a non-primary channel of the wireless AP and transmitting, to the wireless AP via the non-primary channel, a CTS frame associated with the frame, where sharing the TXOP of the wireless AP may be associated with the resource unit allocation indicating the non-primary channel.

Some examples of the method, first wireless STAs, and non-transitory computer-readable medium described herein may further include operations, features, means, or instructions for receiving, from the wireless AP, an indication of a transmit power for the first P2P session at the first wireless STA during the TXOP of the wireless AP, where sharing the TXOP of the wireless AP may be associated with use of the transmit power for the first P2P session.

Some examples of the method, first wireless STAs, and non-transitory computer-readable medium described herein may further include operations, features, means, or instructions for receiving, via the frame, an indication of a resource allocation for the first P2P session in accordance with a set of observed parameters associated with the first P2P session, the resource allocation including at least the duration of the TXOP of the wireless AP allocated to the first P2P session at first wireless STA.

Another innovative aspect of the subject matter described in this disclosure can be implemented in a wireless STA. The wireless STA includes at least one memory and at least one processor communicatively coupled with the at least one memory. The at least one processor may be operable to cause the wireless STA to receive, from a first wireless AP associated with a first basic service set (BSS), information indicative of an offloading of the wireless STA from the first wireless AP to a second wireless AP in accordance with a resource availability at the second wireless AP, the second wireless AP being associated with a second BSS and receive, from the second wireless AP, a resource allocation for a P2P session at the wireless STA in accordance with the offloading of the wireless STA from the first wireless AP to the second wireless AP.

Another innovative aspect of the subject matter described in this disclosure can be implemented in a method for wireless communication performable at a wireless STA. The method may include receiving, from a first wireless AP associated with a first BSS, information indicative of an offloading of the wireless STA from the first wireless AP to a second wireless AP in accordance with a resource availability at the second wireless AP, the second wireless AP being associated with a second BSS and receiving, from the second wireless AP, a resource allocation for a P2P session at the wireless STA in accordance with the offloading of the wireless STA from the first wireless AP to the second wireless AP.

Another innovative aspect of the subject matter described in this disclosure can be implemented in a wireless STA. The wireless STA may include means for receiving, from a first wireless AP associated with a first BSS, information indicative of an offloading of the wireless STA from the first wireless AP to a second wireless AP in accordance with a resource availability at the second wireless AP, the second wireless AP being associated with a second BSS and means for receiving, from the second wireless AP, a resource allocation for a P2P session at the wireless STA in accordance with the offloading of the wireless STA from the first wireless AP to the second wireless AP.

Another innovative aspect of the subject matter described in this disclosure can be implemented in a non-transitory computer-readable medium storing code for wireless communication performable at a wireless STA. The code may include instructions executable by a processor to receive, from a first wireless AP associated with a first BSS, information indicative of an offloading of the wireless STA from the first wireless AP to a second wireless AP in accordance with a resource availability at the second wireless AP, the second wireless AP being associated with a second BSS and receive, from the second wireless AP, a resource allocation for a P2P session at the wireless STA in accordance with the offloading of the wireless STA from the first wireless AP to the second wireless AP.

In some examples of the method, wireless STAs, and non-transitory computer-readable medium described herein, receiving the information indicative of the offloading of the wireless STA from the first wireless AP to the second wireless AP may include operations, features, means, or instructions for receiving, from the first wireless AP, an indication of an association identifier (AID) value that the second wireless AP may be to use to address the wireless STA, where receiving the resource allocation from the second wireless AP may be associated with receiving the indication of the AID value.

In some examples of the method, wireless STAs, and non-transitory computer-readable medium described herein, receiving the information indicative of the offloading of the wireless STA from the first wireless AP to the second wireless AP may include operations, features, means, or instructions for receiving, from the first wireless AP, channel and BSS identifier (BSSID) information associated with the second wireless AP or target wake time (TWT) allocation information associated with the second wireless AP, or both, where receiving the resource allocation from the second wireless AP may be associated with receiving the channel and BSSID information or the TWT allocation information.

Another innovative aspect of the subject matter described in this disclosure can be implemented in a wireless AP. The wireless AP includes at least one memory and at least one processor communicatively coupled with the at least one memory. The at least one processor may be operable to cause the wireless AP to receive a first request, from a first wireless STA, for communication resources associated with a first P2P session and a second request, from a second wireless STA, for communication resources associated with a second P2P session and transmit, in accordance with the first request and the second request, a first frame allocating a first duration of a TXOP of the wireless AP to the first wireless STA and a second frame allocating a second duration of the TXOP of the wireless AP to the second wireless STA, the first duration and the second duration at least partially overlapping.

Another innovative aspect of the subject matter described in this disclosure can be implemented in a method for wireless communication performable at a wireless AP. The method may include receiving a first request, from a first wireless STA, for communication resources associated with a first P2P session and a second request, from a second wireless STA, for communication resources associated with a second P2P session and transmitting, in accordance with the first request and the second request, a first frame allocating a first duration of a TXOP of the wireless AP to the first wireless STA and a second frame allocating a second duration of the TXOP of the wireless AP to the second wireless STA, the first duration and the second duration at least partially overlapping.

Another innovative aspect of the subject matter described in this disclosure can be implemented in a wireless AP. The wireless AP may include means for receiving a first request, from a first wireless STA, for communication resources associated with a first P2P session and a second request, from a second wireless STA, for communication resources associated with a second P2P session and means for transmitting, in accordance with the first request and the second request, a first frame allocating a first duration of a TXOP of the wireless AP to the first wireless STA and a second frame allocating a second duration of the TXOP of the wireless AP to the second wireless STA, the first duration and the second duration at least partially overlapping.

Another innovative aspect of the subject matter described in this disclosure can be implemented in a non-transitory computer-readable medium storing code for wireless communication performable at a wireless AP. The code may include instructions executable by a processor to receive a first request, from a first wireless STA, for communication resources associated with a first P2P session and a second request, from a second wireless STA, for communication resources associated with a second P2P session and transmit, in accordance with the first request and the second request, a first frame allocating a first duration of a TXOP of the wireless AP to the first wireless STA and a second frame allocating a second duration of the TXOP of the wireless AP to the second wireless STA, the first duration and the second duration at least partially overlapping.

Some examples of the method, wireless APs, and non-transitory computer-readable medium described herein may further include operations, features, means, or instructions for transmitting, via the first frame, an indication of a resource unit allocation associated with the TXOP of the wireless AP, receiving, from the first wireless STA via a first portion of the resource unit allocation, a first CTS frame associated with the first frame, transmitting, via the second frame, an indication of a second portion of the resource unit allocation associated with the TXOP of the wireless AP in accordance with receiving the first CTS frame via the first portion of the resource unit allocation, and receiving, from the second wireless STA via the second portion of the resource unit allocation, a second CTS frame associated with the second frame.

Some examples of the method, wireless APs, and non-transitory computer-readable medium described herein may further include operations, features, means, or instructions for receiving, from the second wireless STA, an indication of a capability of the second wireless STA to communicate via non-primary channels, where the capability may be associated with a device capability or an operational mode of the second wireless STA, and where the second frame indicates a non-primary channel in accordance with the capability of the second wireless STA.

Some examples of the method, wireless APs, and non-transitory computer-readable medium described herein may further include operations, features, means, or instructions for monitoring a resource unit allocation during the TXOP of the wireless AP for P2P data frames associated with the first P2P session, where a bandwidth that the first wireless STA uses for the first P2P session may be derived from the P2P data frames, and where the first frame and the second frame may be associated with the bandwidth that the first wireless STA uses for the first P2P session.

In some examples of the method, wireless APs, and non-transitory computer-readable medium described herein, transmitting, to the first wireless STA, an indication of a first transmit power for the first P2P session at the first wireless STA during the TXOP of the wireless AP and transmitting, to the second wireless STA, an indication of a second transmit power for the second P2P session at the second wireless STA during the TXOP of the wireless AP, where an allocation of the first duration of the TXOP and the second duration of the TXOP to the first P2P session and the second P2P session may be associated with indicating the first transmit power for the first P2P session and indicating the second transmit power for the second P2P session.

Another innovative aspect of the subject matter described in this disclosure can be implemented in a first wireless AP associated with a first BSS. The first wireless AP includes at least one memory and at least one processor communicatively coupled with the at least one memory. The at least one processor may be operable to cause the first wireless AP to transmit, to a second wireless AP associated with a second BSS, a resource availability inquiry and transmit, to a wireless STA associated with the first BSS of the first wireless AP, information indicative of an offloading of the wireless STA from the first wireless AP to the second wireless AP in accordance with a resource availability at the second wireless AP.

Another innovative aspect of the subject matter described in this disclosure can be implemented in a method for wireless communication performable at a first wireless AP associated with a first BSS. The method may include transmitting, to a second wireless AP associated with a second BSS, a resource availability inquiry and transmitting, to a wireless STA associated with the first BSS of the first wireless AP, information indicative of an offloading of the wireless STA from the first wireless AP to the second wireless AP in accordance with a resource availability at the second wireless AP.

Another innovative aspect of the subject matter described in this disclosure can be implemented in a first wireless AP associated with a first BSS. The first wireless AP may include means for transmitting, to a second wireless AP associated with a second BSS, a resource availability inquiry and means for transmitting, to a wireless STA associated with the first BSS of the first wireless AP, information indicative of an offloading of the wireless STA from the first wireless AP to the second wireless AP in accordance with a resource availability at the second wireless AP.

Another innovative aspect of the subject matter described in this disclosure can be implemented in a non-transitory computer-readable medium storing code for wireless communication performable at a first wireless AP associated with a first BSS. The code may include instructions executable by a processor to transmit, to a second wireless AP associated with a second BSS, a resource availability inquiry and transmit, to a wireless STA associated with the first BSS of the first wireless AP, information indicative of an offloading of the wireless STA from the first wireless AP to the second wireless AP in accordance with a resource availability at the second wireless AP.

In some examples of the method, first wireless APs, and non-transitory computer-readable medium described herein, transmitting the information indicative of the offloading of the wireless STA from the first wireless AP to the second wireless AP may include operations, features, means, or instructions for transmitting, to the wireless STA, an indication of an AID value that the second wireless AP may be to use to address the wireless STA.

Some examples of the method, first wireless APs, and non-transitory computer-readable medium described herein may further include operations, features, means, or instructions for receiving, from the second wireless AP in accordance with the offloading of the wireless STA from the first wireless AP to the second wireless AP, the indication of the AID value that the second wireless AP may be to use to address the wireless STA.

Some examples of the method, first wireless APs, and non-transitory computer-readable medium described herein may further include operations, features, means, or instructions for receiving, from the wireless station STA, a request for communication resources associated with a P2P session at the wireless STA, where transmitting the resource availability inquiry may be in accordance with the request for the communication resources associated with the P2P session.

Some examples of the method, first wireless APs, and non-transitory computer-readable medium described herein may further include operations, features, means, or instructions for transmitting, to the second wireless AP as part of a resource sharing between the first wireless AP and the second wireless AP, information associated with data traffic constraints of the wireless STA, where the request for the communication resources associated with the P2P session at the wireless STA may be associated with the data traffic constraints of the wireless STA.

Another innovative aspect of the subject matter described in this disclosure can be implemented in a second wireless AP. The second wireless AP includes at least one memory and at least one processor communicatively coupled with the at least one memory. The at least one processor may be operable to cause the second wireless AP to transmit, to a first wireless AP from the second wireless AP, an indication of a resource availability at the second wireless AP and transmit, to a wireless STA, a resource allocation for a P2P session at the wireless STA in accordance with an offloading of the wireless STA from the first wireless AP to the second wireless AP.

Another innovative aspect of the subject matter described in this disclosure can be implemented in a method for wireless communication performable at a second wireless AP. The method may include transmitting, to a first wireless AP from the second wireless AP, an indication of a resource availability at the second wireless AP and transmitting, to a wireless STA, a resource allocation for a P2P session at the wireless STA in accordance with an offloading of the wireless STA from the first wireless AP to the second wireless AP.

Another innovative aspect of the subject matter described in this disclosure can be implemented in a second wireless AP. The second wireless AP may include means for transmitting, to a first wireless AP from the second wireless AP, an indication of a resource availability at the second wireless AP and means for transmitting, to a wireless STA, a resource allocation for a P2P session at the wireless STA in accordance with an offloading of the wireless STA from the first wireless AP to the second wireless AP.

Another innovative aspect of the subject matter described in this disclosure can be implemented in a non-transitory computer-readable medium storing code for wireless communication performable at a second wireless AP. The code may include instructions executable by a processor to transmit, to a first wireless AP from the second wireless AP, an indication of a resource availability at the second wireless AP and transmit, to a wireless STA, a resource allocation for a P2P session at the wireless STA in accordance with an offloading of the wireless STA from the first wireless AP to the second wireless AP.

Some examples of the method, second wireless APs, and non-transitory computer-readable medium described herein may further include operations, features, means, or instructions for receiving, from the first AP, a resource availability inquiry in accordance with a request for communication resources associated with the P2P session at the wireless STA, where transmitting the resource allocation to the wireless STA may be in accordance with the request for the communication resources associated with the P2P session.

Some examples of the method, second wireless APs, and non-transitory computer-readable medium described herein may further include operations, features, means, or instructions for receiving, from the first wireless AP as part of a resource sharing between the first wireless AP and the second wireless AP, information associated with data traffic constraints of the wireless STA, where the request for the communication resources associated with the P2P session at the wireless STA may be associated with the data traffic constraints of the wireless STA.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 10-12 show flowcharts illustrating example processes performable by a wireless AP that support resource allocation techniques to support multiple P2P sessions.

FIGS. 13 and 14 show flowcharts illustrating example processes performable by a wireless STA that support resource allocation techniques to support multiple P2P sessions.

Like reference numbers and designations in the various drawings indicate like elements.

DETAILED DESCRIPTION

Figure 1:
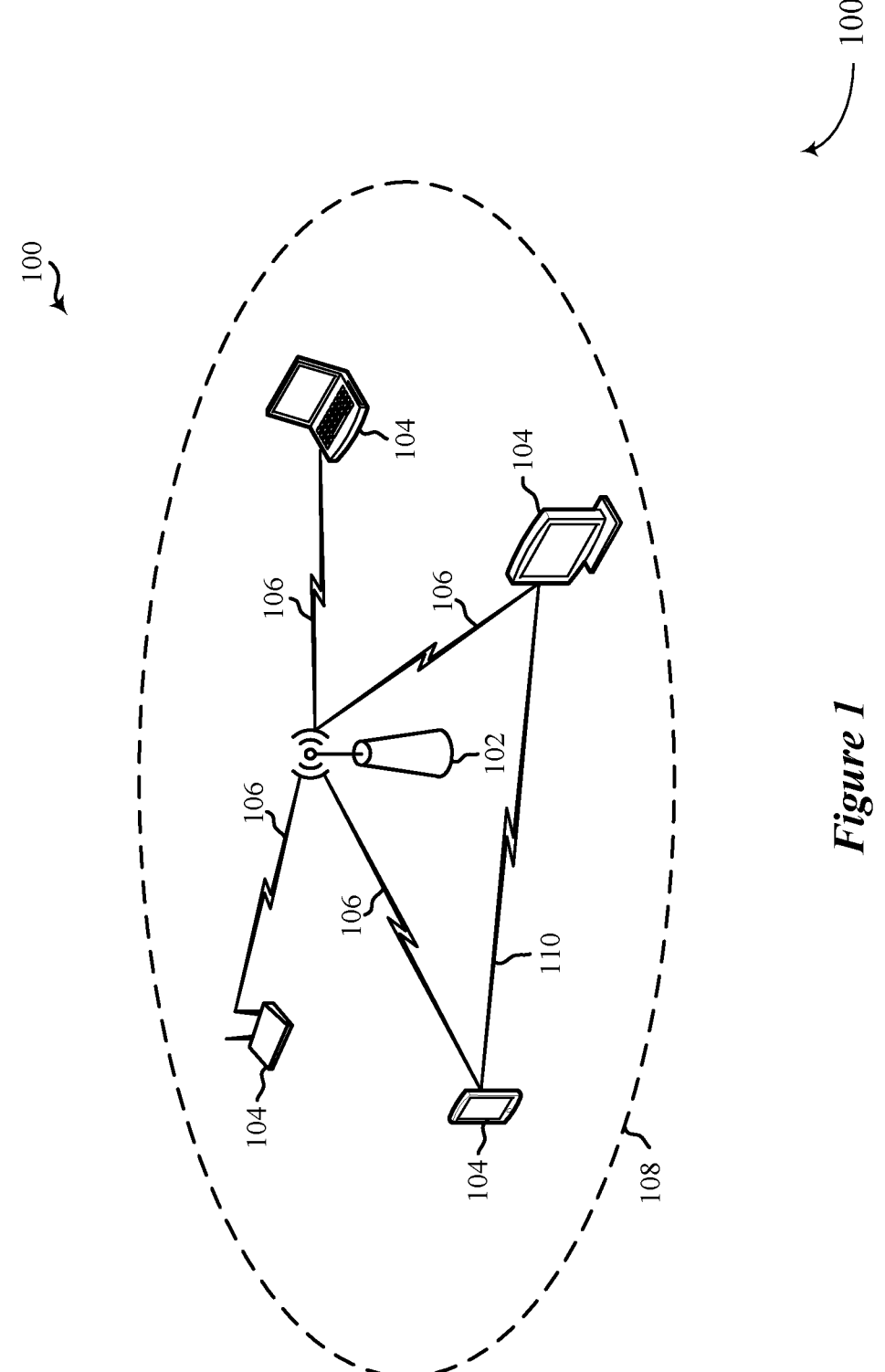
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to transmission opportunity (TXOP) sharing and resource allocation mechanisms in systems involving multiple peer-to-peer (P2P) sessions. Some aspects more specifically relate to mechanisms according to which a wireless access point (AP) can allocate respective portions of a resource unit (RU) allocation (during a shared TXOP of the AP) to respective P2P sessions at multiple respective stations (STAs), mechanisms according to which an AP can use transmit power control to facilitate simultaneous TXOP sharing across multiple STAs, and mechanisms according to which a first AP can offload a STA to a second AP in accordance with relative resource availabilities at the first AP and the second AP. In some examples of implementations in which an AP allocates respective portions of an RU allocation to respective P2P sessions at multiple respective STAs within a TXOP, a first STA may indicate how many sub-channels the first STA expects to use for a first P2P session as part of a request-to-send (RTS)-clear-to-send (CTS) frame exchange. In some other examples, the AP may derive, determine or otherwise identify how many sub-channels the first STA uses or expects to use for the first P2P session in accordance with monitoring P2P data frames of the first P2P session or transmitting a Trigger frame that solicits a response from the first STA and measuring, identifying, or otherwise determining a bandwidth expectation of the first STA in accordance with the monitored P2P data frames or the solicited response, or both. In some other examples, the AP may use a reinforcement learning model (such as an artificial intelligence (AI) or machine learning (ML) technique) to estimate a bandwidth (such as a quantity of sub-channels) or a time duration (such as a quantity of symbols or slots) that the first STA uses for the first P2P session in accordance with a set of observed parameters. The reinforcement learning model may output estimations for bandwidth and time duration separately or may output a value associated with a time-bandwidth product. If the first STA indicates, or the AP otherwise identifies, that the first STA uses or expects to use a portion (such as a subset) of the total RU allocation, the AP may allocate a remaining set of sub-channels within the TXOP to a second P2P session at a second STA.

In some implementations, a STA and an AP may support a collaborative reinforcement learning model (such as a collaborative AI or ML model) to incentivize the STA to request an appropriate or efficient amount of communication resources. For example, a STA may earn a reward associated with the collaborative reinforcement learning model by utilizing approximately the same amount of communication resources that the STA requested and the AP may allocate relatively more communication resources (or may allocate communication resources relatively more often) to STAs with a higher reward. As such, STAs that are relatively more efficient in their resource requests may earn higher rewards than STAs that are relatively less efficient in their resource requests, which may incentivize STAs to efficiently request communication resources and disincentivize STAs from requesting too many communication resources.

Additionally, or alternatively, in implementations in which an AP uses transmit power control to facilitate simultaneous TXOP sharing across multiple STAs, the AP may share a TXOP with a first STA and a second STA in accordance with assigning respective transmit powers to each of the first STA and the second STA. In such implementations, the AP may assign the respective transmit powers such that communications associated with a first P2P session at the first STA and communications associated with a second P2P session at the second STA contribute less than a threshold amount of interference. The AP may identify, select, calculate, or determine the respective transmit powers in accordance with measurement reports, reinforcement learning models (such as AI or ML models), or any combination thereof. Additionally, or alternatively, in implementations in which a first AP can offload a STA to a second AP, multiple APs may coordinate with each other regarding resource availabilities for P2P sessions and may support an offloading mechanism such that the STA can be offloaded from the first AP to the second AP if the second AP has a relatively greater amount of resources available for P2P sessions than the first AP.

Particular aspects of the subject matter described in this disclosure can be implemented to realize one or more of the following potential advantages. In accordance with supporting multi-STA TXOP sharing and resource allocation mechanisms in systems involving multiple P2P sessions, systems may achieve more efficient resource usage efficiency as an AP may share a single TXOP with multiple STAs for multiple P2P sessions. As a result of supporting multiple P2P sessions within a single TXOP, communicating devices may experience or achieve greater spectral efficiency, higher data rates, greater system throughput, and ultra-high reliability (UHR), among other benefits. Moreover, the described techniques may support lower latency and greater scalability. For example, in accordance with the implementations described herein, a system may support a relatively greater quantity of simultaneous P2P sessions, which may facilitate greater adoption of some low-latency application types, such as augmented reality (AR), virtual reality (VR), or extended reality (XR) application types. As such, an AP and one or more STAs may provide greater capability and performance across various environments (such as enterprise and residential environments), which may improve a user experience along with data rates. Further, in accordance with supporting a collaborative reinforcement learning model (such as a collaborative AI or ML model) that incentivizes STAs to request an appropriate or efficient amount of communication resources, a network of one or more APs and one or more STAs may achieve greater communication resource usage efficiency and greater spectral efficiency, which may also increase a quantity of simultaneous P2P sessions the network is capable of supporting. Additionally, in accordance with supporting power control mechanisms to facilitate simultaneous TXOP sharing across multiple STAs, an AP may more efficiently control interference between different P2P sessions using explicit signaling or reinforcement learning models (such as AI or ML models), which may reduce communication errors and further increase a quantity of simultaneous P2P sessions the network is capable of supporting.

FIG. 1 shows a pictorial diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, softwareenabled APs (soft APs), and multi-link APs. The coverage area and capacity of a cellular network (such as LTE or 5G NR) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (such as TVs (including smart TVs), computer monitors, navigation systems, among others), music or other audio or stereo devices, remote control devices ("remotes"), printers, kitchen appliances (including smart refrigerators) or other household appliances, key fobs (such as for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (such as the 2.4 GHz, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHz, 5 GHZ, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

In some implementations, an AP 102 and one or more STAs 104 may support one or more signaling- or configuration-based mechanisms according to which the AP 102 and the STAs 104 can achieve multi-STA TXOP sharing or inter-AP coordination regarding resource availability for P2P sessions, or both. For example, an AP 102 may support various mechanisms according to which the AP 102 may share a TXOP of the AP 102 with multiple STAs 104, each of the multiple STAs 104 using allocated resources of the TXOP for a respective P2P session. Such mechanisms may include signaling mechanisms according to which the AP 102 may identify (such as by measuring, receiving an indication, selecting, or otherwise determining) that a first P2P session at a first STA 104 is to use (or uses) a first portion of a total available RU allocation during a TXOP of the AP 102. In accordance with such an identification, the AP 102 may additionally share the TXOP of the AP 102 with a second STA and may allocate a second portion of the total available RU allocation to a second P2P session at the second STA 104.

Additionally, or alternatively, such mechanisms may include power control mechanisms according to which an AP 102 may assign respective transmit powers to multiple respective STAs 104 with which the AP 102 shares a TXOP of the AP 102. In accordance with such power control mechanisms, the AP 102 may assign the respective transmit powers such that P2P sessions at the multiple STAs 104 with which the AP 102 shares the TXOP avoid overly interfering with each other (such as avoiding contributing greater than a threshold interference level to another P2P session). Additionally, or alternatively, multiple APs 102 may coordinate with respect to resource availability. As such, if a first AP 102 receives a request for communication resources for a P2P session at a STA 104, the first AP 102 may request information on a resource availability at a second AP 102, such as if the first AP 102 does not have a sufficient amount of resources for the requested P2P session. If the second AP 102 has a sufficient amount of resources for the requested P2P session, the first AP 102 may offload (such as handover or steer) the STA 104 to the second AP 102, and the second AP 102 may allocate resources for the P2P session at the STA 104.

Figure 2:
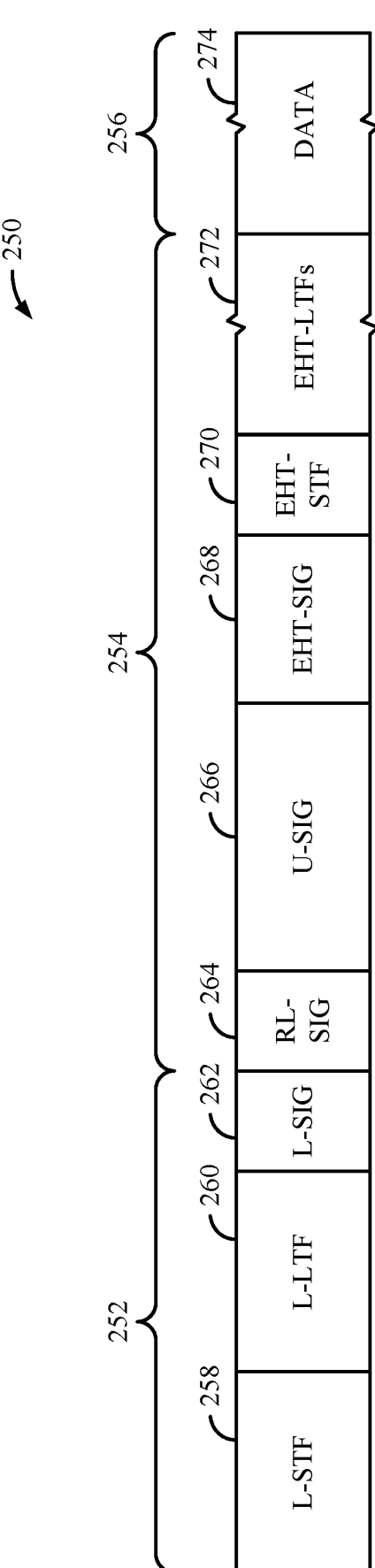
FIG. 2 shows an example physical layer (PHY) protocol data unit (PPDU) usable for communications between a wireless access point (AP) and one or more wireless stations (STAs).

FIG. 2 shows an example PPDU 250 usable for wireless communication between a wireless AP and one or more wireless STAs. The PPDU 250 may be used for SU, OFDMA or MU-MIMO transmissions. The PPDU 250 may be formatted as an Extremely High Throughput (EHT) WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8), or another wireless communication standard. The PPDU 250 includes a PHY preamble including a legacy portion 252 and a non-legacy portion 254. The PPDU 250 may further include a PHY payload 256 after the preamble, for example, in the form of a PSDU including a data field 274.

The legacy portion 252 of the preamble includes an L-STF 258, an L-LTF 260, and an L-SIG 262. The non-legacy portion 254 of the preamble includes a repetition of L-SIG (RL-SIG) 264 and multiple wireless communication protocol version-dependent signal fields after RL-SIG 264. For example, the non-legacy portion 254 may include a universal signal field 266 (referred to herein as "U-SIG 266") and an EHT signal field 268 (referred to herein as "EHT-SIG 268"). The presence of RL-SIG 264 and U-SIG 266 may indicate to EHT- or later version-compliant STAs 104 that the PPDU 250 is an EHT PPDU or a PPDU conforming to any later (post-EHT) version of a new wireless communication protocol conforming to a future IEEE 802.11 wireless communication protocol standard. One or both of U-SIG 266 and EHT-SIG 268 may be structured as, and carry version-dependent information for, other wireless communication protocol versions associated with amendments to the IEEE family of standards beyond EHT. For example, U-SIG 266 may be used by a receiving device to interpret bits in one or more of EHT-SIG 268 or the data field 274. Like L-STF 258, L-LTF 260, and L-SIG 262, the information in U-SIG 266 and EHT-SIG 268 may be duplicated and transmitted in each of the component 20 MHz channels in instances involving the use of a bonded channel.

The non-legacy portion 254 further includes an additional short training field 270 (referred to herein as "EHT-STF 270," although it may be structured as, and carry version-dependent information for, other wireless communication protocol versions beyond EHT) and one or more additional long training fields 272 (referred to herein as "EHT-LTFs 272," although they may be structured as, and carry version-dependent information for, other wireless communication protocol versions beyond EHT). EHT-STF 270 may be used for timing and frequency tracking and AGC, and EHT-LTF 272 may be used for more refined channel estimation.

EHT-SIG 268 may be used by an AP to identify and inform one or multiple STAs 104 that the AP has scheduled UL or DL resources for them. EHT-SIG 268 may be decoded by each compatible STA 104 served by the AP 102. EHT-SIG 268 may generally be used by a receiving device to interpret bits in the data field 274. For example, EHT-SIG 268 may include RU allocation information, spatial stream configuration information, and per-user (such as STA-specific) signaling information. Each EHT-SIG 268 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 274.

In some wireless communications environments, EHT systems or other systems compliant with future generations of the IEEE 802.11 family of wireless communication protocol standards may provide additional capabilities over other previous systems (such as High Efficiency (HE) systems or other legacy systems). EHT and newer wireless communication protocols may support flexible operating bandwidth enhancements at APs and STAs, such as broadened operating bandwidths relative to legacy operating bandwidths or more granular operation relative to legacy operation. For example, an EHT system may allow communications spanning operating bandwidths of 20 MHz, 40 MHz, 80 MHZ, 160 MHZ, 240 MHz and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device operates in a contiguous 320 MHz bandwidth mode or a 160+160 MHz bandwidth mode. Signals for transmission may be generated by two different transmit chains of the device each having a bandwidth of 160 MHz (and each coupled to a different power amplifier). In some other examples, signals for transmission may be generated by four or more different transmit chains of the device, each having a bandwidth of 80 MHz.

In some other examples, the wireless communication device may operate in a contiguous 240 MHz bandwidth mode, or a noncontiguous 160+80 MHz bandwidth mode. In some implementations, the signals for transmission may be generated by three different transmit chains of the device, each having a bandwidth of 80 MHz. In some other examples, the 240 MHz/160+80 MHz bandwidth modes also may be formed by puncturing 320/160+160 MHz bandwidth modes with one or more 80 MHz subchannels. For example, signals for transmission may be generated by two different transmit chains of the device each having a bandwidth of 160 MHz with one of the transmit chains outputting a signal having an 80 MHz subchannel punctured therein.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band or noncontiguous and located in different bands (such as partly in the 5 GHz band and partly in the 6 GHz band).

In some implementations, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and contend for access to the wireless medium at the particular time. The DCF is implemented through the use of time intervals (including the slot time (or "slot interval") and the interframe space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some implementations, the wireless communication device may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (such as identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (such as identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a TXOP and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK), and best effort (AC_BE). This enables particular types of traffic to be prioritized in the network.

Some APs and STAs may implement techniques for spatial reuse that involve participation in a coordinated communication scheme. According to such techniques, an AP may contend for access to a wireless medium to obtain control of the medium for a TXOP. The AP that wins the contention (hereinafter also referred to as a "sharing AP") may select one or more other APs (hereinafter also referred to as "shared APs") to share resources of the TXOP. The sharing and shared APs may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP may partition the TXOP into multiple time segments or frequency segments each including respective time or frequency resources representing a portion of the TXOP, The sharing AP may allocate the time or frequency segments to itself or to one or more of the shared APs. For example, each shared AP may utilize a partial TXOP assigned by the sharing AP for its uplink or downlink communications with its associated STAs.

In some examples of such TDMA techniques, each portion of a plurality of portions of the TXOP includes a set of time resources that do not overlap with any time resources of any other portion of the plurality of portions. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some other examples of OFDMA techniques, each portion of the plurality of portions of the TXOP includes a set of frequency resources that do not overlap with any frequency resources of any other portion of the plurality of portions. In such implementations, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or RUs associated with each portion of the TXOP such as for multi-user OFDMA.

In this manner, the sharing AP's acquisition of the TXOP enables communication between one or more additional shared APs and their respective BSSs, subject to appropriate power control and link adaptation. For example, the sharing AP may limit the transmit powers of the selected shared APs such that interference from the selected APs does not prevent STAs associated with the TXOP owner from successfully decoding packets transmitted by the sharing AP. Such techniques may be used to reduce latency because the other APs may not need to wait to win contention for a TXOP to be able to transmit and receive data according to conventional CSMA/CA or EDCA techniques. Additionally, by enabling a group of APs associated with different BSSs to participate in a coordinated AP transmission session, during which the group of APs may share at least a portion of a single TXOP obtained by any one of the participating APs, such techniques may increase throughput across the BSSs associated with the participating APs and also may achieve improvements in throughput fairness. Furthermore, with appropriate selection of the shared APs and the scheduling of their respective time or frequency resources, medium utilization may be maximized or otherwise increased while packet loss resulting from OBSS interference is minimized or otherwise reduced. Various implementations may achieve these and other advantages without requiring that the sharing AP or the shared APs be aware of the STAs associated with other BSSs, without requiring a preassigned or dedicated master AP or preassigned groups of APs, and without requiring backhaul coordination between the APs participating in the TXOP.

In some examples in which the signal strengths or levels of interference associated with the selected APs are relatively low (such as less than a given value), or when the decoding error rates of the selected APs are relatively low (such as less than a threshold), the start times of the communications among the different BSSs may be synchronous. Conversely, when the signal strengths or levels of interference associated with the selected APs are relatively high (such as greater than the given value), or when the decoding error rates of the selected APs are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP (or its associated STAs) to decode the preamble of the wireless packet and obtain the BSS color value carried in the wireless packet to determine whether the wireless packet is an intra-BSS packet or an OBSS packet. In this manner, each of the participating APs and their associated STAs may be able to receive and decode intra-BSS packets in the presence of OBSS interference.

In some implementations, the sharing AP may perform polling of a set of un-managed or non-co-managed APs that support coordinated reuse to identify candidates for future spatial reuse opportunities. For example, the sharing AP may transmit one or more spatial reuse poll frames as part of determining one or more other spatial reuse criteria and selecting one or more other APs to be shared APs. According to the polling, the sharing AP may receive responses from one or more of the polled APs. In some specific examples, the sharing AP may transmit a coordinated AP TXOP indication (CTI) frame to other APs that indicates time and frequency of resources of the TXOP that can be shared. The sharing AP may select one or more candidate APs upon receiving a coordinated AP TXOP request (CTR) frame from a respective candidate AP that indicates a desire by the respective AP to participate in the TXOP. The poll responses or CTR frames may include a power indication, for example, an RX power or RSSI measured by the respective AP. In some other examples, the sharing AP may directly measure potential interference of a service supported (such as UL transmission) at one or more APs, and select the shared APs based on (such as in accordance with) the measured potential interference. The sharing AP generally selects the APs to participate in coordinated spatial reuse such that it still protects its own transmissions (which may be referred to as primary transmissions) to and from the STAs in its BSS. The selected APs may then be allocated resources during the TXOP as described above.

Some wireless communication devices (including both APs and STAs) are capable of multi-link operation (MLO). In some implementations, MLO supports establishing multiple different communication links (such as a first link on the 2.4 GHz band, a second link on the 5 GHz band, and the third link on the 6 GHz band) between the STA and the AP. Each communication link may support one or more sets of channels or logical entities. In some examples, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to maximize the utilization of available resources to achieve higher throughput. That is, during at least some duration of time, transmissions or portions of transmissions may occur over two or more links in parallel at the same time. In some implementations, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some implementations, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some implementations, the exchange of information may occur via a beacon signal, a probe request or probe response, an association request or an association response frame, a dedicated action frame, or an operating mode indicator (OMI), among other examples. In some implementations, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Figure 3:
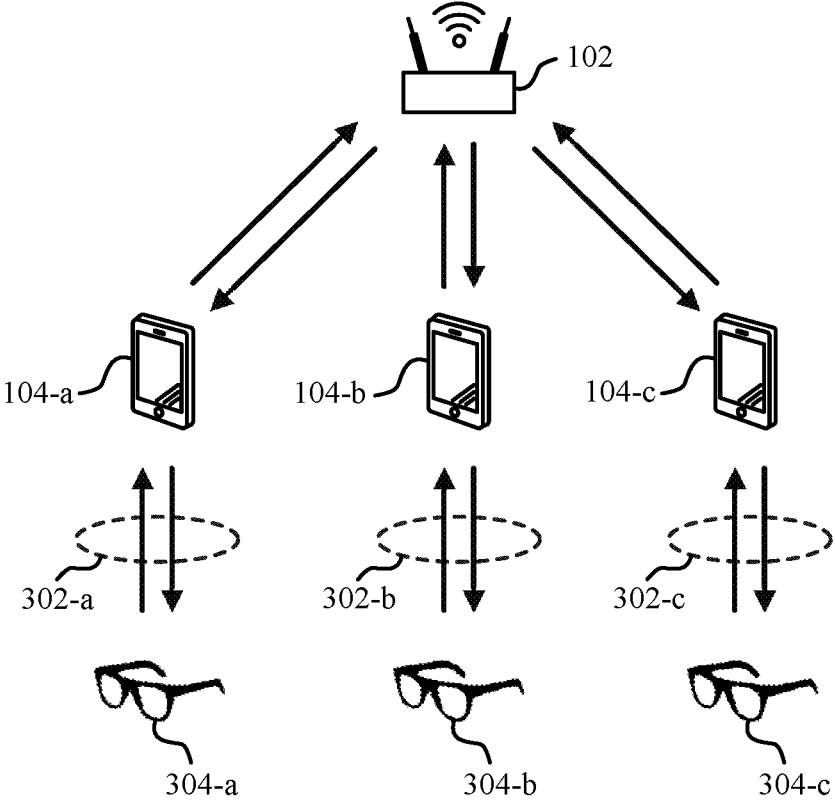
FIG. 3 shows an example system deployment that supports resource allocation techniques to support multiple peer-to-peer (P2P) sessions.

FIG. 3 shows an example system deployment 300 that supports resource allocation techniques to support multiple P2P sessions. The system deployment 300 may implement or be implemented to realize or facilitate aspects of the WLAN 100 or the PPDU 250, depicted in FIGS. 1 and 2, respectively. For example, the system deployment 300 illustrates communication between an AP 102 and multiple STAs 104, including a STA 104-a, a STA 104-b, and a STA 104-c. The AP 102 may be an example of an AP 102 as illustrated by and described with reference to FIG. 1. In some aspects, the AP 102 may be an example of or function as a soft-AP. Each of the STA 104-a, the STA 104-b, and the STA 104-c may be examples of a STA 104 as illustrated by and described with reference to FIG. 1. The STA 104-a, the STA 104-b, and the STA 104-c may be examples of non-AP STAs, but any one or more of the STA 104-a, the STA 104-b, or the STA 104-c may function as a soft-AP in some scenarios.

In some implementations, each of the STA 104-a, the STA 104-b, and the STA 104-c may be associated with (such as host, participate in, support, or communicate in accordance with) a P2P session. For example, the STA 104-a may be associated with a P2P session 302-a via which the STA 104-a communicates with (such as transmits to or receives from, or both) a peer device 304-a. Similarly, the STA 104-b may be associated with a P2P session 302-b via which the STA 104-b communicates with (such as transmits to or receives from, or both) a peer device 304-b and the STA 104-c may be associated with a P2P session 302-c via which the STA 104-c communicates with (such as transmits to or receives from, or both) a peer device 304-*c*. The peer device 304-*a*, the peer device 304-*b*, and the peer device 304-*c* may be examples of any type of electronic devices mentioned herein, including AR, VR, or XR glasses devices.

In some systems, network providers or manufacturers may anticipate wide adoption of AR, VR, or XR devices in various environments, such as enterprise and residential environments. In such systems, scalability may be a key issue to address as AR, VR, and XR devices are each associated with a respective P2P session of latency-sensitive data. Thus, to support a wide adoption of AR, VR, or XR devices, deployment mechanisms and configurations may aim for scalability (such as to support a relatively large quantity of AR, VR, or XR devices or users), for adaptability to various deployment types (such as enterprise, residential, or other mesh network deployments), and for policy-based coexistence (such that information technology (IT) managers may enforce such policy-based coexistence, including policy-based XR coexistence).

In some aspects, the AP 102 may support a TXOP sharing procedure, such as a Triggered TXOP Sharing procedure. In accordance with Triggered TXOP Sharing (such as a Triggered TXOP sharing Mode 2, in which an MU-RTS TXS Trigger frame may initiate a Triggered TXOP sharing procedure where a scheduled STA 104 may transmit one or more MPDUs or A-MPDUs addressed to its associated AP 102 or addressed to another STA 104), the AP 102 may share a TXOP of the AP 102 with a single non-AP STA (such as a single one of the STA 104-*a*, the STA 104-*b*, and the STA 104-*c*). As such, the AP 102 may trigger uplink transmissions (such as single user (SU) uplink transmissions) from the single non-AP STA or grant the shared TXOP duration for P2P transmissions between the single non-AP STA and a peer device. The AP 102 may initiate a TXOP sharing procedure by transmitting a MU-RTS TXOP sharing (TXS) Trigger frame that indicates an allocated TXOP sharing duration (which may be denoted as $d_1$). The single non-AP STA with to which the TXOP sharing duration is allocated may be expected to respond (to the MU-RTS TXS frame) with a CTS frame within a short interframe space (SIFS) duration to successfully complete the Triggered TXOP Sharing procedure.

In some systems, the CTS frame sent in response to an MU-RTS frame (such as an MU-RTS TXS Trigger frame) may be carried in a non-high throughput (HT) or non-HT duplicate PPDU with a set data rate (such as 6 megabits per second) and with a transmission vector parameter SCRAMBLER_INITIAL_VALUE set to a same value as a reception vector parameter SCRAMBLER_INITIAL_VALUE of the PPDU carrying the MU-RTS Trigger frame. Such a transmission vector parameter and a reception vector parameter may be equivalently referred to as a TXVECTOR parameter and an RXVECTOR parameter, respectively. Additionally, a STA 104 may transmit the CTS frame via the 20 MHz channels indicated in an RU allocation subfield of a User Info field of the MU-RTS Trigger frame. In some aspects, a bandwidth signaling transmitter address (TA) may not be used in an MU-RTS Trigger frame or a CTS frame sent in response to an MU-RTS Trigger frame. As such, the TXVECTOR parameter CH BANDWIDTH_IN_NON_HT may not be present when transmitting an MU-RTS Trigger frame or a CTS frame sent in response to an MU-RTS Trigger frame.

Accordingly, in such systems, a STA 104 may be constrained to transmit a CTS frame (such as a CTS response) via the same RU allocation as is indicated in the MU-RTS Trigger frame, which may limit the STA 104 receiving the MU-RTS TXS Trigger frame to either responding on an entirety of a bandwidth of the RU allocation or not responding at all. Such an all or nothing response may result in system rigidity and contribute to a limitation or shortcoming of such MU-RTS CTS frame exchanges. For example, in a scenario in which the STA 104 refrains from responding with a CTS frame via an entirety of an indicated bandwidth, the STA 104 may lose its own channel access opportunity. Alternatively, in a scenario in which the STA 104 responds with a CTS frame via an entirety of an indicated bandwidth, the STA 104 may preclude other devices from using the TXOP, even if the STA 104 uses a subset of a larger set of available resources (such as a subset of an RU allocation).

As such, at least some allocated bandwidth may be wasted when not utilized by an allocated STA 104 in triggered TXOP sharing. For example, if the AP 102 allocates a TXOP duration to the STA 104-*a* via an MU-RTS Trigger frame, indicates an RU allocation (such as an uplink bandwidth) of 80 MHz via the MU-RTS Trigger frame, and the STA 104-*a* uses 40 MHz of the allocated 80 MHz for the P2P session 302-*a* with the peer device 304-*a*, the remaining 40 MHz may be left unused (and thus potentially wasted). In other words, the AP 102 may allocate, to the STA 104-*a*, a bandwidth that is not fully utilized by the STA 104-*a* (which may be due to a hidden node or a power save mode at the STA 104-*a*) and the AP 102 may be unable to use the remaining bandwidth to serve other P2P clients (such as the STA 104-*b* and the peer device 304-*b* or the STA 104-*c* and the peer device 304-*c*) until an end of the TXOP duration allocated to the STA 104-*a*. Such limitations on using a leftover bandwidth may be inefficient and limit a total quantity of P2P sessions (such as limit P2P resource allocation) that the AP 102 can support (while meeting associated quality of service (QoS) constraints).

Accordingly, in some implementations, the AP 102 and the STAs 104 may support one or more signaling- or configuration-based mechanisms according to which the AP 102 and the STAs 104 can achieve multi-STA TXOP sharing along with inter-AP coordination regarding resource availability for P2P sessions. For example, the AP 102 may support various mechanisms according to which the AP 102 may share a TXOP of the AP 102 with multiple STAs 104, each of the multiple STAs 104 using allocated resources of the TXOP for a respective P2P session (such as the P2P session 302-*a*, the P2P session 302-*b*, or the P2P session 302-*c*). Such mechanisms may include signaling mechanisms according to which the AP 102 may identify (such as measure, receive an indication, select, or otherwise determine) that the P2P session 302-*a* at the STA 104-*a* is to use (or uses) a first portion (such as subset) of a total available RU allocation during the TXOP of the AP 102.

In accordance with such an identification, the AP 102 may additionally share the TXOP of the AP 102 with the STA 104-*b* and allocate a second portion of the total available RU allocation to the P2P session 302-*b* at the STA 104-*b*. In some aspects, the AP 102 may further share the TXOP with the STA 104-*c* and allocate a third portion (if any is remaining) of the total available RU allocation to the P2P session 302-*c* at the STA 104-*c*. Additional details relating to such an allocation of respective portions of a total RU allocation to multiple respective STAs 104 within a same TXOP duration are illustrated and described in more detail herein.

Additionally, or alternatively, such mechanisms may include power control mechanisms according to which the AP 102 may assign respective transmit powers to multiple respective STAs 104 with which the AP 102 shares a TXOP of the AP 102. In accordance with such power control mechanisms, the AP 102 may assign the respective transmit powers such that P2P sessions at the multiple STAs 104 with which the AP 102 shares the TXOP avoid overly interfering with each other (such as avoid contributing greater than a threshold interference level to another P2P session). For example, the AP 102 may share a TXOP with both the STA 104-*a* and the STA 104-*b* and may assign a first (upper limit or maximum) transmit power and a second (upper limit or maximum) transmit power to the STA 104-*a* and the STA 104-*b*, respectively. Additional details relating to such transmit power control to facilitate TXOP sharing with multiple STAs 104 are illustrated and described in more detail herein.

Additionally, or alternatively, multiple APs 102 may coordinate with respect to resource availability over time. As such, if the AP 102 receives a request for communication resources for the P2P session 302-*a* at the STA 104-*a*, the AP 102 may inquire (via a signaled request) about a resource availability at a second AP 102. If the second AP 102 has a sufficient amount of resources for the requested P2P session 302-*a*, the AP 102 may offload (such as handover) the STA 104-*a* to the second AP 102 and the second AP 102 may allocate resources for the P2P session 302-*a* at the STA 104-*a*. Additional details relating to such an offloading of a STA 104 in accordance with relative resource availabilities between multiple APs 102 are illustrated and described in more detail herein.

Further, although described in the examples of FIG. 3 as occurring between a respective STA 104 and a respective peer device, the electronic devices illustrated and described as peer devices may additionally, or alternatively, be directly connected to the AP 102 without relying on an intermediate STA 104 (such as an intermediate soft-AP). For example, the peer device 304-*a* may communicate directly with the AP 102 without relying on the STA 104-*a*. In such examples, the AP 102 and the peer device 304-*a* may communicate (such as transmit or receive, or both) data frames in accordance with a data session (such as a data session that may be referred to as the P2P session 302-*a* when the STA 104-*a* is involved). In accordance with the example implementations described herein, the AP 102 may use a TXOP for such a data session with the peer device 304-*a* and may additionally share the TXOP with one or both of the P2P session 302-*b* or the P2P session 302-*c* at the STA 104-*b* or the STA 104-*c*, respectively.

Figure 4:
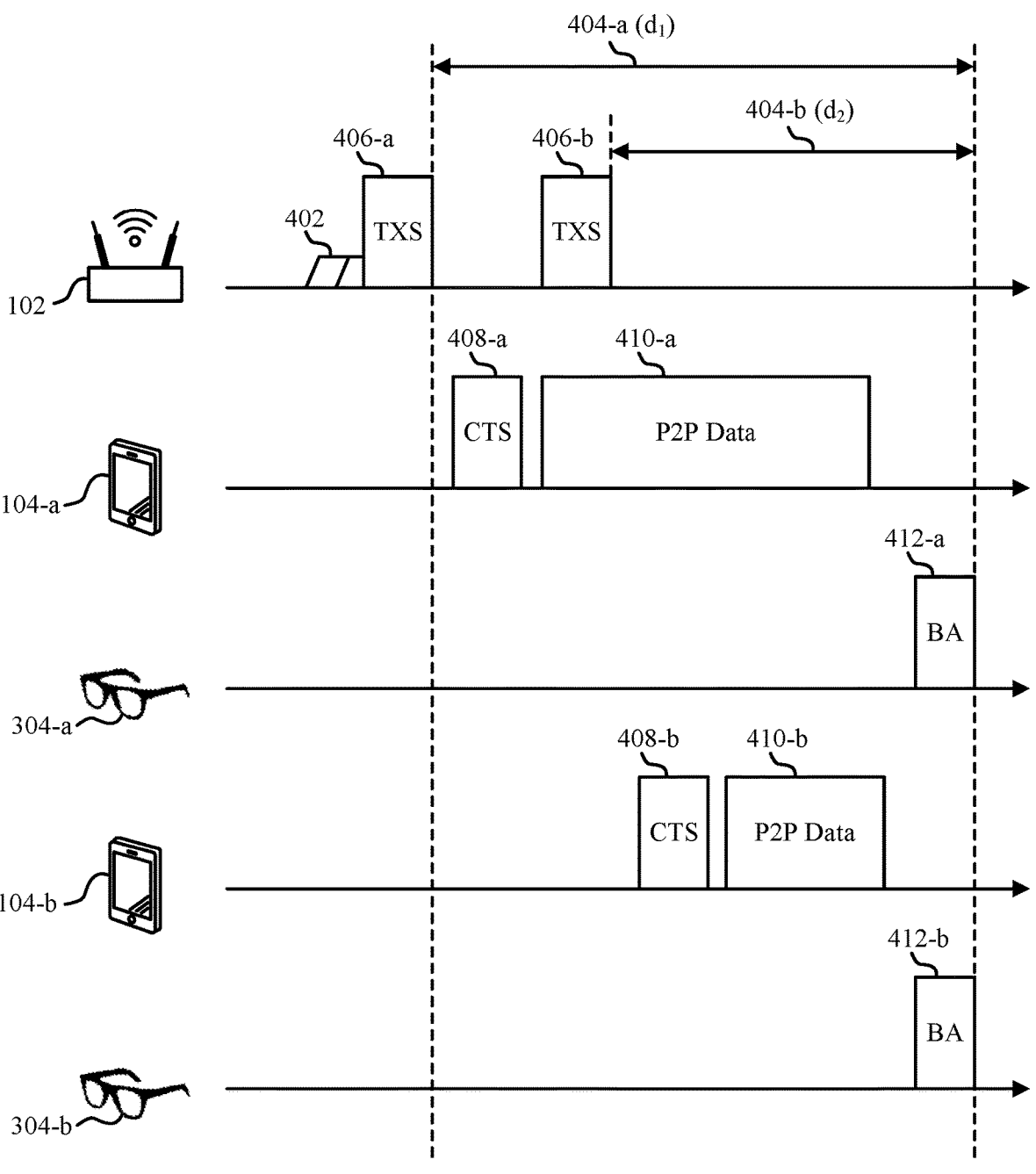
FIG. 4 shows an example transmission opportunity (TXOP) sharing procedure that supports resource allocation techniques to support multiple P2P sessions.

FIG. 4 shows an example TXOP sharing procedure 400 that supports resource allocation techniques to support multiple P2P sessions. The TXOP sharing procedure 400 may implement or be implemented to realize or facilitate aspects of the WLAN 100, the PPDU 250, or the system deployment 300, depicted in FIGS. 1, 2 and 3, respectively. For example, the TXOP sharing procedure 400 illustrates communication between an AP 102, a STA 104-*a*, a peer device 304-*a*, a STA 104-*b*, and a peer device 304-*b*. The AP 102 of FIG. 4 may be an example of an AP 102 as illustrated by and described with reference to FIGS. 1 and 3. The STA 104-*a* and the STA 104-*b* of FIG. 4 may be examples of STAs 104 as illustrated by and described with reference to FIG. 1 and the STA 104-*a* and the STA 104-*b*, respectively, as illustrated by and described with reference to FIG. 3. The peer device 304-*a* and the peer device 304-*b* of FIG. 4 may be examples of the peer device 304-*a* and the peer device 304-*b*, respectively, as illustrated by and described with reference to FIG. 3.

In some implementations, the AP 102 may perform a channel access procedure 402, which may include sensing a quantity of slots to measure whether a channel is available or currently occupied by other signaling. If the channel access procedure 402 is successful, the AP 102 may obtain or win a TXOP and may share a TXOP duration 404-*a* with the STA 104-*a* and a TXOP duration 404-*b* with the STA 104-*b*. To share the TXOP duration 404-*a* with the STA 104-*a*, the AP 102 may transmit a first frame 406-*a* (which may be an example of a TXS frame, such as an MU-RTS TXS Trigger frame) to the STA 104-*a*. To share the TXOP duration 404-*b* with the STA 104-*b*, the AP 102 may transmit a second frame 406-*b* (which may be an example of a TXS frame, such as, but not limited to, an MU-RTS TXS Trigger frame) to the STA 104-*b*. The AP 102 may support greater scalability of P2P resource allocation within an operating channel of the AP 102 in accordance with such multi-STA TXOP sharing.

In some aspects, the first frame 406-*a* may indicate a first duration $d_1$ and the second frame 406-*b* may indicate a second duration $d_2$, where the first duration $d_1$ at least partially overlaps in time with the second duration $d_2$. As illustrated in the example of FIG. 4, the first duration $d_1$ may be the TXOP duration 404-*a* and the second duration $d_2$ may be the TXOP duration 404-*b* and a subset of the first duration $d_1$. The allocated second duration $d_2$, however, may not be limited to the first duration $d_1$. For example, the second duration $d_2$ may extend longer than the first duration $d_1$, include a greater amount of time than the first duration $d_1$, start earlier than the first duration $d_1$, or any combination thereof. An allocation start time (a start time for the first duration $d_1$ or a start time for the second duration $d_2$, or start times for both) may be associated with (such as vary depending on) AP scheduling, CTS responses, or available bandwidth, among other examples of factors that may impact channel utilization.

The STA 104-*a* may respond to the first frame 406-*a* by transmitting a CTS frame 408-*a*, after which the STA 104-*a* may use the shared TXOP to communicate (such as transmit or receive, or both) P2P data 410-*a* with the peer device 304-*a* (in accordance with a P2P session 302-*a*, as illustrated by and described with reference to FIG. 3). The peer device 304-*a* may transmit a block acknowledgment (BA) 412-*a* in accordance with receiving the P2P data 410-*a*. Similarly, the STA 104-*b* may respond to the second frame 406-*b* by transmitting a CTS frame 408-*b*, after which the STA 104-*b* may use the shared TXOP to communicate (such as transmit or receive, or both) P2P data 410-*b* with the peer device 304-*b* (in accordance with a P2P session 302-*b*, as illustrated by and described with reference to FIG. 3). The peer device 304-*b* may transmit a BA 412-*b* in accordance with receiving the P2P data 410-*b*.

In some implementations, the AP 102 may allocate resources during the TXOP duration 404-*a* to more than one STA 104 (such as to both the STA 104-*a* and the STA 104-*b*) if a first allocated STA 104 (such as the STA 104-*a*) uses a portion or subset of an available bandwidth (such as does not use the full or entire bandwidth). The AP 102 may identify (receive an indication, measure, ascertain, or otherwise determine) that the STA 104-*a* uses a portion of an available bandwidth in one or more of various ways, including by enabling the STA 104-*a* to transmit the CTS frame 408-*a* via a subset of the RU allocation indicated by the first frame 406-*a*. For example, the first frame 406-*a* may indicate an uplink bandwidth of 80 MHz (and a primary 80 MHz channel) and the STA 104-*a* may transmit the CTS frame 408-*a* via a primary 40 MHz channel of the 80 MHz bandwidth. As such, the AP 102 may receive the CTS frame 408-*a* via the primary 40 MHz channel and identify, ascertain, or otherwise determine that the STA 104-*a* expects to use the primary 40 MHz channel (and only the primary 40 MHz channel) for the P2P session 302-a.

The AP 102, in accordance with identifying that the STA 104-a indicates a resource usage of a subset of the total bandwidth, may allocate time domain resources from the TXOP duration 404-a (including the TXOP duration 404-b) to the STA 104-b (another non-AP STA) through the second frame 406-b. In some implementations, the AP 102 may transmit the second frame 406-b via a non-primary or secondary 40 MHz channel (of the primary 80 MHZ) and the second frame 406-b may indicate an uplink bandwidth of 40 MHz and an RU allocation of the secondary 40 MHz channel. The STA 104-b may receive the second frame 406-b via the secondary 40 MHz channel and respond to the second frame 406-b via the CTS frame 408-b, which the STA 104-b may transmit via the secondary 40 MHz channel (in accordance with the RU allocation of the second frame 406-b indicating the secondary 40 MHz channel). The STA 104-b may communicate the P2P data 410-b via the secondary 40 MHz channel accordingly. As such, the AP 102 may allocate another STA 104 time resources of a same TXOP through the second frame 406-b (such as an MU-RTS TXS frame) for P2P transmissions via a non-primary or secondary channel, which may result in greater medium utilization efficiency and facilitate support for a larger quantity of P2P STAs.

Additionally, or alternatively, the AP 102 may allocate more than one STA 104 by controlling a transmission power of each allocated STA 104. For example, the AP 102 may allocate time for P2P transmissions at two or more client devices (such as the STA 104-a and the STA 104-b) at the same time by transmitting TXS frames (such as MU-RTS TXS Trigger frames) and by controlling the transmission power at each STA 104 to maintain acceptable channel conditions across a set of (such as all) STAs 104. In such examples, the AP 102 may request each of the STAs 104 that request resources for a P2P session to measure an RSSI value or to estimate a pathloss from (such as caused by) transmissions of other STAs 104. For example, the AP 102 may request the STA 104-a to measure and report a channel metric (such as an RSSI or estimated pathloss) associated with transmissions from the STA 104-b or may request the STA 104-b to measure and report a channel metric (such as an RSSI or estimated pathloss) associated with transmissions from the STA 104-a, or both.

The AP 102 may receive the one or more measured channel metrics from the STA 104-a or the STA 104-b, or from both, and may select (such as calculate, compute, identify, or otherwise determine) transmission power information to be used by each of the STA 104-a and the STA 104-b when transmitting P2P frames within the allocation duration (such as within the first duration $d_1$ for the STA 104-a and within the second duration $d_2$ for the STA 104-b). As such, multiple concurrent P2P allocations may still achieve a target (such as desired) quality, a target signal-to-interference-plus-noise ratio (SINR), a target throughput, a target latency, or any combination thereof.

Additionally, or alternatively, the AP 102 may leverage (such as utilize or employ) reinforcement learning techniques associated with a known topology (such as a home or apartment or Enterprise) to estimate RSSI values in accordance with (measurements of) frames received from the STA 104-a and the STA 104-b. Such reinforcement learning techniques may include artificial intelligence (AI)- or machine learning (ML)-based localization techniques. As such, in some implementations, the AP 102 may select, identify, calculate, obtain, or otherwise determine triggered TXOP sharing allocations in accordance with an AI or ML model.

In such implementations, during operation, the AP 102 may use an AI or ML model to classify a traffic pattern to identify (such as measure, select, ascertain, or otherwise determine) a type of low latency traffic in accordance with a set of input parameters from a STA 104 (such as the STA 104-a or the STA 104-b). In other words, the AP 102 may decode or use characteristics of P2P frames to learn traffic pattern statistics or other parameters related to a P2P session at a STA 104. Additionally, or alternatively, the AP 102 may use the AI or ML model to estimate a medium time and bandwidth for each STA 104 in accordance with an observed set of past parameters, such as previous utilized medium time, returned time from an initially allocated duration, previous utilized bandwidth, BSS load, SCS agreements, or exchanged QoS constraints and parameters (such as QoS constraints or QoS parameters indicated via a QoS Characteristics information element), among other example communication parameters. The AP 102 may estimate a medium time and bandwidth either as a product of the medium time and the bandwidth or as each separately. To estimate such resource usage, the AP 102 may use one or more AI or ML tools associated with time series prediction, such as an autoregressive integrated moving average (ARIMA) neural network, a long short-term memory (LSTM) neural network, or supervised learning using neural networks, among other example algorithms associated with time series prediction.

In some implementations, the AP 102 may adapt an allocation in accordance with observations by using reinforcement learning according to which the AP 102 may compute a reward (which may be associated with a correct estimation of resources by the AP 102) for each allocation or group of triggered TXOP sharing resource allocations and may correct an allocation or group of allocations accordingly (such as to increase or maximize the reward). The AP 102 may use one or more AI or ML tools to facilitate such adaptations of resource allocations in accordance with a reward, including tools associated with Q-learning, double Q-learning, deep Q-learning, or multi-arm bandit algorithms, among other example algorithms.

Additionally, the AP 102 and one or more STAs 104 (such as the STA 104-a and the STA 104-b) may use a collaborative AI or ML model between the AP 102 and the one or more STAs 104 to reward a STA 104 for requesting efficient medium time and bandwidth, where an efficient medium time and bandwidth may refer to a medium time and bandwidth that satisfies data rate and latency constraints for the STA with relatively small amounts of (such as less than a threshold amount of) leftover or unused resources. Such a collaborative AI or ML model may provide an incentive for a STA 104 to efficiently request resources (including a time domain allocation or a frequency domain allocation, or both). For example, the AP 102 may allocate relatively more resources or may more frequently allocate resources to STAs 104 with relatively higher rewards (such as STAs 104 who, on average or most recently, relatively more efficiently request medium time and bandwidth).

Further, although illustrated and described in an example of a TXOP sharing with the STA 104-a and the STA 104-b (two STAs), the AP 102 may share a TXOP with any quantity of (such as more than two) STAs 104. Similarly, a quantity of allocated P2P sessions may be greater than two. Likewise, allocated bandwidths to concurrent (such as fully or partially overlapping in the time domain) P2P sessions may be different. For example, if the AP 102 indicates a bandwidth and RU allocation associated with 160 MHz, the AP 102 may share a TXOP with four P2P sessions each at a different STA 104. In such examples, the AP 102 may allocate each of the four P2P sessions a different 40 MHz portion of the 160 MHz RU allocation. Further, although described in the example of FIG. 4 as using the first frame 406-*a* and the second frame 406-*b* (two frames), the AP 102 may alternatively perform back-to-back scheduling of multiple clients in a single frame (such as a single MU-RTS TXS Trigger frame or any other scheduling, allocative, triggering, or soliciting frame). For example, the AP 102 may transmit a single frame that allocates the TXOP duration 404-*a* (and a first set of frequency resources) to the STA 104-*a* and that allocates the TXOP duration 404-*b* (and a second set of frequency resources) to the STA 104-*b*.

Additionally, or alternatively, the AP 102 may indicate a type of traffic to be transmitted via a Management frame (such as a Management frame associated with SCS or P2P resource setup) or via one or both of the first frame 406-*a* or the second frame 406-*b* (such as via a Trigger frame, such as an MU-RTS TXS Trigger frame). In some aspects, the AP 102 may transmit or otherwise convey the indication in accordance with an Access Category (AC), a Traffic Identifier (TID), or an SCS identifier (SCSID), among other indications the AP 102 may provide via a Management frame, a Trigger frame, or any other type of frame associated with TXOP sharing or resource allocation.

Figure 5:
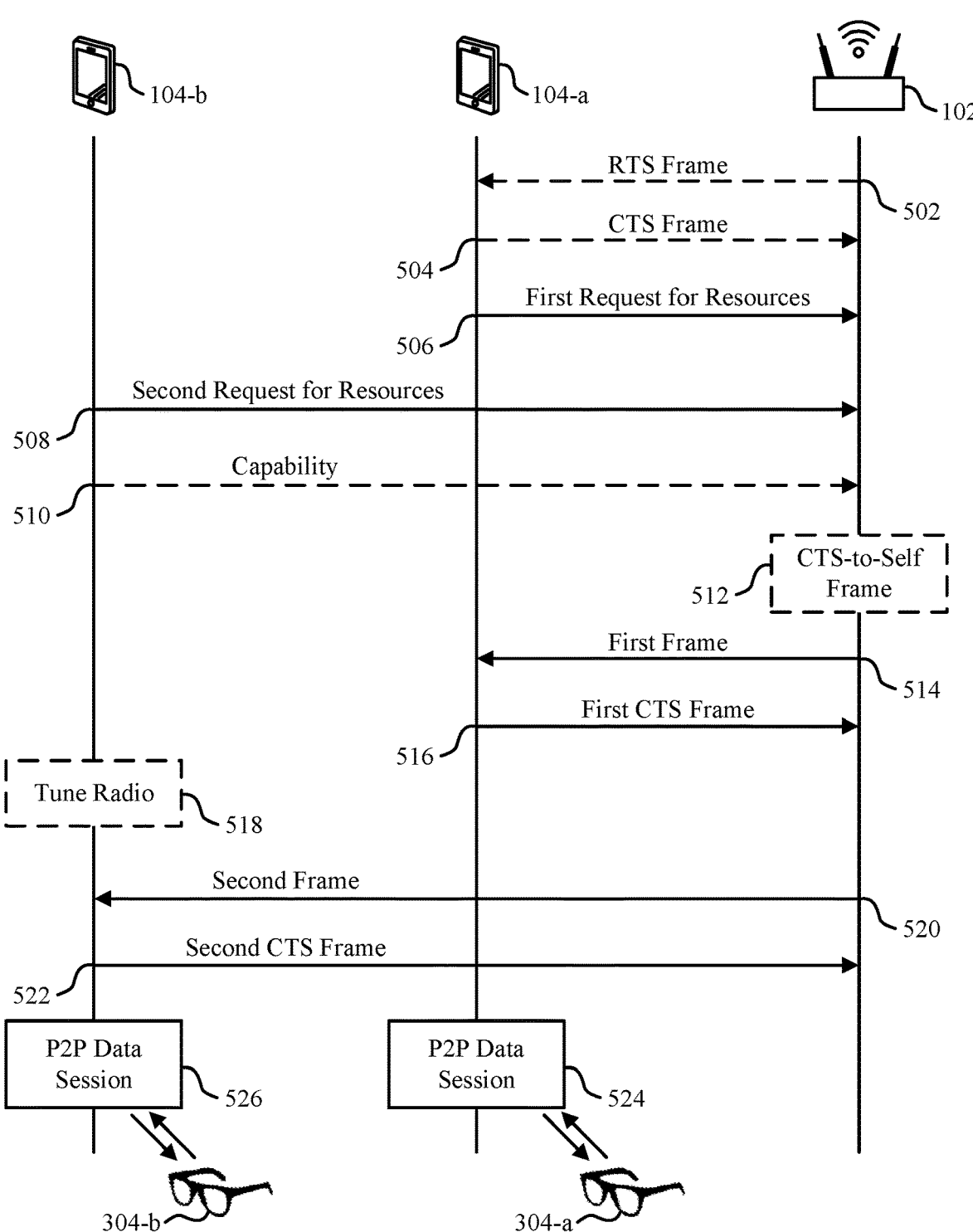
FIGS. 5-7 show example process flows that support resource allocation techniques to support multiple P2P sessions.

FIG. 5 shows an example process flow 500 that supports resource allocation techniques to support multiple P2P sessions. The process flow 500 may implement or be implemented to realize or facilitate aspects of the WLAN 100, the PPDU 250, the system deployment 300, or the TXOP sharing procedure 400, depicted in FIGS. 1, 2, 3 and 4, respectively. For example, the process flow 500 illustrates communication between an AP 102, a STA 104-*a*, and a STA 104-*b*. The AP 102 of FIG. 5 may be an example of an AP 102 as illustrated by and described with reference to FIGS. 1, 3, and 4. The STA 104-*a* and the STA 104-*b* may each be examples of STAs 104 as illustrated by and described with reference to FIGS. 1, 3, and 4, including the STA 104-*a* and the STA 104-*b*, respectively, as illustrated by and described with reference to FIGS. 3 and 4. In some aspects, the process flow 500 illustrates example signaling mechanisms (including functionalities and rules) according to which the AP 102 can allocate respective portions of an RU allocation (during a shared TXOP of the AP) to respective P2P sessions at multiple respective STAs 104.

In the following description of the process flow 500, the operations may be performed (such as reported or provided) in a different order than the order shown, or the operations performed by the example devices may be performed in different orders or at different times. Some operations also may be left out of the process flow 500, or other operations may be added to the process flow 500. Further, although some operations or signaling may be shown to occur at different times for discussion purposes, these operations may actually occur at the same time.

At 502, the AP 102 may transmit an RTS frame to the STA 104-*a*. In some implementations, the STA 104-*a* may receive the RTS frame as part of an RTS-CTS exchange (which may be referred to as an RTS-CTS handshake) before a TXS frame (such as poll frame, a Trigger frame, or any other frame useable to share a TXOP of the AP 102, including an MU-RTS TXS allocation frame) to facilitate measurement, identification, selection, or otherwise determination of bandwidth that the STA 104-*a* expects to use (or uses) for a P2P session 302-*a* at the STA 104-*a*. In some aspects, such an RTS frame transmitted at 502 may be referred to herein as a third frame. In some implementations, the frame transmitted at 502 may be an example of any Trigger frame, such as an MU RTS Trigger frame or a buffer status report poll (BSRP) Trigger frame, or some variant thereof.

At 504, the STA 104-*a* may transmit a CTS frame responsive to the RTS frame received at 502 and as part of the RTS-CTS exchange to facilitate measurement, identification, selection, or otherwise determination of a bandwidth that the STA 104-*a* expects to use (or uses) for the P2P session 302-*a* at the STA 104-*a*. For example, the AP 102 may derive a bandwidth that the STA 104-*a* uses or expects to use for the P2P session 302-*a* at the STA 104-*a* from the CTS frame and may allocate resources (from a TXOP of the AP 102) for the P2P session 302-*a* accordingly. Additionally, or alternatively, the CTS frame may include an explicit indication of the bandwidth that the STA 104-*a* expects to use (or uses) for the P2P session 302-*a*. The STA 104-*a* may include such a bandwidth indication in a frame payload or a frame header (such as via an HE variant HT Control field).

At 506, the STA 104-*a* may transmit, to the AP 102, a first request for communication resources associated with the P2P session 302-*a* (a first P2P session) at the STA 104-*a*. For example, the STA 104-*a* may activate an application at the STA 104-*a*, such as an application that involves a data transfer between the STA 104-*a* and a peer device 304-*a* via the P2P session 302-*a*, and may transmit the first request to the AP 102 for communication resources accordingly.

At 508, the STA 104-*b* may transmit, to the AP 102, a second request for communication resources associated with a P2P session 302-*b* (a second P2P session) at the STA 104-*b*. For example, the STA 104-*b* may activate an application at the STA 104-*b*, such as an application that involves a data transfer between the STA 104-*b* and a peer device 304-*b* via the P2P session 302-*b*, and may transmit the second request to the AP 102 for communication resources accordingly.

At 510, the STA 104-*b* may transmit, with the second request or via separate signaling or messaging, an indication of a capability of the STA 104-*b* to communicate via non-primary sub-channels. In some implementations, the capability of the STA 104-*b* to communicate via non-primary sub-channels may be associated with a device capability or an operational mode of the STA 104-*b*. The STA 104-*b* may indicate the operational mode via an operation mode indication and the operational mode may indicate whether the STA 104-*b* is capable of communicating via a non-primary sub-channel when the STA 104-*b* is in the operational mode. In other words, even if the STA 104-*b* is physically capable of communicating via a non-primary channel (such as includes a radio tunable to a non-primary sub-channel), a first operational mode of the STA 104-*b* may be associated with an ability to communicate via a non-primary sub-channel and a second operational mode of the STA 104-*b* may be associated with an inability to communicate via a non-primary sub-channel. In some implementations, an operational mode of the STA 104-*b* may be indicative of which sub-channels (such as which non-primary sub-channels) via which the STA 104-*b* is capable of communicating as well as a set of transmission parameters associated with different sub-channels. For example, the STA 104-*b* may indicate (via explicit signaling or via an indication of the capability or operational mode of the STA 104-*b*) a set of transmission parameters that the STA 104-*b* supports (such as is capable of using) for each set of one or more sub-channels. In an example, the STA 104-*b* may support a first set of transmission parameters for communication via a first set of one or more sub-channels and may support a second set of transmission parameters for communication via a second set of one or more sub-channels.

In some implementations, the STA 104-b may transmit, via the indication of the capability of the STA 104-b, an indication of a specific non-primary sub-channel via which the STA 104-b is available for the P2P session 302-b in accordance with a set of channel conditions. For example, the STA 104-b may perform a channel measurement or a channel scan and may indicate one or more specific non-primary sub-channels in accordance with the channel measurement or scan. In such examples, the STA 104-b may indicate one or more specific non-primary sub-channels having a lowest channel utilization or lowest RSSI value of a set of measured or scanned non-primary sub-channels. In some implementations, the STA 104-b may dynamically indicate one or more specific non-primary sub-channels in accordance with occasionally (periodically, aperiodically, or semi-persistently) performing channel measurements or scans. In such implementations, the STA 104-b may dynamically transmit the indication of the capability of the STA 104-b.

At 512, the AP 102 may transmit a CTS-to-self frame (which may be referred to as a CTS2Self frame) to occupy a full intended bandwidth. In some implementations, the AP 102 may transmit the CTS-to-self frame prior to sharing the TXOP with the STA 104-a and the STA 104-b (P2P clients) using the TXS to satisfy one or more regulatory constraints or to otherwise reserve the full intended bandwidth for the AP 102 for the TXOP (such as to preempt other devices from accessing the channel during the TXOP of the AP 102). In accordance with transmitting the CTS-to-self frame, the AP 102 may have access to the full intended bandwidth, which may include a remaining portion of bandwidth in scenarios in which an initially allocated STA (such as the STA 104-a) uses a portion (such as a subset) of an indicated bandwidth. In some implementations, the AP 102 may select, identify, ascertain, or otherwise determine the full intended bandwidth in accordance with the first and second requests for communication resources or the RTS-CTS frame exchange at 502 and 504, or in accordance with any combination thereof.

At 514, the AP 102 may transmit a first frame (such as a Trigger frame, a poll frame, a TXS frame, an MU-RTS TXS Trigger frame, or a BSRP Trigger frame, among other example frames useable to share a TXOP of the AP 102) allocating a first duration of a TXOP of the AP 102 to the STA 104-a. In some implementations, the first frame may include an indication of an RU allocation associated with the TXOP of the AP 102. For example, the first frame may indicate an RU allocation of a primary 20 MHz channel, a primary 40 MHz channel, a primary 80 MHz channel, a primary 160 MHz channel, an 80+80 MHz channel, or a 320 MHz channel. In some implementations, the list of options for the RU allocation may further include a non-primary 20 MHz channel, a non-primary 40 MHz channel, a non-primary 80 MHz channel, or a non-primary 160 MHz channel. The AP 102 may indicate the RU allocation through an RU Allocation subfield in a User Info field in the first frame (such as an MU-RTS TXS Trigger frame) that is addressed to the STA 104-a. In some aspects, the RU allocation may indicate via which channel a responsive CTS frame is expected to be transmitted or may indicate a channel span within which a responsive CTS frame may be transmitted. In other words, the first frame may indicate a sub-channel or a set of sub-channels via which the STA 104-a may respond.

Further, in some implementations, the first frame may allocate uplink resources on a first set of sub-channels and may allocate P2P resources on a second set of sub-channels. For example, the first frame may include or otherwise indicate a first RU allocation (associated with or indicative of the first set of sub-channels) for uplink communication from the STA 104-a to the AP 102 and a second RU allocation (associated with or indicative of the second set of sub-channels) for the P2P session 302-a. In such implementations, the STA 104-a may use the first set of sub-channels to transmit uplink signaling from the STA 104-a to the AP 102 (which may include uplink data associated with the P2P session 302-a) and may use the second set of sub-channels to communicate P2P data frames with the peer device 304-a. As such, the STA 104-a and the AP 102 may support some amount of traffic rendering for the P2P session 302-a behind the main AP (such as behind or upstream of the STA 104-a or behind or upstream of the AP 102).

Additionally, or alternatively, the STA 104-a may receive, via the first frame, more than one RU allocation (such as multiple RU Allocation fields). The STA 104-a may receive more than one RU allocation in accordance with a capability or an operational mode of the STA 104-a (either or both of which the STA 104-a may transmit or indicate to the AP 102, such as prior to receiving the first frame). In examples in which the STA 104-a receives more than one RU allocation, the STA 104-a may use the multiple RU allocations for the P2P session 302-a, may select and use one of the multiple RU allocations for the P2P session 302-a, or may select to use different RU allocations for different types of data traffic (such as different directions of traffic, different priorities of traffic, or traffic associated with different applications at the STA 104-a, among other examples).

At 516, the STA 104-a may transmit, via a portion of the RU allocation, a first CTS frame associated with (such as responsive to) the first frame. In some implementations, the STA 104-a may transmit the first CTS frame in response to the first frame via a subset of the allocated RU to facilitate additional TXOP sharing with one or more other STAs 104 (such as additional TXOP sharing with the STA 104-b). Additionally, or alternatively, the STA 104-a may include, in the first CTS frame (such as in a PPDU carrying the first CTS frame), an indication of a bandwidth that the STA 104-a uses (or expects to use, or will use) for the P2P session 302-a. For example, the STA 104-a may provide such a bandwidth indication in accordance with receiving a Trigger frame from the AP 102 and transmitting a response (such as the first CTS frame) including the bandwidth indication. The STA 104-a may include such a bandwidth indication in a frame payload or a frame header (such as via an HE variant HT Control field). In some implementations, indicating the bandwidth that the STA 104-a uses (or expects to use) via the CTS frame may facilitate additional TXOP sharing with one or more other STAs 104 (such as additional TXOP sharing with the STA 104-b).

At 518, the STA 104-b may tune a radio of the STA 104-b from a primary channel to a non-primary channel in accordance with an indication of the STA 104-b as a standby STA for the TXOP. For example, in some implementations, the AP 102 may indicate one or more standby STAs via the first frame to avoid hindering an intra-PPDU power save operation. Accordingly, if the STA 104-b receives, via the first frame, an indication that the STA 104-b is a standby STA for the TXOP, the STA 104-b may assume or expect that any potential resource allocation for the STA 104-b may come via a non-primary channel and may tune a radio to the non-primary channel to monitor for a frame potentially indicating a resource allocation for the STA 104-*b*.

At 520, the AP 102 may transmit a second frame (such as a TXS frame or an MU-RTS TXS Trigger frame) allocating a second duration of the TXOP of the AP 102 to the STA 104-*b*. The second frame may indicate one or more sub-channels via which the STA 104-*b* is expected to respond (with a CTS frame transmission) and, in some implementations, the second frame may indicate or allocate (via an RU Allocation subfield) resources for a responsive CTS frame (and for subsequent P2P data frames) on one or more non-primary sub-channels if the STA 104-*b* supports a corresponding capability to communicate via non-primary sub-channels. The list of options for the RU allocation may include a primary 20 MHz channel, a non-primary 20 MHz channel, a primary 40 MHz channel, a non-primary 40 MHz channel, a primary 80 MHz channel, a non-primary 80 MHz channel, a primary 160 MHz channel, a non-primary 160 MHz channel, an 80+80 MHz channel, or a 320 MHz channel. In some implementations, in accordance with a capability of the STA 104-*b* (such as in accordance with a radio tuning at the STA 104-*b*), the STA 104-*b* may be able to receive the second frame via a set of non-primary sub-channels and ignore transmissions on a primary channel (such as a primary 40 MHz channel). In some implementations, the second frame may indicate the one or more specific non-primary sub-channels indicated as available for the STA 104-*b* via the capability of the STA 104-*b* transmitted at 510.

At 522, the STA 104-*b* may transmit a second CTS frame associated with (such as responsive to) the second frame. In some implementations, the STA 104-*b* may transmit the second CTS frame via the set of one or more non-primary sub-channels indicated by the RU allocation of the second frame.

At 524, the STA 104-*a* may communicate data with the peer device 304-*a* in accordance with the P2P session 302-*a* at the STA 104-*a*. In some implementations, the STA 104-*a* may communicate the data with the peer device 304-*a* via a primary channel (such as a primary 40 MHz channel). Further, in accordance with the P2P session 302-*a*, the STA 104-*a* may transmit data to, or receive data from (such as in accordance with soliciting uplink transmissions from the peer device 304-*a* via one or more Trigger frames), the peer device 304-*a*. In some aspects, the STA 104-*a* may perform an RTS-CTS frame exchange with the peer device 304-*a* within the first duration allocated to the STA 104-*a* to protect the peer device 304-*a* (an XR glass) from a hidden node (such as from a transmission by the hidden node or otherwise from potential interference caused by the hidden node).

At 526, the STA 104-*b* may communicate data with the peer device 304-*b* in accordance with the P2P session 302-*b* at the STA 104-*b*. In some implementations, the STA 104-*b* may communicate the data with the peer device 304-*b* via a non-primary channel (such as a secondary 40 MHz channel). Further, in accordance with the P2P session 302-*b*, the STA 104-*b* may transmit data to, or receive data from (such as in accordance with soliciting uplink transmissions from the peer device 304-*b* via one or more Trigger frames), the peer device 304-*b*. In some aspects, the STA 104-*b* may perform an RTS-CTS frame exchange with the peer device 304-*b* within the first duration allocated to the STA 104-*b* to protect the peer device 304-*b* (an XR glass) from a hidden node.

In some implementations, the peer device 304-*b* may transmit a BA associated with P2P data frames on the non-primary channel (such as the secondary 40 MHz channel). In some other implementations, the STA 104-*b* may transmit one or more frames that refrain from soliciting a BA and may instead use a BA request (BAR) to receive or solicit a delayed BA via the primary channel instead of requesting the peer device 304-*b* to transmit via the non-primary channel. For example, the peer device 304-*b* may be incapable or otherwise unable to generate a PPDU in a non-primary channel and the STA 104-*b* may request a delayed BA via the primary channel accordingly. In some aspects, such a delayed BA also may relax constraints associated with primary channel alignment among the peer device 304-*a* and the peer device 304-*b* (such as among XR glasses).

Additionally, or alternatively, the AP 102 may measure, identify, select, ascertain, or otherwise determine a bandwidth used by one or both of the STA 104-*a* or the STA 104-*b* using (subsequent) P2P data frames sent by the one or both of the STA 104-*a* or the STA 104-*b*. For example, the AP 102 may measure a bandwidth used by P2P data frames exchanged as part of the P2P session 302-*a* between the STA 104-*a* and the peer device 304-*a* and, if the measured bandwidth is less than a full RU allocation, the AP 102 may additionally share a TXOP with the STA 104-*b* and allocate the STA 104-*b* with at least a portion of a remainder of the RU allocation.

Figure 6:
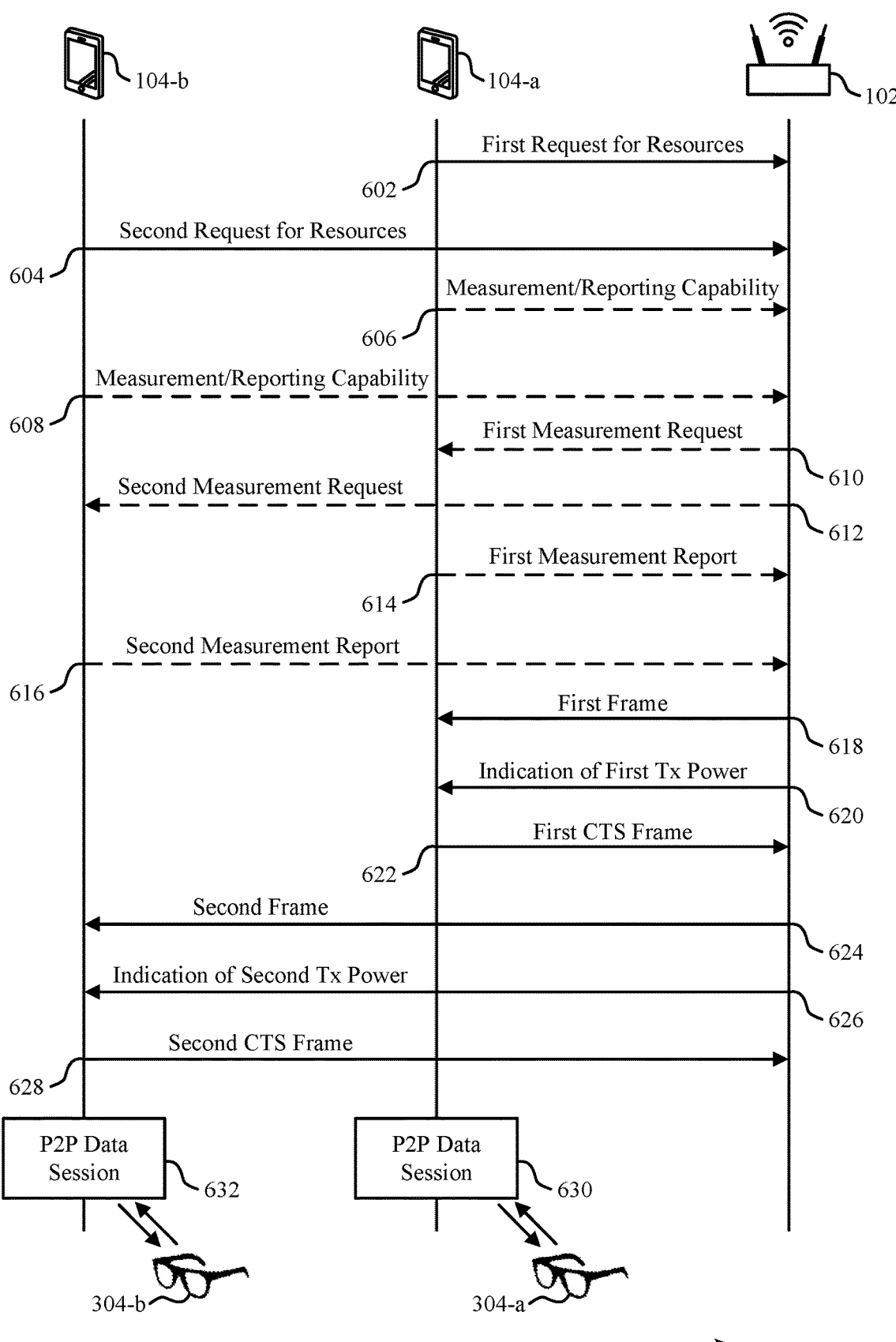

FIG. 6 shows an example process flow 600 that supports resource allocation techniques to support multiple P2P sessions. The process flow 600 may implement or be implemented to realize or facilitate aspects of the WLAN 100, the PPDU 250, the system deployment 300, the TXOP sharing procedure 400, or the process flow 500, depicted in FIGS. 1, 2, 3, 4, and 5, respectively. For example, the process flow 600 illustrates communication between an AP 102, a STA 104-*a*, and a STA 104-*b*. The AP 102 of FIG. 6 may be an example of an AP 102 as illustrated by and described with reference to FIGS. 1 and 3-5. The STA 104-*a* and the STA 104-*b* may each be examples of STAs 104 as illustrated by and described with reference to FIGS. 1 and 3-5, including the STA 104-*a* and the STA 104-*b*, respectively, as illustrated by and described with reference to FIGS. 3-5. In some aspects, the process flow 600 illustrates example signaling mechanisms (including functionalities and rules) according to which the AP 102 can use transmit power control to facilitate simultaneous TXOP sharing across multiple STAs 104 (such as sharing across both the STA 104-*a* and the STA 104-*b*).

In the following description of the process flow 600, the operations may be performed (such as reported or provided) in a different order than the order shown, or the operations performed by the example devices may be performed in different orders or at different times. Some operations also may be left out of the process flow 600, or other operations may be added to the process flow 600. Further, although some operations or signaling may be shown to occur at different times for discussion purposes, these operations may actually occur at the same time.

At 602, the STA 104-*a* may transmit, to the AP 102, a first request for communication resources associated with the P2P session 302-*a* (a first P2P session) at the STA 104-*a*. For example, the STA 104-*a* may activate an application at the STA 104-*a*, such as an application that involves a data transfer between the STA 104-*a* and a peer device 304-*a* via the P2P session 302-*a*, and may transmit the first request to the AP 102 for communication resources accordingly.

At 604, the STA 104-*b* may transmit, to the AP 102, a second request for communication resources associated with a P2P session 302-*b* (a second P2P session) at the STA 104-*b*. For example, the STA 104-*b* may activate an application at the STA 104-*b*, such as an application that involves a data transfer between the STA 104-*b* and a peer device 304-*b* via the P2P session 302-*b*, and may transmit the second request to the AP 102 for communication resources accordingly.

At 606, the STA 104-*a* may transmit, to the AP 102, an indication of a capability of the STA 104-*a* to measure and report a channel metric associated with transmissions by other STAs 104 (such as the STA 104-*b*). In some implementations, the capability may be for measuring and reporting a channel metric associated with other P2P sessions at other STAs 104 (such as the P2P session 302-*b* at the STA 104-*b*).

At 608, the STA 104-*b* may transmit, to the AP 102, an indication of a capability of the STA 104-*b* to measure and report a channel metric associated with transmissions by other STAs 104 (such as the STA 104-*a*). In some implementations, the capability may be for measuring and reporting a channel metric associated with other P2P sessions at other STAs 104 (such as the P2P session 302-*a* at the STA 104-*a*).

At 610, the AP may transmit, to the STA 104-*a*, a first measurement request. In some implementations, the first measurement request may indicate a channel metric associated with transmissions by other STAs 104 (such as the STA 104-*b*) to be measured and reported by the STA 104-*a*. In some implementations, the AP 102 may request the STA 104-*a* (in accordance with the STA 104-*a* requesting communication resources for the P2P session 302-*a*) to measure a received signal strength or quality (such as RSSI) or estimated pathloss value from transmissions of other STAs identified by a MAC address or AID value. For example, the first measurement request may include a MAC address or AID value (such as a value indicated by an AID12 subfield, which may be a value between 1 and 2007) corresponding to the STA 104-*b* to request the STA 104-*a* to measure and report a channel metric associated with transmissions by the STA 104-*b*. In some aspects, the AP 102 may request the measurement and reporting in accordance with a stream classification service (SCS) agreement with a direct link.

At 612, the AP may transmit, to the STA 104-*b*, a second measurement request. In some implementations, the second measurement request may indicate a channel metric associated with transmissions by other STAs 104 (such as the STA 104-*a*) to be measured and reported by the STA 104-*b*. In some implementations, the AP 102 may request the STA 104-*b* (in accordance with the STA 104-*b* requesting communication resources for the P2P session 302-*b*) to measure a received signal strength or quality (such as RSSI) or estimated pathloss value from transmissions of other STAs identified by a MAC address or AID value. For example, the second measurement request may include a MAC address or AID value corresponding to the STA 104-*a* to request the STA 104-*b* to measure and report a channel metric associated with transmissions by the STA 104-*a*. In some aspects, the AP 102 may request the measurement and reporting in accordance with an SCS agreement with a direct link.

At 614, the STA 104-*a* may transmit, to the AP 102, a first measurement report associated with (such as in response to) the first measurement request, the first measurement report indicating the channel metric requested to be measured and reported by the AP 102. In some implementations, the STA 104-*a* may measure one or more transmissions by the STA 104-*b* to obtain a value for the channel metric.

At 616, the STA 104-*b* may transmit, to the AP 102, a second measurement report associated with (such as in response to) the second measurement request, the second measurement report indicating the channel metric requested to be measured and reported by the AP 102. In some implementations, the STA 104-*b* may measure one or more transmissions by the STA 104-*a* to obtain a value for the channel metric.

At 618, the AP 102 may transmit a first frame (such as a TXS frame or an MU-RTS TXS Trigger frame) allocating a first duration of a TXOP of the AP 102 to the STA 104-*a*. In some implementations, the first frame may include an indication of an RU allocation associated with the TXOP of the AP 102. For example, the first frame may indicate an RU allocation of a primary 20 MHz channel, a non-primary 20 MHz channel, a primary 40 MHz channel, a non-primary 40 MHz channel, a primary 80 MHz channel, a non-primary 80 MHz channel, a primary 160 MHz channel, a non-primary 160 MHz channel, an 80+80 MHz channel, or a 320 MHz channel. The AP 102 may indicate the RU allocation through an RU Allocation subfield in a User Info field in the first frame (such as an MU-RTS TXS Trigger frame) that is addressed to the STA 104-*a*. In some aspects, the RU allocation may indicate via which channel a responsive CTS frame is expected to be transmitted or may indicate a channel span within which a responsive CTS frame may be transmitted. In other words, the first frame may indicate a sub-channel or a set of sub-channels via which the STA 104-*a* may respond.

At 620, the AP 102 may transmit, to the STA 104-*a*, an indication of a first transmit power for the P2P session 302-*a* during the TXOP of the AP 102. In some implementations, the AP 102 may calculate, compute, identify, select, or otherwise determine the first transmit power in accordance with one or both of the first measurement report or the second measurement report. In such implementations, the AP 102 may calculate, compute, identify, select, or otherwise determine the first transmit power such that a target SINR (such as an acceptable SINR) is maintained for the P2P session 302-*a* regardless of (or in accordance with) a potential sharing of the TXOP (and the corresponding RU allocation) with another P2P session at another STA 104 (such as the P2P session 302-*b* at the STA 104-*b*). The AP 102 may transmit the indication of the first transmit power via the first frame or via separate signaling or messaging associated with allocating resources to the STA 104-*a*.

At 622, the STA 104-*a* may transmit a first CTS frame associated with (such as responsive to) the first frame. In some aspects, the STA 104-*a* may transmit the first CTS frame to successfully complete the TXOP sharing with the AP 102.

At 624, the AP 102 may transmit a second frame (such as a TXS frame or an MU-RTS TXS Trigger frame) allocating a second duration of a TXOP of the AP 102 to the STA 104-*b*, the second duration at least partially overlapping in time with the first duration. In some implementations, the second frame may include an indication of the RU allocation associated with the TXOP of the AP 102. For example, the second frame may indicate an RU allocation of a primary 20 MHz channel, a non-primary 20 MHz channel, a primary 40 MHz channel, a non-primary 40 MHz channel, a primary 80 MHz channel, a non-primary 80 MHz channel, a primary 160 MHz channel, a non-primary 160 MHz channel, an 80+80 MHz channel, or a 320 MHz channel. The AP 102 may indicate the RU allocation through an RU Allocation subfield in a User Info field in the second frame (such as an MU-RTS TXS Trigger frame) that is addressed to the STA 104-*b*. In some aspects, the RU allocation may indicate via which channel a responsive CTS frame is expected to be transmitted or may indicate a channel span within which a responsive CTS frame may be transmitted. In other words, the first frame may indicate a sub-channel or a set of sub-channels via which the STA 104-*b* may respond.

At 626, the AP 102 may transmit, to the STA 104-*b*, an indication of a second transmit power for the P2P session 302-*b* during the TXOP of the AP 102. In some implementations, the AP 102 may calculate, compute, identify, select, or otherwise determine the second transmit power in accordance with one or both of the first measurement report or the second measurement report. In such implementations, the AP 102 may calculate, compute, identify, select, or otherwise determine the second transmit power such that a target SINR (such as an acceptable SINR) is maintained for the P2P session 302-*b* regardless of (or in accordance with) a potential sharing of the TXOP (and the corresponding RU allocation) with another P2P session at another STA 104 (such as the P2P session 302-*a* at the STA 104-*a*). The AP 102 may transmit the indication of the second transmit power via the second frame or via separate signaling or messaging associated with allocating resources to the STA 104-*b*.

At 628, the STA 104-*b* may transmit a second CTS frame associated with (such as responsive to) the second frame. In some aspects, the STA 104-*b* may transmit the second CTS frame to successfully complete the TXOP sharing with the AP 102.

At 630, the STA 104-*a* may communicate data with the peer device 304-*a* in accordance with the P2P session 302-*a* at the STA 104-*a* and in accordance with (such as using) the first transmit power. In some implementations, the STA 104-*a* may communicate the data with the peer device 304-*a* via a primary channel (such as a primary 40 MHz channel) or a non-primary channel (such as a secondary 40 MHz channel). Further, in accordance with the P2P session 302-*a*, the STA 104-*a* may transmit data to, or receive data from (such as in accordance with soliciting uplink transmissions from the peer device 304-*a* via one or more Trigger frames), the peer device 304-*a*.

At 632, the STA 104-*b* may communicate data with the peer device 304-*b* in accordance with the P2P session 302-*b* at the STA 104-*b* and in accordance with (such as using) the second transmit power. In some implementations, the STA 104-*b* may communicate the data with the peer device 304-*b* via a primary channel (such as a primary 40 MHz channel) or a non-primary channel (such as a secondary 40 MHz channel). Further, in accordance with the P2P session 302-*b*, the STA 104-*a* may transmit data to, or receive data from (such as in accordance with soliciting uplink transmissions from the peer device 304-*b* via one or more Trigger frames), the peer device 304-*b*. Further, in accordance with the STA 104-*a* using the first transmit power and the STA 104-*b* using the second transmit power, the STA 104-*a* and the STA 104-*b* may use a same resource allocation without contributing greater than a threshold amount of interference to each other (such as while maintaining target or acceptable SINRs in both the P2P session 302-*a* and the P2P session 302-*b*).

Figure 7:
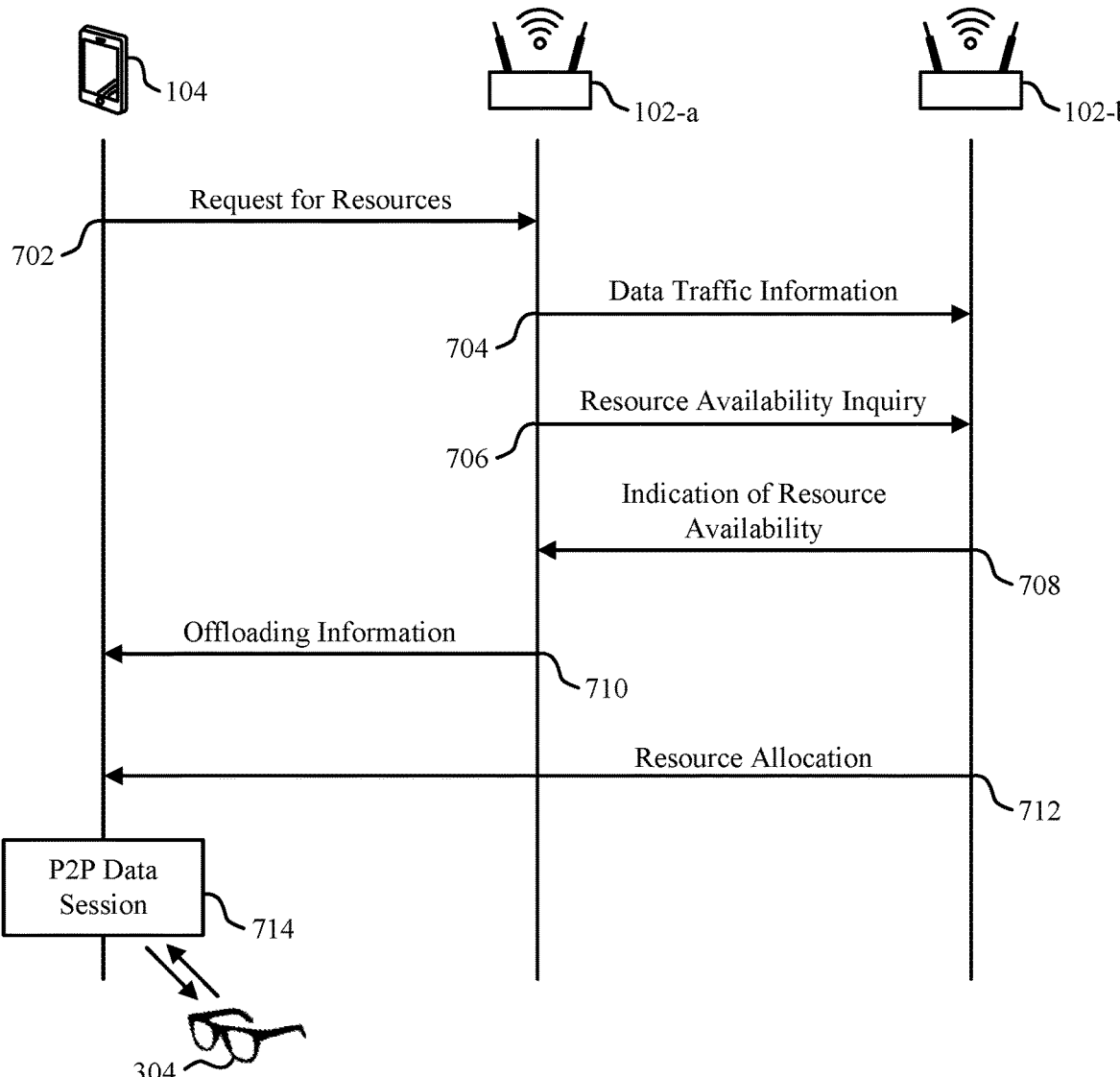

FIG. 7 shows an example process flow 700 that supports resource allocation techniques to support multiple P2P sessions. The process flow 700 may implement or be implemented to realize or facilitate aspects of the WLAN 100, the PPDU 250, the system deployment 300, the TXOP sharing procedure 400, the process flow 500, or the process flow 600, depicted in FIGS. 1, 2, 3, 4, 5, and 6, respectively. For example, the process flow 700 illustrates communication between an AP 102-*a*, an AP 102-*b*, and a STA 104. The AP 102-*a* and the AP 102-*b* of FIG. 6 may be examples of an AP 102 as illustrated by and described with reference to FIGS.

1 and 3-6. The STA 104 may be an example of a STA 104 as illustrated by and described with reference to FIGS. 1 and 3-6, including any one of the STA 104-*a* or the STA 104-*b* as illustrated by and described with reference to FIGS. 3-6.

In some aspects, the process flow 700 illustrates example signaling mechanisms (including functionalities and rules) according to which the AP 102-*a* (which may be associated with a first BSS) can offload the STA 104 to the AP 102-*b* (which may be associated with a second BSS) in accordance with relative resource availabilities at the AP 102-*a* and the AP 102-*b*. For example, the process flow 700 may support multi-BSS P2P resource grants.

In the following description of the process flow 700, the operations may be performed (such as reported or provided) in a different order than the order shown, or the operations performed by the example devices may be performed in different orders or at different times. Some operations also may be left out of the process flow 700, or other operations may be added to the process flow 700. Further, although some operations or signaling may be shown to occur at different times for discussion purposes, these operations may actually occur at the same time.

At 702, the STA 104 may transmit, to the AP 102-*a*, a request for communication resources associated with a P2P session at the STA 104. For example, the STA 104 may activate an application at the STA 104, such as an application that involves a data transfer between the STA 104 and a peer device 304 via the P2P session, and may transmit the request to the AP 102 for communication resources accordingly.

In some implementations, the STA 104 may transmit information associated with data traffic constraints of the STA 104 to the AP 102-*a* via the request or via separate signaling or messaging. The information associated with the data traffic constraints may include QoS information or MLO operation information, or both. The QoS information may include SCS agreement information. The MLO operation information may include channel information related to any operational parameters or capabilities associated with enabling MLO, which may include parameters or capabilities associated with non-simultaneous transmit and receive (NSTR) operation, (enhanced) multi-link single radio (MLSR) operation, or (enhanced) multi-link multi-radio (MLMR) operation. In some aspects, the STA 104 may transmit such MLO operation information via dedicated control frames prior to data transmission.

At 704, the AP 102-*a* may transmit, to the AP 102-*b* as part of a resource sharing between the AP 102-*a* and the AP 102-*b*, the information associated with the data traffic constraints of the STA 104. For example, additional information related to resource negotiation between the AP 102-*a* and the AP 102-*b* and STA-specific constraints may be shared directly between the AP 102-*a* and the AP 102-*b* by supporting frames for AP-to-AP resource sharing. The information associated with the data traffic constraints may include QoS information or MLO operation information, or both. The QoS information may include SCS agreement information. The MLO operation information may include channel information related to any operational parameters or capabilities associated with enabling MLO, which may include parameters or capabilities associated with NSTR operation, (enhanced) MLSR operation, or (enhanced) MLMR operation. Further, the MLO information may include information associated with multiple generations or versions of MLO (such as an indication of which generation or version of MLO the STA 104 supports).

Additionally, or alternatively, the MLO information may include information associated with a device configuration of the STA 104, including, for example, information relating to a quantity of interfaces the STA 104 supports (such as a quantity of STA interfaces in examples in which the STA 104 is or functions as a non-AP MLD), a quantity of antennas or radios of the STA 104, or other device configuration information that may be associated with MLO at the STA 104.

At 706, the AP 102-*a* may transmit, to the AP 102-*b*, a resource availability inquiry in accordance with the request for communication resources associated with the P2P session at the STA 104. At 708, the AP 102-*b* may transmit, to the AP 102-*a*, an indication of the resource availability at the AP 102-*b* in accordance with receiving the resource availability inquiry. For example, different APs 102 may have different resource requests for P2P in respective BSSs, in addition to uplink and downlink transmissions, and an AP 102 (such as the AP 102-*a*) may sometimes have an insufficient amount of resources to satisfy a request for communication resources for a P2P session.

As such, in scenarios in which the AP 102-*a* has an insufficient amount of resources for the P2P session requested by the STA 104, the AP 102-*a* may coordinate with the AP 102-*b* (a friendly AP) on resource availability. In other words, the AP 102-*a* may inquire on whether the AP 102-*b* has relatively more P2P resources available than the AP 102-*a*. If so, the AP 102-*a* may offload one or more P2P resource requests (including the request from the STA 104) to the AP 102-*b*. In some implementations, the AP 102-*a* (the associated AP of the STA 104 that requests P2P resources) may offload the STA 104 to the AP 102-*b* using a channel usage framework.

At 710, for example, the AP 102-*a* may transmit, to the STA 104, information indicative of an offloading of the STA 104 from the AP 102-*a* to the AP 102-*b* in accordance with the resource availability of the AP 102-*b* (such as in accordance with the AP 102-*b* having a relatively greater amount of available P2P resources than the AP 102-*a*). In accordance with a channel usage framework or another offloading or steering mechanism, transmitting the information indicative of the offloading may include providing channel and BSSID information of the AP 102-*b* or by providing TWT allocation information (such as an off-channel TWT allocation or a P2P TWT allocation, or both). Additionally, or alternatively, the information indicative of the offloading may include an indication of an AID value that the AP 102-*b* will use to address the STA 104. For example, the AP 102-*a* may indicate, to the STA 104, an AID value that the AP 102-*b* will use to send a P2P resource allocation and any related frames (such as any related polling frames) to the STA 104. Such polling frames may be an MU-RTS TXS Trigger frame or a BSRP Trigger frame. Further, the indicated AID value may not be limited to being a duplicate of an existing AID value in a BSS of the AP 102-*b*.

At 712, the AP 102-*b* may transmit, to the STA 104, an indication of a resource allocation for the P2P session at the STA 104. In some implementations, the AP 102-*b* may transmit the indication of the resource allocation via a TXS frame, such as an MU-RTS TXS Trigger frame. The STA 104 may receive the indication of the resource allocation in accordance with the indicated channel and BSSID information of the AP 102-*b*, the indicated TWT allocation (such as the indicated off-channel or P2P TWT allocation), or the indicated AID value that the AP 102-*b* will use to address the STA 104, or any combination thereof.

At 714, the STA 104 may communicate data with the peer device 304 in accordance with the P2P session at the STA 104. In some implementations, the STA 104 may communicate the data with the peer device 304 via a primary channel (such as a primary 40 MHz channel) or a non-primary channel (such as a secondary 40 MHz channel). Further, in accordance with the P2P session, the STA 104 may transmit data to, or receive data from (such as in accordance with soliciting uplink transmissions from the peer device 304 via one or more Trigger frames), the peer device 304.

Figure 8:
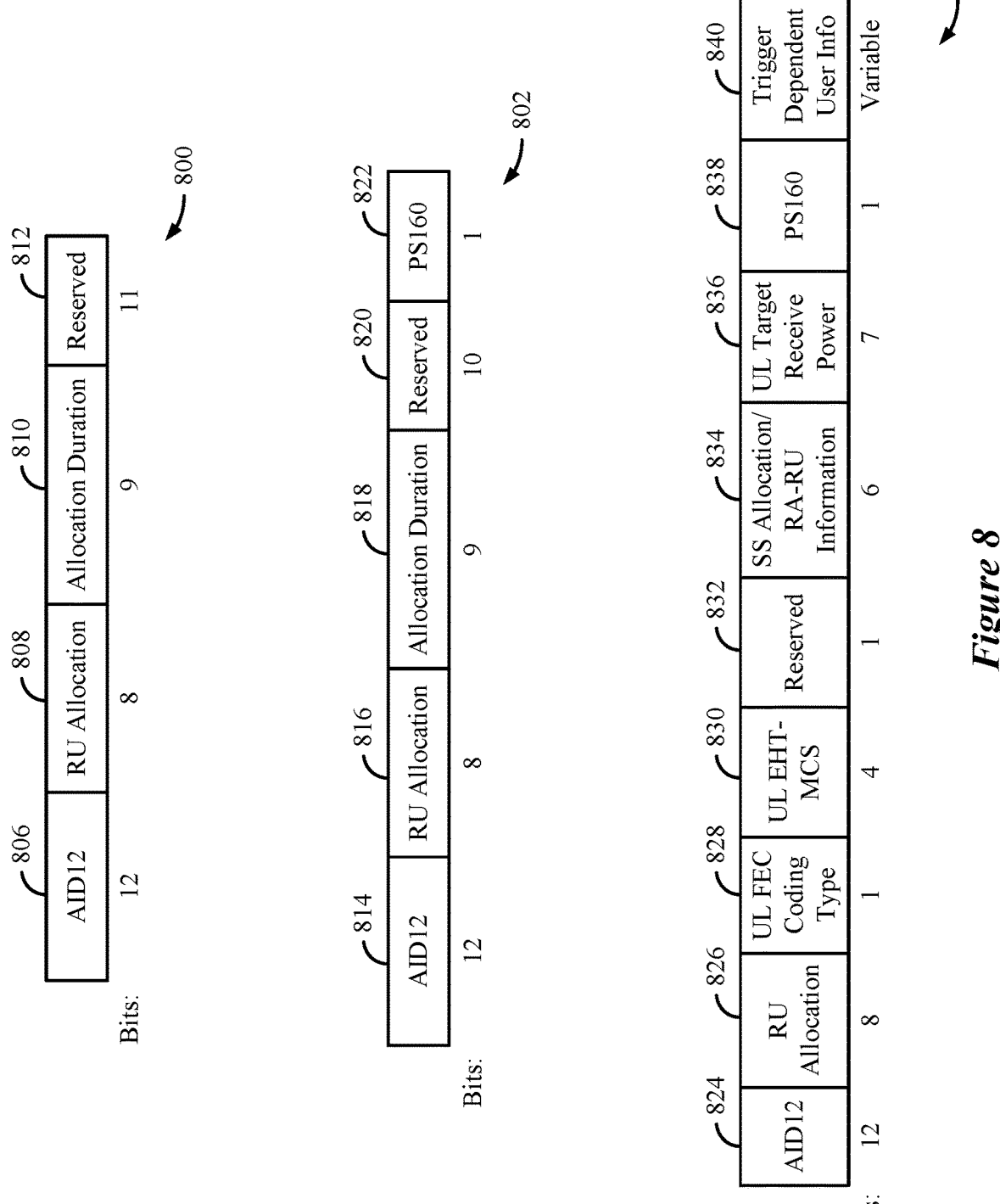
FIG. 8 shows example frame formats that support resource allocation techniques to support multiple P2P sessions.

FIG. 8 shows example frame formats 800, 802, and 804 that supports resource allocation techniques to support multiple P2P sessions. The frame formats 800, 802, and 804 may be implemented to realize or facilitate aspects of the WLAN 100, the PPDU 250, the system deployment 300, the TXOP sharing procedure 400, the process flow 500, the process flow 600, or the process flow 700, depicted in FIGS. 1, 2, 3, 4, 5, 6, and 7, respectively. For example, the frame formats 800, 802, and 804 may be examples of different variants of Trigger frames, such as MU-RTS TXS Trigger frames. In some implementations, an AP 102 may share a TXOP of the AP 102 with multiple STAs 104 by transmitting frames associated with (such as having a format similar to) the frame formats 800, 802, and 804.

The frame format 800 includes an AID12 subfield 806, an RU Allocation subfield 808, an Allocation Duration subfield 810, and a set of reserved bits 812. The frame format 800 may be an example of an HE variant User Info field format in the MU-RTS TXS Trigger frame. The frame format 802 includes an AID12 subfield 814, an RU Allocation subfield 816, an Allocation Duration subfield 818, a set of reserved bits 820, and a PS160 subfield 822. The frame format 802 may be an example of an EHT variant User Info field format in the MU-RTS TXS Trigger frame. In some aspects, the Allocation Duration subfield 818 in the User Info field of the MU-RTS TXS Trigger frame may indicate a time duration allocated to a STA 104 within the TXOP obtained by the AP 102 (such as in units of 16 microseconds). An UL Bandwidth (BW) subfield in a Common Info field, along with an UL BW Extension subfield in a Special User Info field (if present) may indicate a bandwidth of the PPDU carrying the MU-RTS Trigger frame.

The frame format 804 includes an AID12 subfield 824, an RU Allocation subfield 826, an uplink (UL) Forward Error Correction (FEC) Coding Type subfield 828, an UL EHT-Modulation and Coding Scheme (MCS) subfield 830, a set of reserved bits 832, a Synchronization Signal (SS) Allocation/Random Access (RA)/RU Information subfield 834, an UL Target Receive Power subfield 836, a PS160 subfield 838, and a Trigger Dependent User Info subfield 840. The frame format 804 may be an example of an EHT variant User info field format in an MU-RTS Trigger frame for various bandwidths. In some aspects, the RU Allocation subfield 826 in the User Info field addressed to the STA 104 may indicate whether a CTS frame is transmitted on a primary 20 MHz channel, a primary 40 MHz channel, a primary 80 MHz channel, a primary 160 MHz channel, an 80+80 MHz channel (for HE operation), a 320 MHz channel, or a 320 MHz+320 MHz channel, among other potential channel or parameter configurations that may be relevant for an RU allocation to a client. Further, in accordance with the implementations described herein, an RU Allocation subfield may indicate whether a CTS frame is transmitted on a primary 20 MHz channel, a non-primary 20 MHz channel, a primary 40 MHz channel, a non-primary 40 MHz channel, a primary 80 MHz channel, a non-primary 80 MHz channel, a primary 160 MHz channel, a non-primary 160 MHz channel, an 80+80 MHz channel, or a 320 MHz channel.

An MU-RTS TXS Trigger frame, or any other frames that an AP 102 and a STA 104 may exchange to support TXOP sharing between the AP and the STA 104, may be associated with various fields that may be interpreted (such as decoded) in specified manners. For example, if any non-AP EHT STA 104 is addressed in an MU-RTS Trigger frame from an EHT AP 102 and any of a set of conditions is met, the User Info field addressed to an EHT STA in the MU-RTS Trigger frame may be an EHT variant User Info field. Such a set of conditions may include the bandwidth of the PPDU carrying the MU-RTS Trigger frame being 320 MHz or the PPDU carrying the MU-RTS Trigger frame being punctured.

In some aspects, an UL BW subfield in the Common Info field may indicate the bandwidth of the PPDU carrying the MU-RTS Trigger frame. In some aspects, the Triggered TXOP Sharing Mode subfield in the Common Info field may be set to a nonzero value if the MU-RTS Trigger frame is sent by an EHT AP 102 that intends to allocate time within an obtained TXOP to an associated non-AP EHT STA 104 for transmitting one or more non-TB PPDUs sequentially. An EHT AP 102 and a non-AP EHT STA 104 may support a defined encoding mechanism for Triggered TXOP Sharing Mode subfield encoding. In some aspects, the UL HE-MCS, UL FEC Coding Type, UL DCM, SS Allocation/RA-RU Information and UL Target Receive Power subfields in the HE variant User Info field may be reserved in an MU-RTS frame that is not an MU-RTS TXS frame. Additionally, or alternatively, the UL EHT-MCS, UL FEC Coding Type, SS Allocation/RA-RU Information, and UL Target Receive Power subfields in the EHT variant User Info field may be reserved in an MU-RTS frame that is not an MU-RTS TXS frame.

Figure 9:
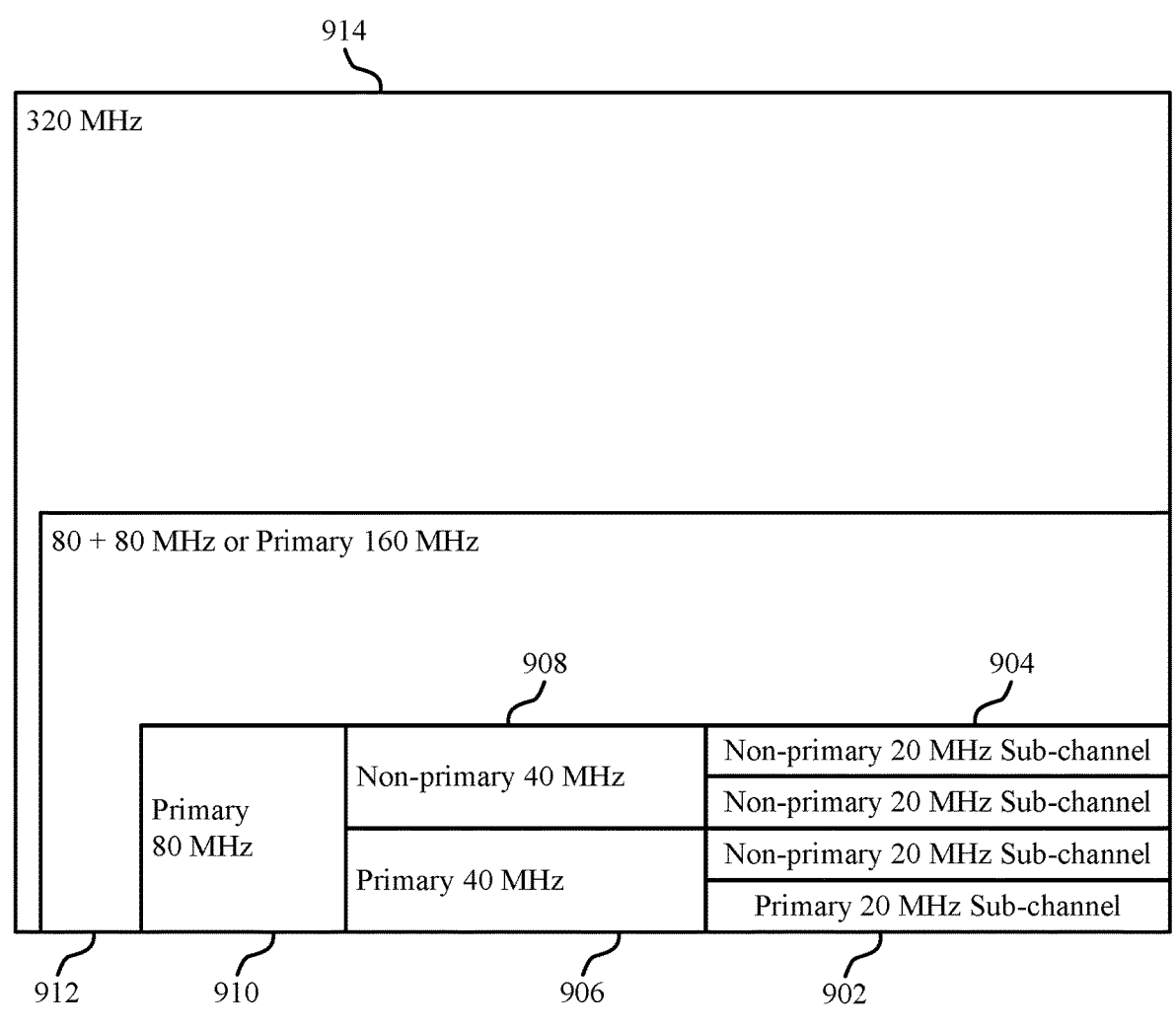
FIG. 9 shows an example resource grid that supports resource allocation techniques to support multiple P2P sessions.

FIG. 9 shows an example resource grid 900 that supports resource allocation techniques to support multiple P2P sessions. The resource grid 900 may be implemented to realize or facilitate aspects of the WLAN 100, the PPDU 250, the system deployment 300, the TXOP sharing procedure 400, the process flow 500, the process flow 600, the process flow 700, or the frame formats 800, 802, and 804, depicted in FIGS. 1, 2, 3, 4, 5, 6, 7, and 8, respectively. For example, the resource grid 900 illustrates an example resource allocation breakdown between primary channels and non-primary channels (which may be referred to as secondary channels). In accordance with the implementations described herein, an AP 102 and a STA 104 may support TXOP sharing that leverages communication via one or more non-primary channels.

As illustrated in the example of FIG. 9, the resource grid 900 includes a primary 20 MHz sub-channel 902 and a remainder of the 20 MHz sub-channels may be referred to as non-primary 20 MHz sub-channels 904. In the example of the resource grid 900, the primary 20 MHz sub-channel 902 may represent a lowest 20 MHz sub-channel of an RU allocation, although a primary 20 MHz sub-channel may generally occupy any 20 MHz sub-channel of an RU allocation. A 40 MHz channel including the primary 20 MHz sub-channel 902 may be referred to as a primary 40 MHz channel 906. A 40 MHz channel excluding the primary 20 MHz sub-channel (and only including non-primary 20 MHz sub-channels 904) may be referred to as a non-primary 40 MHz channel 908.

Similarly, an 80 MHz channel including the primary 20 MHz sub-channel 902 may be referred to as a primary 80 MHz channel 910. An 80 MHz channel excluding the primary 20 MHz sub-channel 902 (and only including non-primary 20 MHz sub-channels 904) may be referred to as a non-primary 80 MHz channel. Likewise, a 160 MHz channel including the primary 20 MHz sub-channel 902 may be referred to as a primary 160 MHz channel 912 (or an 80+80 MHz channel). A 160 MHz channel excluding the primary 20 MHz sub-channel 902 (and only including non-primary 20 MHz sub-channels 904) may be referred to as a non-primary 160 MHz channel. In some aspects, a largest available bandwidth may include a 320 MHz channel 914. In accordance with some example implementations described herein, an RU Allocation subfield of a TXS frame may indicate a channel from a list of options including a primary 20 MHz sub-channel 902, a non-primary 20 MHz sub-channel 904, a primary 40 MHz channel 906, a non-primary 40 MHz channel 908, a primary 80 MHz channel 910, a non-primary 80 MHz channel, a primary 160 MHz channel 912, a non-primary 160 MHz channel, an 80+80 MHz channel, or a 320 MHz channel 914.

FIG. 10 shows a flowchart illustrating an example process 1000 performable at a wireless AP that supports resource allocation techniques to support multiple P2P sessions. The operations of the process 1000 may be implemented by an AP or its components as described herein. For example, the process 1000 may be performed by a wireless communication device, such as the wireless communication device 1500 described with reference to FIG. 15, operating as or within a wireless AP. In some implementations, the process 1000 may be performed by a wireless AP, such as one of the APs 102 described with reference to FIG. 1.

In some implementations, in block 1002, the wireless AP may receive a first request, from a first wireless STA, for communication resources associated with a first P2P session and a second request, from a second wireless STA, for communication resources associated with a second P2P session.

In some implementations, in block 1004, the wireless AP may transmit, in accordance with the first request and the second request, a first frame allocating a first duration of a TXOP of the wireless AP to the first wireless STA and a second frame allocating a second duration of the TXOP of the wireless AP to the second wireless STA, the first duration and the second duration at least partially overlapping.

FIG. 11 shows a flowchart illustrating an example process 1100 performable at a wireless AP that supports resource allocation techniques to support multiple P2P sessions. The operations of the process 1100 may be implemented by an AP or its components as described herein. For example, the process 1100 may be performed by a wireless communication device, such as the wireless communication device 1500 described with reference to FIG. 15, operating as or within a wireless AP. In some implementations, the process 1100 may be performed by a wireless AP, such as one of the APs 102 described with reference to FIG. 1.

In some implementations, in block 1102, a first wireless AP may transmit, to a second wireless AP associated with a second BSS, a resource availability inquiry.

In some implementations, in block 1104, the first wireless AP may transmit, to a wireless STA associated with the first BSS of the first wireless AP, information indicative of an offloading of the wireless STA from the first wireless AP to the second wireless AP in accordance with a resource availability at the second wireless AP.

FIG. 12 shows a flowchart illustrating an example process 1200 performable at a wireless AP that supports resource allocation techniques to support multiple P2P sessions. The operations of the process 1200 may be implemented by an AP or its components as described herein. For example, the process 1200 may be performed by a wireless communication device, such as the wireless communication device 1500 described with reference to FIG. 15, operating as or within a wireless AP. In some implementations, the process 1200 may be performed by a wireless AP, such as one of the APs 102 described with reference to FIG. 1.

In some implementations, in block 1202, a second wireless AP may transmit, to a first wireless AP from the second wireless AP, an indication of a resource availability at the second wireless AP.

In some implementations, in block 1204, the second wireless AP may transmit, to a wireless STA, a resource allocation for a P2P session at the wireless STA in accordance with an offloading of the wireless STA from the first wireless AP to the second wireless AP.

FIG. 13 shows a flowchart illustrating an example process 1300 performable at a wireless STA that supports resource allocation techniques to support multiple P2P sessions. The operations of the process 1300 may be implemented by a wireless STA or its components as described herein. For example, the process 1300 may be performed by a wireless communication device, such as the wireless communication device 1600 described with reference to FIG. 16, operating as or within a wireless STA. In some implementations, the process 1300 may be performed by a wireless STA, such as one of the STAs 104 described with reference to FIG. 1.

In some implementations, in block 1302, a first wireless STA may transmit, to a wireless AP, a request for communication resources associated with a first P2P session at the first wireless STA.

In some implementations, in block 1304, the first wireless STA may receive, in accordance with the request, a frame allocating a duration of a TXOP of the wireless AP to the first wireless STA.

In some implementations, in block 1306, the first wireless STA may share the TXOP of the wireless AP with a second P2P session at a second wireless STA.

In some implementations, in block 1308, the first wireless STA may communicate, in accordance with sharing the TXOP, data associated with the first P2P session with a peer device for the duration of the TXOP.

FIG. 14 shows a flowchart illustrating an example process 1400 performable at a wireless STA that supports resource allocation techniques to support multiple P2P sessions. The operations of the process 1400 may be implemented by a wireless STA or its components as described herein. For example, the process 1400 may be performed by a wireless communication device, such as the wireless communication device 1600 described with reference to FIG. 16, operating as or within a wireless STA. In some implementations, the process 1400 may be performed by a wireless STA, such as one of the STAs 104 described with reference to FIG. 1.

In some implementations, in block 1402, the wireless STA may receive, from a first wireless AP associated with a first BSS, information indicative of an offloading of the wireless STA from the first wireless AP to a second wireless AP in accordance with a resource availability at the second wireless AP, the second wireless AP being associated with a second BSS.

In some implementations, in block 1404, the wireless STA may receive, from the second wireless AP, a resource allocation for a P2P session at the wireless STA in accordance with the offloading of the wireless STA from the first wireless AP to the second wireless AP.

Figure 15:
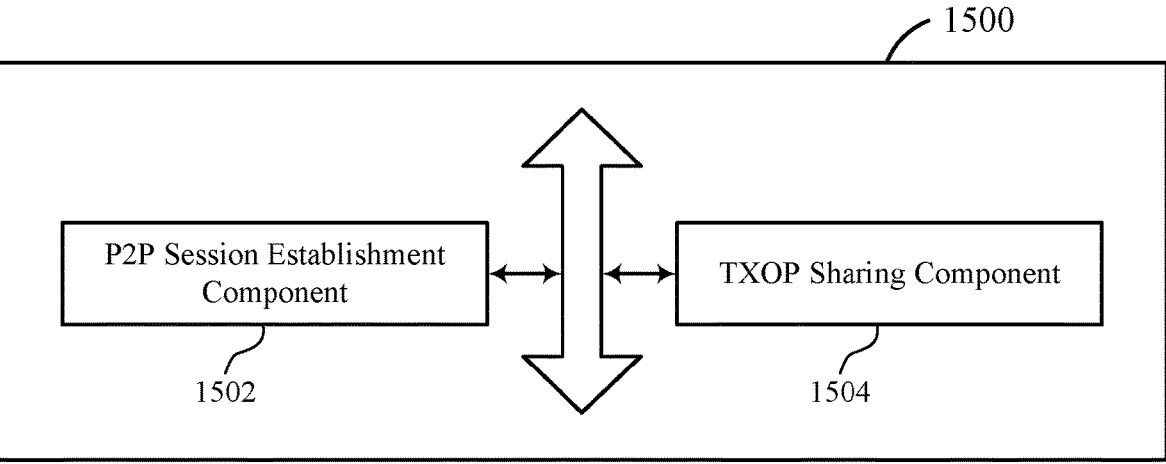
FIGS. 15 and 16 show block diagrams of example wireless communication devices that support resource allocation techniques to support multiple P2P sessions.

FIG. 15 shows a block diagram of an example wireless communication device 1500 that supports resource allocation techniques to support multiple P2P sessions according to some aspects of the present disclosure. In some implementations, the wireless communication device 1500 is configured or operable to perform the processes 1000, 1100, and 1200 described with reference to FIGS. 10, 11, and 12, respectively. In various examples, the wireless communication device 1500 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some implementations, the wireless communication device 1500 can be a device for use in an AP, such as AP 102 described with reference to FIG. 1. In some other examples, the wireless communication device 1500 can be an AP that includes such a chip, SoC, chipset, package or device as well as multiple antennas. The wireless communication device 1500 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 1500 also includes or can be coupled with an application processor which may be further coupled with another memory. In some implementations, the wireless communication device 1500 further includes at least one external network interface that enables communication with a core network or backhaul network to gain access to external networks including the Internet.

The wireless communication device 1500 includes a P2P session establishment component 1502 and a TXOP sharing component 1504. Portions of one or more of the components 1502 and 1504 may be implemented at least in part in hardware or firmware. For example, the TXOP sharing component 1504 may be implemented at least in part by a modem. In some implementations, at least some of the components 1502 and 1504 are implemented at least in part by a processor and as software stored in a memory. For example, portions of one or more of the components 1502 and 1504 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 1500). For example, a processing system of the device 1500 may refer to a system including the various other components or subcomponents of the device 1500, such as the processor, or a transceiver, or a communications manager, or other components or combinations of components of the device 1500. The processing system of the device 1500 may interface with other components of the device 1500, and may process information received from other components (such as inputs or signals) or output information to other components. For example, a chip or modem of the device 1500 may include a processing system, a first interface to output information and a second interface to obtain information. In some implementations, the first interface may refer to an interface between the processing system of the chip or modem and a transmitter, such that the device 1500 may transmit information output from the chip or modem. In some implementations, the second interface may refer to an interface between the processing system of the chip or modem and a receiver, such that the device 1500 may obtain information or signal inputs, and the information may be passed to the processing system. A person having ordinary skill in the art will readily recognize that the first interface also may obtain information or signal inputs, and the second interface also may output information or signal outputs.

The P2P session establishment component 1502 is capable of, configured to, or operable to support a means for receiving a first request, from a first wireless STA, for communication resources associated with a first P2P session and a second request, from a second wireless STA, for communication resources associated with a second P2P session. The TXOP sharing component 1504 is capable of, configured to, or operable to support a means for transmitting, in accordance with the first request and the second request, a first frame allocating a first duration of a TXOP of the wireless AP to the first wireless STA and a second frame allocating a second duration of the TXOP of the wireless AP to the second wireless STA, the first duration and the second duration at least partially overlapping.

In some implementations, the TXOP sharing component 1504 is capable of, configured to, or operable to support a means for transmitting, via the first frame, an indication of a resource unit allocation associated with the TXOP of the wireless AP. In some implementations, the TXOP sharing component 1504 is capable of, configured to, or operable to support a means for receiving, from the first wireless STA via a first portion of the resource unit allocation, a first CTS frame associated with the first frame. In some implementations, the TXOP sharing component 1504 is capable of, configured to, or operable to support a means for transmitting, via the second frame, an indication of a second portion of the resource unit allocation associated with the TXOP of the wireless AP in accordance with receiving the first CTS frame via the first portion of the resource unit allocation. In some implementations, the TXOP sharing component 1504 is capable of, configured to, or operable to support a means for receiving, from the second wireless STA via the second portion of the resource unit allocation, a second CTS frame associated with the second frame.

In some implementations, the TXOP sharing component 1504 is capable of, configured to, or operable to support a means for receiving, via the first CTS frame, an indication of a bandwidth that the first wireless STA uses for the first P2P session, where including the indication of the second portion of the resource unit allocation in the second frame is associated with receiving the indication of the bandwidth that the first wireless STA uses for the first P2P session.

In some implementations, the TXOP sharing component 1504 is capable of, configured to, or operable to support a means for transmitting a CTS-to-self frame via an entirety of a bandwidth that the wireless AP is to share with the first wireless STA and the second wireless STA, where the first frame and the second frame are associated with transmitting the CTS-to-self frame via the entirety of the bandwidth.

In some implementations, the TXOP sharing component 1504 is capable of, configured to, or operable to support a means for receiving, from the second wireless STA, an indication of a capability of the second wireless STA to communicate via non-primary channels, where the capability is associated with a device capability or an operational mode of the second wireless STA, and where the second frame indicates a non-primary channel in accordance with the capability of the second wireless STA.

In some implementations, to support receiving the indication of the capability of the second wireless STA, the TXOP sharing component 1504 is capable of, configured to, or operable to support a means for receiving an indication of a specific non-primary sub-channel via which the second wireless STA is available for the second P2P session in accordance with a set of channel conditions, where the non-primary channel indicated by the second frame includes the specific non-primary sub-channel indicated by the capability of the second wireless STA.

In some implementations, the TXOP sharing component 1504 is capable of, configured to, or operable to support a means for transmitting, via the first frame, an indication of the second wireless STA as a standby STA for the TXOP of the wireless AP, where transmitting the second frame to the second wireless STA is associated with including the indication of the second wireless STA as the standby STA in the first frame.

In some implementations, the indication of the second wireless STA as the standby STA for the TXOP of the wireless AP is included in the first frame to trigger a radio tuning, at the second wireless STA, from a primary channel to a non-primary channel.

In some implementations, the P2P session establishment component 1502 is capable of, configured to, or operable to support a means for transmitting, to the first wireless STA, a third frame prior to the first frame. In some implementations, the P2P session establishment component 1502 is capable of, configured to, or operable to support a means for receiving, from the first wireless STA, a CTS frame associated with the third frame, where a bandwidth that the first wireless STA uses for the first P2P session is derived from the CTS frame, and where the first frame and the second frame are associated with the bandwidth that the first wireless STA uses for the first P2P session.

In some implementations, the P2P session establishment component 1502 is capable of, configured to, or operable to support a means for monitoring a resource unit allocation during the TXOP of the wireless AP for P2P data frames associated with the first P2P session, where a bandwidth that the first wireless STA uses for the first P2P session is derived from the P2P data frames, and where the first frame and the second frame are associated with the bandwidth that the first wireless STA uses for the first P2P session.

In some implementations, the TXOP sharing component 1504 is capable of, configured to, or operable to support a means for transmitting, to the first wireless STA, an indication of a first transmit power for the first P2P session at the first wireless STA during the TXOP of the wireless AP. In some implementations, the TXOP sharing component 1504 is capable of, configured to, or operable to support a means for transmitting, to the second wireless STA, an indication of a second transmit power for the second P2P session at the second wireless STA during the TXOP of the wireless AP, where an allocation of the first duration of the TXOP and the second duration of the TXOP to the first P2P session and the second P2P session is associated with indicating the first transmit power for the first P2P session and indicating the second transmit power for the second P2P session.

In some implementations, the TXOP sharing component 1504 is capable of, configured to, or operable to support a means for transmitting a first measurement request and a second measurement request to the first wireless STA and the second wireless STA, respectively, the first measurement request indicating a first channel metric associated with transmissions by the second wireless STA to be measured and reported by the first wireless STA, and the second measurement request indicating a second channel metric associated with transmissions by the first wireless STA to be measured and reported by the second wireless STA. In some implementations, the TXOP sharing component 1504 is capable of, configured to, or operable to support a means for receiving a first measurement report and a second measurement report from the first wireless STA and the second wireless STA, respectively, the first measurement report indicating the first channel metric and the second measurement report indicating the second channel metric.

In some implementations, the TXOP sharing component 1504 is capable of, configured to, or operable to support a means for receiving, from the first wireless STA, an indication of a capability of the first wireless STA to measure and report the first channel metric associated with the transmissions by the second wireless STA, where transmitting the first measurement request to the first wireless STA is in accordance with the capability of the first wireless STA. In some implementations, the TXOP sharing component 1504 is capable of, configured to, or operable to support a means for receiving, from the second wireless STA, an indication of a capability of the second wireless STA to measure and report the second channel metric associated with the transmissions by the first wireless STA, where transmitting the second measurement request to the second wireless STA is in accordance with the capability of the second wireless STA.

In some implementations, the TXOP sharing component 1504 is capable of, configured to, or operable to support a means for transmitting, via the first frame, an indication of a first resource allocation for the first P2P session in accordance with a first set of observed parameters associated with the first P2P session, the first resource allocation including at least the first duration of the TXOP of the wireless AP. In some implementations, the TXOP sharing component 1504 is capable of, configured to, or operable to support a means for transmitting, via the second frame, an indication of a second resource allocation for the second P2P session in accordance with a second set of observed parameters associated with the second P2P session, the second resource allocation including at least the second duration of the TXOP of the wireless AP.

In some implementations, the first resource allocation further includes a first bandwidth and the second resource allocation further includes a second bandwidth.

In some implementations, the first resource allocation is associated with a first output of a reinforcement learning model in accordance with the first set of observed parameters and the second resource allocation is associated with a second output of the reinforcement learning model in accordance with the second set of observed parameters.

In some implementations, the P2P session establishment component 1502 is capable of, configured to, or operable to support a means for transmitting, to a second wireless AP associated with a second BSS, a resource availability inquiry. In some implementations, the P2P session establishment component 1502 is capable of, configured to, or operable to support a means for transmitting, to a wireless STA associated with the first BSS of the first wireless AP, information indicative of an offloading of the wireless STA from the first wireless AP to the second wireless AP in accordance with a resource availability at the second wireless AP.

In some implementations, to support transmitting the information indicative of the offloading of the wireless STA from the first wireless AP to the second wireless AP, the P2P session establishment component 1502 is capable of, configured to, or operable to support a means for transmitting, to the wireless STA, an indication of an AID value that the second wireless AP is to use to address the wireless STA.

In some implementations, the P2P session establishment component 1502 is capable of, configured to, or operable to support a means for receiving, from the second wireless AP in accordance with the offloading of the wireless STA from the first wireless AP to the second wireless AP, the indication of the AID value that the second wireless AP is to use to address the wireless STA.

In some implementations, to support transmitting the information indicative of the offloading of the wireless STA from the first wireless AP to the second wireless AP, the P2P session establishment component 1502 is capable of, configured to, or operable to support a means for transmitting, to the wireless STA, channel and BSSID information associated with the second wireless AP or TWT allocation information associated with the second wireless AP, or both.

In some implementations, the P2P session establishment component 1502 is capable of, configured to, or operable to support a means for receiving, from the wireless station STA, a request for communication resources associated with a P2P session at the wireless STA, where transmitting the resource availability inquiry is in accordance with the request for the communication resources associated with the P2P session.

In some implementations, the P2P session establishment component 1502 is capable of, configured to, or operable to support a means for transmitting, to the second wireless AP as part of a resource sharing between the first wireless AP and the second wireless AP, information associated with data traffic constraints of the wireless STA, where the request for the communication resources associated with the P2P session at the wireless STA is associated with the data traffic constraints of the wireless STA.

In some implementations, the information associated with the data traffic constraints of the wireless STA includes QoS information or a set of parameters or capabilities associated with multi-link operation at the wireless STA, or both.

In some implementations, the P2P session establishment component 1502 is capable of, configured to, or operable to support a means for receiving, from the second wireless AP, an indication of the resource availability at the second wireless AP in accordance with transmitting the resource availability inquiry, where the indication of the resource availability indicates that the second wireless AP has a greater amount of communication resources available for P2P sessions than the first wireless AP.

In some implementations, the P2P session establishment component 1502 is capable of, configured to, or operable to support a means for transmitting, to a first wireless AP from a second wireless AP, an indication of a resource availability at the second wireless AP. In some implementations, the P2P session establishment component 1502 is capable of, configured to, or operable to support a means for transmitting, to a wireless STA, a resource allocation for a P2P session at the wireless STA in accordance with an offloading of the wireless STA from the first wireless AP to the second wireless AP.

In some implementations, the P2P session establishment component 1502 is capable of, configured to, or operable to support a means for receiving, from the first AP, a resource availability inquiry in accordance with a request for communication resources associated with the P2P session at the wireless STA, where transmitting the resource allocation to the wireless STA is in accordance with the request for the communication resources associated with the P2P session.

In some implementations, the P2P session establishment component 1502 is capable of, configured to, or operable to support a means for receiving, from the first wireless AP as part of a resource sharing between the first wireless AP and the second wireless AP, information associated with data traffic constraints of the wireless STA, where the request for the communication resources associated with the P2P session at the wireless STA is associated with the data traffic constraints of the wireless STA.

In some implementations, the information associated with the data traffic constraints of the wireless STA includes QoS information or a set of parameters or capabilities associated with multi-link operation at the wireless STA, or both.

In some implementations, the P2P session establishment component 1502 is capable of, configured to, or operable to support a means for transmitting, to the first wireless AP, an indication of the resource availability at the second wireless AP in accordance with receiving the resource availability inquiry, where the indication of the resource availability indicates that the second wireless AP has a greater amount of communication resources available for P2P sessions than the first wireless AP.

In some implementations, the P2P session establishment component 1502 is capable of, configured to, or operable to support a means for transmitting, to the first wireless AP in accordance with the offloading of the wireless STA from the first wireless AP to the second wireless AP, an indication of an AID value that the second wireless AP is to use to address the wireless STA.

Figure 16:
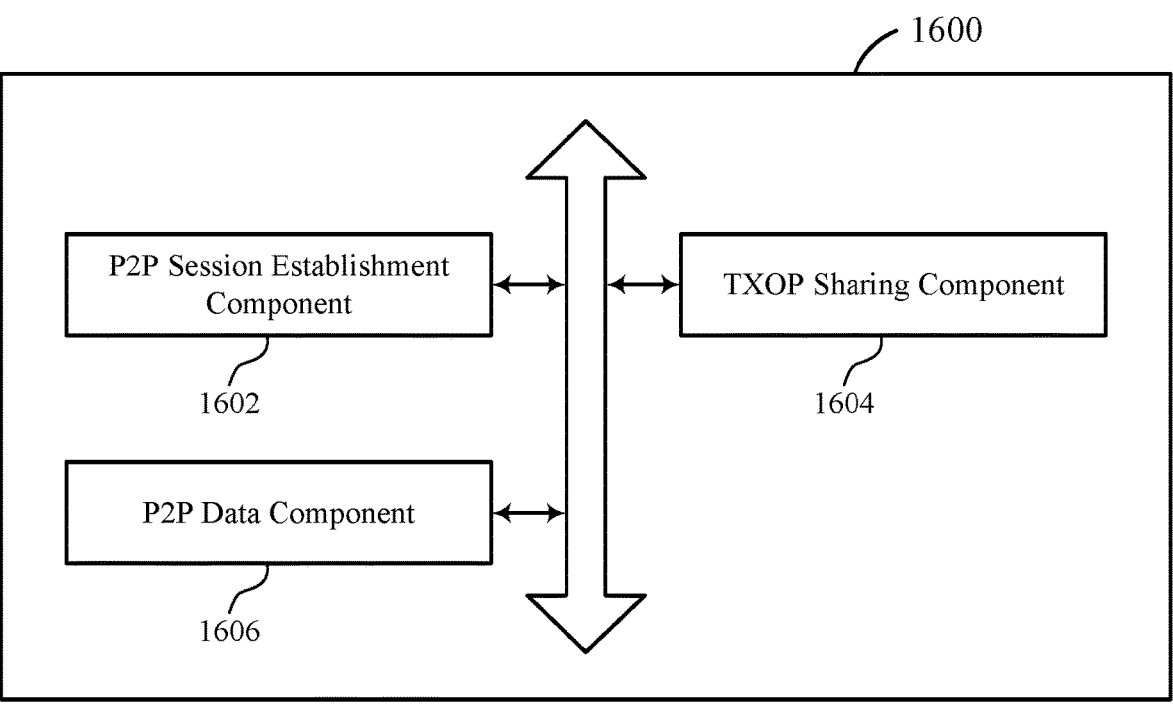

FIG. 16 shows a block diagram of an example wireless communication device 1600 that supports resource allocation techniques to support multiple P2P sessions according to some aspects of the present disclosure. In some implementations, the wireless communication device 1600 is configured or operable to perform the processes 1300 and 1400 described with reference to FIGS. 13 and 14, respectively. In various examples, the wireless communication device 1600 can be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory").

In some implementations, the wireless communication device 1600 can be a device for use in a STA, such as STA 104 described with reference to FIG. 1. In some other examples, the wireless communication device 1600 can be a STA that includes such a chip, SoC, chipset, package or device as well as multiple antennas. The wireless communication device 1600 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 1600 also includes or can be coupled with an application processor which may be further coupled with another memory. In some implementations, the wireless communication device 1600 further includes a user interface (UI) (such as a touchscreen or keypad) and a display, which may be integrated with the UI to form a touchscreen display. In some implementations, the wireless communication device 1600 may further include one or more sensors such as, for example, one or more inertial sensors, accelerometers, temperature sensors, pressure sensors, or altitude sensors.

The wireless communication device 1600 includes a P2P session establishment component 1602, a TXOP sharing component 1604, and a P2P data component 1606. Portions of one or more of the components 1602, 1604, and 1606 may be implemented at least in part in hardware or firmware. For example, the TXOP sharing component 1604 may be implemented at least in part by a modem. In some implementations, at least some of the components 1602, 1604, and 1606 are implemented at least in part by a processor and as software stored in a memory. For example, portions of one or more of the components 1602, 1604, and 1606 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 1600). For example, a processing system of the device 1600 may refer to a system including the various other components or subcomponents of the device 1600, such as the processor, or a transceiver, or a communications manager, or other components or combinations of components of the device 1600. The processing system of the device 1600 may interface with other components of the device 1600, and may process information received from other components (such as inputs or signals) or output information to other components. For example, a chip or modem of the device 1600 may include a processing system, a first interface to output information and a second interface to obtain information. In some implementations, the first interface may refer to an interface between the processing system of the chip or modem and a transmitter, such that the device 1600 may transmit information output from the chip or modem. In some implementations, the second interface may refer to an interface between the processing system of the chip or modem and a receiver, such that the device 1600 may obtain information or signal inputs, and the information may be passed to the processing system. A person having ordinary skill in the art will readily recognize that the first interface also may obtain information or signal inputs, and the second interface also may output information or signal outputs.

The P2P session establishment component 1602 is capable of, configured to, or operable to support a means for transmitting, to a wireless AP, a request for communication resources associated with a first P2P session at the first wireless STA. The TXOP sharing component 1604 is capable of, configured to, or operable to support a means for receiving, in accordance with the request, a frame allocating a duration of a TXOP of the wireless AP to the first wireless STA. In some implementations, the TXOP sharing component 1604 is capable of, configured to, or operable to support a means for sharing the TXOP of the wireless AP with a second P2P session at a second wireless STA. The P2P data component 1606 is capable of, configured to, or operable to support a means for communicating, in accordance with sharing the TXOP, data associated with the first P2P session with a peer device for the duration of the TXOP.

In some implementations, the TXOP sharing component 1604 is capable of, configured to, or operable to support a means for receiving, via the frame, an indication of a resource unit allocation associated with the TXOP of the wireless AP. In some implementations, the TXOP sharing component 1604 is capable of, configured to, or operable to support a means for transmitting, to the wireless AP via a portion of the resource unit allocation, a CTS frame associated with the frame, where sharing the TXOP of the wireless AP is associated with transmitting the CTS frame via the portion of the resource unit allocation.

In some implementations, the TXOP sharing component 1604 is capable of, configured to, or operable to support a means for transmitting, via the CTS frame, an indication of a bandwidth that the first wireless STA uses for the first P2P session, where sharing the TXOP of the wireless AP is associated with transmitting the indication of the bandwidth that the first wireless STA uses for the first P2P session.

In some implementations, the TXOP sharing component 1604 is capable of, configured to, or operable to support a means for receiving, via the frame, an indication of a resource unit allocation associated with the TXOP of the wireless AP, where the resource unit allocation indicates a non-primary channel of the wireless AP. In some implementations, the TXOP sharing component 1604 is capable of, configured to, or operable to support a means for transmitting, to the wireless AP via the non-primary channel, a CTS frame associated with the frame, where sharing the TXOP of the wireless AP is associated with the resource unit allocation indicating the non-primary channel.

In some implementations, the P2P session establishment component 1602 is capable of, configured to, or operable to support a means for transmitting, to the wireless AP, an indication of a capability of the first wireless STA to communicate via non-primary channels, where the capability is associated with a device capability or an operational mode of the first wireless STA, and where the frame indicates a non-primary channel in accordance with the capability of the first wireless STA.

In some implementations, to support transmitting the indication of the capability of the first wireless STA, the P2P session establishment component 1602 is capable of, configured to, or operable to support a means for transmitting an indication of a specific non-primary sub-channel via which the first wireless STA is available for the first P2P session in accordance with a set of channel conditions, where the non-primary channel indicated by the frame includes the specific non-primary sub-channel indicated by the capability of the first wireless STA.

In some implementations, the TXOP sharing component 1604 is capable of, configured to, or operable to support a means for receiving, from the wireless AP, a second frame including an indication of the first wireless STA as a standby STA for the TXOP of the wireless AP, where the second frame is received prior to the frame. In some implementations, the TXOP sharing component 1604 is capable of, configured to, or operable to support a means for tuning a radio of the first wireless STA from a primary channel to a non-primary channel in accordance with the indication of the first wireless STA as the standby STA for the TXOP, where the frame is received via the non-primary channel, and where sharing the TXOP of the wireless AP is associated with tuning the radio of the first wireless STA to the non-primary channel.

In some implementations, the P2P session establishment component 1602 is capable of, configured to, or operable to support a means for receiving, from the wireless AP, a second frame prior to the frame. In some implementations, the P2P session establishment component 1602 is capable of, configured to, or operable to support a means for transmitting, to the wireless AP, a CTS frame associated with the second frame, where a bandwidth that the first wireless STA uses for the first P2P session is derived from the CTS frame, and where the frame is associated with the bandwidth that the first wireless STA uses for the first P2P session.

In some implementations, the TXOP sharing component 1604 is capable of, configured to, or operable to support a means for receiving, from the wireless AP, an indication of a transmit power for the first P2P session at the first wireless STA during the TXOP of the wireless AP, where sharing the TXOP of the wireless AP is associated with use of the transmit power for the first P2P session.

In some implementations, the TXOP sharing component 1604 is capable of, configured to, or operable to support a means for receiving, from the wireless AP, a measurement request, the measurement request indicating a channel metric associated with transmissions by the second wireless STA to be measured and reported by the first wireless STA. In some implementations, the TXOP sharing component 1604 is capable of, configured to, or operable to support a means for transmitting, to the wireless AP, a measurement report associated with the measurement request, the measurement report indicating the channel metric.

In some implementations, the TXOP sharing component 1604 is capable of, configured to, or operable to support a means for transmitting, to the wireless AP, an indication of a capability of the first wireless STA to measure and report the channel metric associated with the transmissions by the second wireless STA, where receiving the measurement request is in accordance with the capability of the first wireless STA.

In some implementations, the TXOP sharing component 1604 is capable of, configured to, or operable to support a means for receiving, via the frame, an indication of a resource allocation for the first P2P session in accordance with a set of observed parameters associated with the first P2P session, the resource allocation including at least the duration of the TXOP of the wireless AP allocated to the first P2P session at first wireless STA.

In some implementations, the resource allocation further includes a bandwidth allocated to the first P2P session at first wireless STA.

In some implementations, the resource allocation is associated with an output of a reinforcement learning model in accordance with the set of observed parameters.

In some implementations, the P2P session establishment component 1602 is capable of, configured to, or operable to support a means for receiving, via the frame, an indication of a first resource unit allocation associated with uplink communication from the first wireless STA to the AP and an indication of a second resource unit allocation associated with the first P2P session at the first wireless STA, where the first resource unit allocation is associated with a first set of sub-channels and the second resource unit allocation is associated with a second set of sub-channels.

In some implementations, the P2P session establishment component 1602 is capable of, configured to, or operable to support a means for receiving, from a first wireless AP associated with a first BSS, information indicative of an offloading of the wireless STA from the first wireless AP to a second wireless AP in accordance with a resource availability at the second wireless AP, the second wireless AP being associated with a second BSS. In some implementations, the P2P session establishment component 1602 is capable of, configured to, or operable to support a means for receiving, from the second wireless AP, a resource allocation for a P2P session at the wireless STA in accordance with the offloading of the wireless STA from the first wireless AP to the second wireless AP.

In some implementations, to support receiving the information indicative of the offloading of the wireless STA from the first wireless AP to the second wireless AP, the P2P session establishment component 1602 is capable of, configured to, or operable to support a means for receiving, from the first wireless AP, an indication of an AID value that the second wireless AP is to use to address the wireless STA, where receiving the resource allocation from the second wireless AP is associated with receiving the indication of the AID value.

In some implementations, to support receiving the information indicative of the offloading of the wireless STA from the first wireless AP to the second wireless AP, the P2P session establishment component 1602 is capable of, configured to, or operable to support a means for receiving, from the first wireless AP, channel and BSSID information associated with the second wireless AP or TWT allocation information associated with the second wireless AP, or both, where receiving the resource allocation from the second wireless AP is associated with receiving the channel and BSSID information or the TWT allocation information.

In some implementations, the P2P session establishment component 1602 is capable of, configured to, or operable to support a means for transmitting, to the first wireless AP, a request for communication resources associated with the P2P session at the wireless STA, where receiving the resource allocation from the second wireless AP is in accordance with the request for the communication resources associated with the P2P session.

In some implementations, the P2P session establishment component 1602 is capable of, configured to, or operable to support a means for transmitting, to the first wireless AP, information associated with data traffic constraints of the wireless STA, where the request for the communication resources associated with the P2P session at the wireless STA is associated with the data traffic constraints of the wireless STA, and where the offloading of the wireless STA from the first wireless AP to the second wireless AP is associated with the data traffic constraints of the wireless STA.

In some implementations, the information associated with the data traffic constraints of the wireless STA includes QoS information or a set of parameters or capabilities associated with multi-link operation at the wireless STA, or both.

Implementation examples are described in the following numbered clauses:

Aspect 1: A method for wireless communication performable at a first wireless STA, including: transmitting, to a wireless AP, a request for communication resources associated with a first P2P session at the first wireless STA; receiving, in accordance with the request, a frame allocating a duration of a TXOP of the wireless AP to the first wireless STA; sharing the TXOP of the wireless AP with a second P2P session at a second wireless STA; and communicating, in accordance with sharing the TXOP, data associated with the first P2P session with a peer device for the duration of the TXOP.

Aspect 2: The method of aspect 1, further including: receiving, via the frame, an indication of a resource unit allocation associated with the TXOP of the wireless AP; and transmitting, to the wireless AP via a portion of the resource unit allocation, a CTS frame associated with the frame, where sharing the TXOP of the wireless AP is associated with transmitting the CTS frame via the portion of the resource unit allocation.

Aspect 3: The method of aspect 2, further including: transmitting, via the CTS frame, an indication of a bandwidth that the first wireless STA uses for the first P2P session, where sharing the TXOP of the wireless AP is associated with transmitting the indication of the bandwidth that the first wireless STA uses for the first P2P session.

Aspect 4: The method of any of aspects 1 through 3, further including: receiving, via the frame, an indication of a resource unit allocation associated with the TXOP of the wireless AP, where the resource unit allocation indicates a non-primary channel of the wireless AP; and transmitting, to the wireless AP via the non-primary channel, a CTS frame associated with the frame, where sharing the TXOP of the wireless AP is associated with the resource unit allocation indicating the non-primary channel.

Aspect 5: The method of any of aspects 1 through 4, further including: transmitting, to the wireless AP, an indication of a capability of the first wireless STA to communicate via non-primary channels, where the capability is associated with a device capability or an operational mode of the first wireless STA, and where the frame indicates a non-primary channel in accordance with the capability of the first wireless STA.

Aspect 6: The method of aspect 5, where transmitting the indication of the capability of the first wireless STA further includes: transmitting an indication of a specific non-primary sub-channel via which the first wireless STA is available for the first P2P session in accordance with a set of channel conditions, where the non-primary channel indicated by the frame includes the specific non-primary sub-channel indicated by the capability of the first wireless STA.

Aspect 7: The method of any of aspects 1 through 6, further including: receiving, from the wireless AP, a second frame including an indication of the first wireless STA as a standby STA for the TXOP of the wireless AP, where the second frame is received prior to the frame; and tuning a radio of the first wireless STA from a primary channel to a non-primary channel in accordance with the indication of the first wireless STA as the standby STA for the TXOP, where the frame is received via the non-primary channel, and where sharing the TXOP of the wireless AP is associated with tuning the radio of the first wireless STA to the non-primary channel.

Aspect 8: The method of any of aspects 1 through 7, further including: receiving, from the wireless AP, a second frame prior to the frame; and transmitting, to the wireless AP, a CTS frame associated with the second frame, where a bandwidth that the first wireless STA uses for the first P2P session is derived from the CTS frame, and where the frame is associated with the bandwidth that the first wireless STA uses for the first P2P session.

Aspect 9: The method of any of aspects 1 through 8, further including: receiving, from the wireless AP, an indication of a transmit power for the first P2P session at the first wireless STA during the TXOP of the wireless AP, where sharing the TXOP of the wireless AP is associated with use of the transmit power for the first P2P session.

Aspect 10: The method of aspect 9, further including: receiving, from the wireless AP, a measurement request, the measurement request indicating a channel metric associated with transmissions by the second wireless STA to be measured and reported by the first wireless STA; and transmitting, to the wireless AP, a measurement report associated with the measurement request, the measurement report indicating the channel metric.

Aspect 11: The method of aspect 10, further including: transmitting, to the wireless AP, an indication of a capability of the first wireless STA to measure and report the channel metric associated with the transmissions by the second wireless STA, where receiving the measurement request is in accordance with the capability of the first wireless STA.

Aspect 12: The method of any of aspects 1 through 11, further including: receiving, via the frame, an indication of a resource allocation for the first P2P session in accordance with a set of observed parameters associated with the first P2P session, the resource allocation including at least the duration of the TXOP of the wireless AP allocated to the first P2P session at first wireless STA.

Aspect 13: The method of aspect 12, where the resource allocation further includes a bandwidth allocated to the first P2P session at first wireless STA.

Aspect 14: The method of any of aspects 12 through 13, where the resource allocation is associated with an output of a reinforcement learning model in accordance with the set of observed parameters.

Aspect 15: The method of any of aspects 1 through 14, further including: receiving, via the frame, an indication of a first resource unit allocation associated with uplink communication from the first wireless STA to the AP and an indication of a second resource unit allocation associated with the first P2P session at the first wireless STA, where the first resource unit allocation is associated with a first set of sub-channels and the second resource unit allocation is associated with a second set of sub-channels.

Aspect 16: A method for wireless communication performable at a wireless STA, including: receiving, from a first wireless AP associated with a first BSS, information indicative of an offloading of the wireless STA from the first wireless AP to a second wireless AP in accordance with a resource availability at the second wireless AP, the second wireless AP being associated with a second BSS; and receiving, from the second wireless AP, a resource allocation for a P2P session at the wireless STA in accordance with the offloading of the wireless STA from the first wireless AP to the second wireless AP.

Aspect 17: The method of aspect 16, where receiving the information indicative of the offloading of the wireless STA from the first wireless AP to the second wireless AP further includes: receiving, from the first wireless AP, an indication of an AID value that the second wireless AP is to use to address the wireless STA, where receiving the resource allocation from the second wireless AP is associated with receiving the indication of the AID value.

Aspect 18: The method of any of aspects 16 through 17, where receiving the information indicative of the offloading of the wireless STA from the first wireless AP to the second wireless AP further includes: receiving, from the first wireless AP, channel and BSSID information associated with the second wireless AP or TWT allocation information associated with the second wireless AP, or both, where receiving the resource allocation from the second wireless AP is associated with receiving the channel and BSSID information or the TWT allocation information.

Aspect 19: The method of any of aspects 16 through 18, further including: transmitting, to the first wireless AP, a request for communication resources associated with the P2P session at the wireless STA, where receiving the resource allocation from the second wireless AP is in accordance with the request for the communication resources associated with the P2P session.

Aspect 20: The method of aspect 19, further including: transmitting, to the first wireless AP, information associated with data traffic constraints of the wireless STA, where the request for the communication resources associated with the P2P session at the wireless STA is associated with the data traffic constraints of the wireless STA, and where the offloading of the wireless STA from the first wireless AP to the second wireless AP is associated with the data traffic constraints of the wireless STA.

Aspect 21: The method of aspect 20, where the information associated with the data traffic constraints of the wireless STA includes QoS information or a set of parameters or capabilities associated with MLO at the wireless STA, or both.

Aspect 22: A method for wireless communication performable at a wireless AP, including: receiving a first request, from a first wireless STA, for communication resources associated with a first P2P session and a second request, from a second wireless STA, for communication resources associated with a second P2P session; and transmitting, in accordance with the first request and the second request, a first frame allocating a first duration of a TXOP of the wireless AP to the first wireless STA and a second frame allocating a second duration of the TXOP of the wireless AP to the second wireless STA, the first duration and the second duration at least partially overlapping.

Aspect 23: The method of aspect 22, further including: transmitting, via the first frame, an indication of a resource unit allocation associated with the TXOP of the wireless AP; receiving, from the first wireless STA via a first portion of the resource unit allocation, a first CTS frame associated with the first frame; transmitting, via the second frame, an indication of a second portion of the resource unit allocation associated with the TXOP of the wireless AP in accordance with receiving the first CTS frame via the first portion of the resource unit allocation; and receiving, from the second wireless STA via the second portion of the resource unit allocation, a second CTS frame associated with the second frame.

Aspect 24: The method of aspect 23, further including: receiving, via the first CTS frame, an indication of a bandwidth that the first wireless STA uses for the first P2P session, where including the indication of the second portion of the resource unit allocation in the second frame is associated with receiving the indication of the bandwidth that the first wireless STA uses for the first P2P session.

Aspect 25: The method of any of aspects 22 through 24, further including: transmitting a CTS-to-self frame via an entirety of a bandwidth that the wireless AP is to share with the first wireless STA and the second wireless STA, where the first frame and the second frame are associated with transmitting the CTS-to-self frame via the entirety of the bandwidth.

Aspect 26: The method of any of aspects 22 through 25, further including: receiving, from the second wireless STA, an indication of a capability of the second wireless STA to communicate via non-primary channels, where the capability is associated with a device capability or an operational mode of the second wireless STA, and where the second frame indicates a non-primary channel in accordance with the capability of the second wireless STA.

Aspect 27: The method of aspect 26, where receiving the indication of the capability of the second wireless STA further includes: receiving an indication of a specific non-primary sub-channel via which the second wireless STA is available for the second P2P session in accordance with a set of channel conditions, where the non-primary channel indicated by the second frame includes the specific non-primary sub-channel indicated by the capability of the second wireless STA.

Aspect 28: The method of any of aspects 22 through 27, further including: transmitting, via the first frame, an indication of the second wireless STA as a standby STA for the TXOP of the wireless AP, where transmitting the second frame to the second wireless STA is associated with including the indication of the second wireless STA as the standby STA in the first frame.

Aspect 29: The method of aspect 28, where the indication of the second wireless STA as the standby STA for the TXOP of the wireless AP is included in the first frame to trigger a radio tuning, at the second wireless STA, from a primary channel to a non-primary channel.

Aspect 30: The method of any of aspects 22 through 29, further including: transmitting, to the first wireless STA, a third frame prior to the first frame; and receiving, from the first wireless STA, a CTS frame associated with the third frame, where a bandwidth that the first wireless STA uses for the first P2P session is derived from the CTS frame, and where the first frame and the second frame are associated with the bandwidth that the first wireless STA uses for the first P2P session.

Aspect 31: The method of any of aspects 22 through 30, further including: monitoring a resource unit allocation during the TXOP of the wireless AP for P2P data frames associated with the first P2P session, where a bandwidth that the first wireless STA uses for the first P2P session is derived from the P2P data frames, and where the first frame and the second frame are associated with the bandwidth that the first wireless STA uses for the first P2P session.

Aspect 32: The method of any of aspects 22 through 31, further including: transmitting, to the first wireless STA, an indication of a first transmit power for the first P2P session at the first wireless STA during the TXOP of the wireless AP; and transmitting, to the second wireless STA, an indication of a second transmit power for the second P2P session at the second wireless STA during the TXOP of the wireless AP, where an allocation of the first duration of the TXOP and the second duration of the TXOP to the first P2P session and the second P2P session is associated with indicating the first transmit power for the first P2P session and indicating the second transmit power for the second P2P session.

Aspect 33: The method of aspect 32, further including: transmitting a first measurement request and a second measurement request to the first wireless STA and the second wireless STA, respectively, the first measurement request indicating a first channel metric associated with transmissions by the second wireless STA to be measured and reported by the first wireless STA, and the second measurement request indicating a second channel metric associated with transmissions by the first wireless STA to be measured and reported by the second wireless STA; and receiving a first measurement report and a second measurement report from the first wireless STA and the second wireless STA, respectively, the first measurement report indicating the first channel metric and the second measurement report indicating the second channel metric.

Aspect 34: The method of aspect 33, further including: receiving, from the first wireless STA, an indication of a capability of the first wireless STA to measure and report the first channel metric associated with the transmissions by the second wireless STA, where transmitting the first measurement request to the first wireless STA is in accordance with the capability of the first wireless STA; and receiving, from the second wireless STA, an indication of a capability of the second wireless STA to measure and report the second channel metric associated with the transmissions by the first wireless STA, where transmitting the second measurement request to the second wireless STA is in accordance with the capability of the second wireless STA.

Aspect 35: The method of any of aspects 22 through 34, further including: transmitting, via the first frame, an indication of a first resource allocation for the first P2P session in accordance with a first set of observed parameters associated with the first P2P session, the first resource allocation including at least the first duration of the TXOP of the wireless AP; and transmitting, via the second frame, an indication of a second resource allocation for the second P2P session in accordance with a second set of observed parameters associated with the second P2P session, the second resource allocation including at least the second duration of the TXOP of the wireless AP.

Aspect 36: The method of aspect 35, where the first resource allocation further includes a first bandwidth and the second resource allocation further includes a second bandwidth.

Aspect 37: The method of any of aspects 35 through 36, where the first resource allocation is associated with a first output of a reinforcement learning model in accordance with the first set of observed parameters and the second resource allocation is associated with a second output of the reinforcement learning model in accordance with the second set of observed parameters.

Aspect 38: A method for wireless communication performable at a first wireless AP associated with a first BSS, including: transmitting, to a second wireless AP associated with a second BSS, a resource availability inquiry; and transmitting, to a wireless STA associated with the first BSS of the first wireless AP, information indicative of an offloading of the wireless STA from the first wireless AP to the second wireless AP in accordance with a resource availability at the second wireless AP.

Aspect 39: The method of aspect 38, where transmitting the information indicative of the offloading of the wireless STA from the first wireless AP to the second wireless AP further includes: transmitting, to the wireless STA, an indication of an AID value that the second wireless AP is to use to address the wireless STA.

Aspect 40: The method of aspect 39, further including: receiving, from the second wireless AP in accordance with the offloading of the wireless STA from the first wireless AP to the second wireless AP, the indication of the AID value that the second wireless AP is to use to address the wireless STA.

Aspect 41: The method of any of aspects 38 through 40, where transmitting the information indicative of the offloading of the wireless STA from the first wireless AP to the second wireless AP further includes: transmitting, to the wireless STA, channel and BSSID information associated with the second wireless AP or TWT allocation information associated with the second wireless AP, or both.

Aspect 42: The method of any of aspects 38 through 41, further including: receiving, from the wireless station STA, a request for communication resources associated with a P2P session at the wireless STA, where transmitting the resource availability inquiry is in accordance with the request for the communication resources associated with the P2P session.

Aspect 43: The method of aspect 42, further including: transmitting, to the second wireless AP as part of a resource sharing between the first wireless AP and the second wireless AP, information associated with data traffic constraints of the wireless STA, where the request for the communication resources associated with the P2P session at the wireless STA is associated with the data traffic constraints of the wireless STA.

Aspect 44: The method of aspect 43, where the information associated with the data traffic constraints of the wireless STA includes QoS information or a set of parameters or capabilities associated with MLO at the wireless STA, or both.

Aspect 45: The method of any of aspects 38 through 44, further including: receiving, from the second wireless AP, an indication of the resource availability at the second wireless AP in accordance with transmitting the resource availability inquiry, where the indication of the resource availability indicates that the second wireless AP has a greater amount of communication resources available for P2P sessions than the first wireless AP.

Aspect 46: A method for wireless communication, including: transmitting, to a first wireless AP from a second wireless AP, an indication of a resource availability at the second wireless AP; and transmitting, to a wireless STA, a resource allocation for a P2P session at the wireless STA in accordance with an offloading of the wireless STA from the first wireless AP to the second wireless AP.

Aspect 47: The method of aspect 46, further including: receiving, from the first AP, a resource availability inquiry in accordance with a request for communication resources associated with the P2P session at the wireless STA, where transmitting the resource allocation to the wireless STA is in accordance with the request for the communication resources associated with the P2P session.

Aspect 48: The method of aspect 47, further including: receiving, from the first wireless AP as part of a resource sharing between the first wireless AP and the second wireless AP, information associated with data traffic constraints of the wireless STA, where the request for the communication resources associated with the P2P session at the wireless STA is associated with the data traffic constraints of the wireless STA.

Aspect 49: The method of aspect 48, where the information associated with the data traffic constraints of the wireless STA includes QoS information or a set of parameters or capabilities associated with MLO at the wireless STA, or both.

Aspect 50: The method of any of aspects 47 through 49, further including: transmitting, to the first wireless AP, an indication of the resource availability at the second wireless AP in accordance with receiving the resource availability inquiry, where the indication of the resource availability indicates that the second wireless AP has a greater amount of communication resources available for P2P sessions than the first wireless AP.

Aspect 51: The method of any of aspects 46 through 50, further including: transmitting, to the first wireless AP in accordance with the offloading of the wireless STA from the first wireless AP to the second wireless AP, an indication of an AID value that the second wireless AP is to use to address the wireless STA.

Aspect 52: A first wireless STA, including: at least one memory; and at least one processor communicatively coupled with the at least one memory, the at least one processor operable to cause the first wireless STA to: transmit, to a wireless AP, a request for communication resources associated with a first P2P session at the first wireless STA; receive, in accordance with the request, a frame allocating a duration of a TXOP of the wireless AP to the first wireless STA; share the TXOP of the wireless AP with a second P2P session at a second wireless STA; and communicate, in accordance with sharing the TXOP, data associated with the first P2P session with a peer device for the duration of the TXOP.

Aspect 53: The first wireless STA of aspect 52, where the at least one processor is further operable to cause the first wireless STA to: receive, via the frame, an indication of a resource unit allocation associated with the TXOP of the wireless AP; and transmit, to the wireless AP via a portion of the resource unit allocation, a CTS frame associated with the frame, where sharing the TXOP of the wireless AP is associated with transmitting the CTS frame via the portion of the resource unit allocation.

Aspect 54: The first wireless STA of aspect 53, where the at least one processor is further operable to cause the first wireless STA to: transmit, via the CTS frame, an indication of a bandwidth that the first wireless STA uses for the first P2P session, where sharing the TXOP of the wireless AP is associated with transmitting the indication of the bandwidth that the first wireless STA uses for the first P2P session.

Aspect 55: The first wireless STA of any of aspects 52 through 54, where the at least one processor is further operable to cause the first wireless STA to: receive, via the frame, an indication of a resource unit allocation associated with the TXOP of the wireless AP, where the resource unit allocation indicates a non-primary channel of the wireless AP; and transmit, to the wireless AP via the non-primary channel, a CTS frame associated with the frame, where sharing the TXOP of the wireless AP is associated with the resource unit allocation indicating the non-primary channel.

Aspect 56: The first wireless STA of any of aspects 52 through 55, where the at least one processor is further operable to cause the first wireless STA to: transmit, to the wireless AP, an indication of a capability of the first wireless STA to communicate via non-primary channels, where the capability is associated with a device capability or an operational mode of the first wireless STA, and where frame indicates a non-primary channel in accordance with the capability of the first wireless STA.

Aspect 57: The first wireless STA of aspect 56, where, to transmit the indication of the capability of the first wireless STA, the at least one processor is further operable to cause the first wireless STA to: transmit an indication of a specific non-primary sub-channel via which the first wireless STA is available for the first P2P session in accordance with a set of channel conditions, where the non-primary channel indicated by the frame includes the specific non-primary sub-channel indicated by the capability of the first wireless STA.

Aspect 58: The first wireless STA of any of aspects 52 through 57, where the at least one processor is further operable to cause the first wireless STA to: receive, from the wireless AP, a second frame including an indication of the first wireless STA as a standby STA for the TXOP of the wireless AP, where the second frame is received prior to the frame; and tune a radio of the first wireless STA from a primary channel to a non-primary channel in accordance with the indication of the first wireless STA as the standby STA for the TXOP, where the frame is received via the non-primary channel, and where sharing the TXOP of the wireless AP is associated with tuning the radio of the first wireless STA to the non-primary channel.

Aspect 59: The first wireless STA of any of aspects 52 through 58, where the at least one processor is further operable to cause the first wireless STA to: receive, from the wireless AP, a second frame prior to the frame; and transmit, to the wireless AP, a CTS frame associated with the second frame, where a bandwidth that the first wireless STA uses for the first P2P session is derived from the CTS frame, and where the frame is associated with the bandwidth that the first wireless STA uses for the first P2P session.

Aspect 60: The first wireless STA of any of aspects 52 through 59, where the at least one processor is further operable to cause the first wireless STA to: receive, from the wireless AP, an indication of a transmit power for the first P2P session at the first wireless STA during the TXOP of the wireless AP, where sharing the TXOP of the wireless AP is associated with use of the transmit power for the first P2P session.

Aspect 61: The first wireless STA of aspect 60, where the at least one processor is further operable to cause the first wireless STA to: receive, from the wireless AP, a measurement request, the measurement request indicating a channel metric associated with transmissions by the second wireless STA to be measured and reported by the first wireless STA; and transmit, to the wireless AP, a measurement report associated with the measurement request, the measurement report indicating the channel metric.

Aspect 62: The first wireless STA of aspect 61, where the at least one processor is further operable to cause the first wireless STA to: transmit, to the wireless AP, an indication of a capability of the first wireless STA to measure and report the channel metric associated with the transmissions by the second wireless STA, where receiving the measurement request is in accordance with the capability of the first wireless STA.

Aspect 63: The first wireless STA of any of aspects 52 through 62, where the at least one processor is further operable to cause the first wireless STA to: receive, via the frame, an indication of a resource allocation for the first P2P session in accordance with a set of observed parameters associated with the first P2P session, the resource allocation including at least the duration of the TXOP of the wireless AP allocated to the first P2P session at first wireless STA.

Aspect 64: The first wireless STA of aspect 63, where the resource allocation further includes a bandwidth allocated to the first P2P session at first wireless STA.

Aspect 65: The first wireless STA of aspect 63, where the resource allocation is associated with an output of a reinforcement learning model in accordance with the set of observed parameters.

Aspect 66: The first wireless STA of any of aspects 52 through 65, where the at least one processor is further operable to cause the first wireless STA to: receive, via the frame, an indication of a first resource unit allocation associated with uplink communication from the first wireless STA to the AP and an indication of a second resource unit allocation associated with the first P2P session at the first wireless STA, where the first resource unit allocation is associated with a first set of sub-channels and the second resource unit allocation is associated with a second set of sub-channels.

Aspect 67: A wireless STA, including: at least one memory; and at least one processor communicatively coupled with the at least one memory, the at least one processor operable to cause the wireless STA to: receive, from a first wireless AP associated with a first BSS, information indicative of an offloading of the wireless STA from the first wireless AP to a second wireless AP in accordance with a resource availability at the second wireless AP, the second wireless AP being associated with a second BSS; and receive, from the second wireless AP, a resource allocation for a P2P session at the wireless STA in accordance with the offloading of the wireless STA from the first wireless AP to the second wireless AP.

Aspect 68: The wireless STA of aspect 67, where, to receive the information indicative of the offloading of the wireless STA from the first wireless AP to the second wireless AP, the at least one processor is further operable to cause the wireless STA to: receive, from the first wireless AP, an indication of an AID value that the second wireless AP is to use to address the wireless STA, where receiving the resource allocation from the second wireless AP is associated with receiving the indication of the AID value.

Aspect 69: The wireless STA of any of aspects 67 through 68, where, to receive the information indicative of the offloading of the wireless STA from the first wireless AP to the second wireless AP, the at least one processor is further operable to cause the wireless STA to: receive, from the first wireless AP, channel and BSSID information associated with the second wireless AP or TWT allocation information associated with the second wireless AP, or both, where receiving the resource allocation from the second wireless AP is associated with receiving the channel and BSSID information or the TWT allocation information.

Aspect 70: The wireless STA of any of aspects 67 through 69, where the at least one processor is further operable to cause the wireless STA to: transmit, to the first wireless AP, a request for communication resources associated with the P2P session at the wireless STA, where receiving the resource allocation from the second wireless AP is in accordance with the request for the communication resources associated with the P2P session.

Aspect 71: The wireless STA of aspect 70, where the at least one processor is further operable to cause the wireless STA to: transmit, to the first wireless AP, information associated with data traffic constraints of the wireless STA, where the request for the communication resources associated with the P2P session at the wireless STA is associated with the data traffic constraints of the wireless STA, and where the offloading of the wireless STA from the first wireless AP to the second wireless AP is associated with the data traffic constraints of the wireless STA.

Aspect 72: The wireless STA of aspect 71, where the information associated with the data traffic constraints of the wireless STA includes QoS information or a set of parameters or capabilities associated with MLO at the wireless STA, or both.

Aspect 73: A wireless AP, including: at least one memory; and at least one processor communicatively coupled with the at least one memory, the at least one processor operable to cause the wireless AP to: receive a first request, from a first wireless STA, for communication resources associated with a first P2P session and a second request, from a second wireless STA, for communication resources associated with a second P2P session; and transmit, in accordance with the first request and the second request, a first frame allocating a first duration of a TXOP of the wireless AP to the first wireless STA and a second frame allocating a second duration of the TXOP of the wireless AP to the second wireless STA, the first duration and the second duration at least partially overlapping.

Aspect 74: The wireless AP of aspect 73, where the at least one processor is further operable to cause the wireless AP to: transmit, via the first frame, an indication of a resource unit allocation associated with the TXOP of the wireless AP; receive, from the first wireless STA via a first portion of the resource unit allocation, a first CTS frame associated with the first frame; transmit, via the second frame, an indication of a second portion of the resource unit allocation associated with the TXOP of the wireless AP in accordance with receiving the first CTS frame via the first portion of the resource unit allocation; and receive, from the second wireless STA via the second portion of the resource unit allocation, a second CTS frame associated with the second frame.

Aspect 75: The wireless AP of aspect 74, where the at least one processor is further operable to cause the wireless AP to: receive, via the first CTS frame, an indication of a bandwidth that the first wireless STA uses for the first P2P session, where including the indication of the second portion of the resource unit allocation in the second frame is associated with receiving the indication of the bandwidth that the first wireless STA uses for the first P2P session.

Aspect 76: The wireless AP of any of aspects 73 through 75, where the at least one processor is further operable to cause the wireless AP to: transmit a CTS-to-self frame via an entirety of a bandwidth that the wireless AP is to share with the first wireless STA and the second wireless STA, where the first frame and the second frame are associated with transmitting the CTS-to-self frame via the entirety of the bandwidth.

Aspect 77: The wireless AP of any of aspects 73 through 76, where the at least one processor is further operable to cause the wireless AP to: receive, from the second wireless STA, an indication of a capability of the second wireless STA to communicate via non-primary channels, where the capability is associated with a device capability or an operational mode of the second wireless STA, and where the second frame indicates a non-primary channel in accordance with the capability of the second wireless STA.

Aspect 78: The wireless AP of aspect 77, where, to receive the indication of the capability of the second wireless STA, the at least one processor is further operable to cause the wireless AP to: receive an indication of a specific non-primary sub-channel via which the second wireless STA is available for the second P2P session in accordance with a set of channel conditions, where the non-primary channel indicated by the second frame includes the specific non-primary sub-channel indicated by the capability of the second wireless STA.

Aspect 79: The wireless AP of any of aspects 73 through 78, where the at least one processor is further operable to cause the wireless AP to: transmit, via the first frame, an indication of the second wireless STA as a standby STA for the TXOP of the wireless AP, where transmitting the second frame to the second wireless STA is associated with including the indication of the second wireless STA as the standby STA in the first frame.

Aspect 80: The wireless AP of aspect 79, where the indication of the second wireless STA as the standby STA for the TXOP of the wireless AP is included in the first frame to trigger a radio tuning, at the second wireless STA, from a primary channel to a non-primary channel.

Aspect 81: The wireless AP of any of aspects 73 through 80, where the at least one processor is further operable to cause the wireless AP to: transmit, to the first wireless STA, a third frame prior to the first frame; and receive, from the first wireless STA, a CTS frame associated with the third frame, where a bandwidth that the first wireless STA uses for the first P2P session is derived from the CTS frame, and where the first frame and the second frame are associated with the bandwidth that the first wireless STA uses for the first P2P session.

Aspect 82: The wireless AP of any of aspects 73 through 81, where the at least one processor is further operable to cause the wireless AP to: monitor a resource unit allocation during the TXOP of the wireless AP for P2P data frames associated with the first P2P session, where a bandwidth that the first wireless STA uses for the first P2P session is derived from the P2P data frames, and where the first frame and the second frame are associated with the bandwidth that the first wireless STA uses for the first P2P session.

Aspect 83: The wireless AP of any of aspects 73 through 82, where the at least one processor is further operable to cause the wireless AP to: transmit, to the first wireless STA, an indication of a first transmit power for the first P2P session at the first wireless STA during the TXOP of the wireless AP; and transmit, to the second wireless STA, an indication of a second transmit power for the second P2P session at the second wireless STA during the TXOP of the wireless AP, where an allocation of the first duration of the TXOP and the second duration of the TXOP to the first P2P session and the second P2P session is associated with indicating the first transmit power for the first P2P session and indicating the second transmit power for the second P2P session.

Aspect 84: The wireless AP of aspect 83, where the at least one processor is further operable to cause the wireless AP to: transmit a first measurement request and a second measurement request to the first wireless STA and the second wireless STA, respectively, the first measurement request indicating a first channel metric associated with transmissions by the second wireless STA to be measured and reported by the first wireless STA, and the second measurement request indicating a second channel metric associated with transmissions by the first wireless STA to be measured and reported by the second wireless STA; and receive a first measurement report and a second measurement report from the first wireless STA and the second wireless STA, respectively, the first measurement report indicating the first channel metric and the second measurement report indicating the second channel metric.

Aspect 85: The wireless AP of aspect 84, where the at least one processor is further operable to cause the wireless AP to: receive, from the first wireless STA, an indication of a capability of the first wireless STA to measure and report the first channel metric associated with the transmissions by the second wireless STA, where transmitting the first measurement request to the first wireless STA is in accordance with the capability of the first wireless STA; and receive, from the second wireless STA, an indication of a capability of the second wireless STA to measure and report the second channel metric associated with the transmissions by the first wireless STA, where transmitting the second measurement request to the second wireless STA is in accordance with the capability of the second wireless STA.

Aspect 86: The wireless AP of any of aspects 73 through 85, where the at least one processor is further operable to cause the wireless AP to: transmit, via the first frame, an indication of a first resource allocation for the first P2P session in accordance with a first set of observed parameters associated with the first P2P session, the first resource allocation including at least the first duration of the TXOP of the wireless AP; and transmit, via the second frame, an indication of a second resource allocation for the second P2P session in accordance with a second set of observed parameters associated with the second P2P session, the second resource allocation including at least the second duration of the TXOP of the wireless AP.

Aspect 87: The wireless AP of aspect 86, where the first resource allocation further includes a first bandwidth and the second resource allocation further includes a second bandwidth.

Aspect 88: The wireless AP of any of aspects 86 through 87, where the first resource allocation is associated with a first output of a reinforcement learning model in accordance with the first set of observed parameters and the second resource allocation is associated with a second output of the reinforcement learning model in accordance with the second set of observed parameters.

Aspect 89: A first wireless AP associated with a first BSS, including: at least one memory; and at least one processor communicatively coupled with the at least one memory, the at least one processor operable to cause the wireless AP to: transmit, to a second wireless AP associated with a second BSS, a resource availability inquiry; and transmit, to a wireless STA associated with the first BSS of the first wireless AP, information indicative of an offloading of the wireless STA from the first wireless AP to the second wireless AP in accordance with a resource availability at the second wireless AP.

Aspect 90: The first wireless AP of aspect 89, where, to transmit the information indicative of the offloading of the wireless STA from the first wireless AP to the second wireless AP, the at least one processor is further operable to cause the first wireless AP to: transmit, to the wireless STA, an indication of an AID value that the second wireless AP is to use to address the wireless STA.

Aspect 91: The first wireless AP of aspect 90, where the at least one processor is further operable to cause the first wireless AP to: receive, from the second wireless AP in accordance with the offloading of the wireless STA from the first wireless AP to the second wireless AP, the indication of the AID value that the second wireless AP is to use to address the wireless STA.

Aspect 92: The first wireless AP of any of aspects 89 through 91, where, to transmit the information indicative of the offloading of the wireless STA from the first wireless AP to the second wireless AP, the at least one processor is further operable to cause the first wireless AP to: transmit, to the wireless STA, channel and BSSID information associated with the second wireless AP or TWT allocation information associated with the second wireless AP, or both.

Aspect 93: The first wireless AP of any of aspects 89 through 92, where the at least one processor is further operable to cause the first wireless AP to: receive, from the wireless station STA, a request for communication resources associated with a P2P session at the wireless STA, where transmitting the resource availability inquiry is in accordance with the request for the communication resources associated with the P2P session.

Aspect 94: The first wireless AP of aspect 93, where the at least one processor is further operable to cause the first wireless AP to: transmit, to the second wireless AP as part of a resource sharing between the first wireless AP and the second wireless AP, information associated with data traffic constraints of the wireless STA, where the request for the communication resources associated with the P2P session at the wireless STA is associated with the data traffic constraints of the wireless STA.

Aspect 95: The first wireless AP of aspect 94, where the information associated with the data traffic constraints of the wireless STA includes QoS information or a set of parameters or capabilities associated with MLO at the wireless STA, or both.

Aspect 96: The first wireless AP of any of aspects 89 through 95, where the at least one processor is further operable to cause the first wireless AP to: receive, from the second wireless AP, an indication of the resource availability at the second wireless AP in accordance with transmitting the resource availability inquiry, where the indication of the resource availability indicates that the second wireless AP has a greater amount of communication resources available for P2P sessions than the first wireless AP.

Aspect 97: A second wireless AP, including: at least one memory; and at least one processor communicatively coupled with the at least one memory, the at least one processor operable to cause the second wireless AP to: transmit, to a first wireless AP from the second wireless AP, an indication of a resource availability at the second wireless AP; and transmit, to a wireless STA, a resource allocation for a P2P session at the wireless STA in accordance with an offloading of the wireless STA from the first wireless AP to the second wireless AP.

Aspect 98: The second wireless AP of aspect 97, where the at least one processor is further operable to cause the second wireless AP to: receive, from the first AP, a resource availability inquiry in accordance with a request for communication resources associated with the P2P session at the wireless STA, where transmitting the resource allocation to the wireless STA is in accordance with the request for the communication resources associated with the P2P session.

Aspect 99: The second wireless AP of aspect 98, where the at least one processor is further operable to cause the second wireless AP to: receive, from the first wireless AP as part of a resource sharing between the first wireless AP and the second wireless AP, information associated with data traffic constraints of the wireless STA, where the request for the communication resources associated with the P2P session at the wireless STA is associated with the data traffic constraints of the wireless STA.

Aspect 100: The second wireless AP of aspect 99, where the information associated with the data traffic constraints of the wireless STA includes Qos information or a set of parameters or capabilities associated with MLO at the wireless STA, or both.

Aspect 101: The second wireless AP of any of aspects 98 through 100, where the at least one processor is further operable to cause the second wireless AP to: transmit, to the first wireless AP, an indication of the resource availability at the second wireless AP in accordance with receiving the resource availability inquiry, where the indication of the resource availability indicates that the second wireless AP has a greater amount of communication resources available for P2P sessions than the first wireless AP.

Aspect 102: The second wireless AP of any of aspects 97 through 101, where the at least one processor is further operable to cause the second wireless AP to: transmit, to the first wireless AP in accordance with the offloading of the wireless STA from the first wireless AP to the second wireless AP, an indication of an AID value that the second wireless AP is to use to address the wireless STA.

Aspect 103: An apparatus for wireless communication performable at a first wireless STA, including at least one means for performing a method of any of aspects 1 through 15.

Aspect 104: A non-transitory computer-readable medium storing code for wireless communication performable at a first wireless STA, the code including instructions executable by a processor to perform a method of any of aspects 1 through 15.

Aspect 105: An apparatus for wireless communication performable at a wireless STA, including at least one means for performing a method of any of aspects 16 through 21.

Aspect 106: A non-transitory computer-readable medium storing code for wireless communication performable at a wireless STA, the code including instructions executable by a processor to perform a method of any of aspects 16 through 21.

Aspect 107: An apparatus for wireless communication performable at a wireless AP, including at least one means for performing a method of any of aspects 22 through 37.

Aspect 108: A non-transitory computer-readable medium storing code for wireless communication performable at a wireless AP, the code including instructions executable by a processor to perform a method of any of aspects 22 through 37.

Aspect 109: An apparatus for wireless communication performable at a first wireless AP associated with a first BSS, including at least one means for performing a method of any of aspects 38 through 45.

Aspect 110: A non-transitory computer-readable medium storing code for wireless communication performable at a first wireless AP associated with a first BSS, the code including instructions executable by a processor to perform a method of any of aspects 38 through 45.

Aspect 111: An apparatus for wireless communication, including at least one means for performing a method of any of aspects 46 through 51.

Aspect 112: A non-transitory computer-readable medium storing code for wireless communication, the code including instructions executable by a processor to perform a method of any of aspects 46 through 51.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A first wireless station (STA), comprising:
at least one memory; and
at least one processor communicatively coupled with the at least one memory, the at least one processor operable to cause the first wireless STA to:
transmit, to a wireless access point (AP), a request for communication resources associated with a peer-to-peer (P2P) session between the first wireless STA and at least one peer device;
receive, in accordance with the request, a first frame allocating a duration of a transmission opportunity (TXOP) of the wireless AP to the first wireless STA;
transmit a second frame to the at least one peer device within the duration in accordance with sharing the TXOP of the wireless AP with the at least one peer device; and
receive, in accordance with the second frame, data associated with the P2P session from the at least one peer device of the first wireless STA within the duration of the TXOP.

2. The first wireless STA of claim 1, wherein the at least one processor is further operable to cause the first wireless STA to:
receive, via the first frame, an indication of a resource unit allocation associated with the TXOP of the wireless AP; and transmit, to the wireless AP via a portion of the resource unit allocation, a clear-to-send (CTS) frame associated with the first frame, wherein sharing the TXOP of the wireless AP is associated with transmitting the CTS frame via the portion of the resource unit allocation.

3. The first wireless STA of claim 2, wherein the at least one processor is further operable to cause the first wireless STA to:

transmit, via the CTS frame, an indication of a bandwidth that the first wireless STA uses for the P2P session, wherein sharing the TXOP of the wireless AP is associated with transmitting the indication of the bandwidth that the first wireless STA uses for the P2P session.

4. The first wireless STA of claim 1, wherein the at least one processor is further operable to cause the first wireless STA to:

receive, via the first frame, an indication of a resource unit allocation associated with the TXOP of the wireless AP, wherein the resource unit allocation indicates a non-primary channel of the wireless AP; and transmit, to the wireless AP via the non-primary channel, a clear-to-send (CTS) frame associated with the first frame, wherein sharing the TXOP of the wireless AP is associated with the resource unit allocation indicating the non-primary channel.

5. The first wireless STA of claim 1, wherein the at least one processor is further operable to cause the first wireless STA to:

transmit, to the wireless AP, an indication of a capability of the first wireless STA to communicate via non-primary channels, wherein the capability is associated with a device capability or an operational mode of the first wireless STA, and wherein the first frame indicates a non-primary channel in accordance with the capability of the first wireless STA.

6. The first wireless STA of claim 5, wherein, to transmit the indication of the capability of the first wireless STA, the at least one processor is further operable to cause the first wireless STA to:

transmit an indication of a specific non-primary sub-channel via which the first wireless STA is available for the P2P session in accordance with a set of channel conditions, wherein the non-primary channel indicated by the first frame includes the specific non-primary sub-channel indicated by the capability of the first wireless STA.

7. The first wireless STA of claim 1, wherein the at least one processor is further operable to cause the first wireless STA to:

receive, from the wireless AP, a third frame including an indication of the first wireless STA as a standby STA for the TXOP of the wireless AP, wherein the third frame is received prior to the first frame; and tune a radio of the first wireless STA from a primary channel to a non-primary channel in accordance with the indication of the first wireless STA as the standby STA for the TXOP, wherein the first frame is received via the non-primary channel, and wherein sharing the TXOP of the wireless AP is associated with tuning the radio of the first wireless STA to the non-primary channel.

8. The first wireless STA of claim 1, wherein the at least one processor is further operable to cause the first wireless STA to:

receive, from the wireless AP, a third frame prior to the first frame; and transmit, to the wireless AP, a clear-to-send (CTS) frame associated with the third frame, wherein a bandwidth that the first wireless STA uses for the P2P session is derived from the CTS frame, and wherein the first frame is associated with the bandwidth that the first wireless STA uses for the P2P session.

9. The first wireless STA of claim 1, wherein the at least one processor is further operable to cause the first wireless STA to:

receive, from the wireless AP, an indication of a transmit power for the P2P session at the first wireless STA during the TXOP of the wireless AP, wherein sharing the TXOP of the wireless AP is associated with use of the transmit power for the P2P session.

10. The first wireless STA of claim 9, wherein the at least one processor is further operable to cause the first wireless STA to:

receive, from the wireless AP, a measurement request, the measurement request indicating a channel metric associated with transmissions by a second wireless STA to be measured and reported by the first wireless STA; and transmit, to the wireless AP, a measurement report associated with the measurement request, the measurement report indicating the channel metric.

11. The first wireless STA of claim 10, wherein the at least one processor is further operable to cause the first wireless STA to:

transmit, to the wireless AP, an indication of a capability of the first wireless STA to measure and report the channel metric associated with the transmissions by the second wireless STA, wherein receiving the measurement request is in accordance with the capability of the first wireless STA.

12. The first wireless STA of claim 1, wherein the at least one processor is further operable to cause the first wireless STA to:

receive, via the first frame, an indication of a resource allocation for the P2P session in accordance with a set of observed parameters associated with the P2P session, the resource allocation including at least the duration of the TXOP of the wireless AP allocated to the P2P session at first wireless STA.

13. The first wireless STA of claim 1, wherein the at least one processor is further operable to cause the first wireless STA to:

receive, via the first frame, an indication of a first resource unit allocation associated with uplink communication from the first wireless STA to the AP and an indication of a second resource unit allocation associated with the P2P session at the first wireless STA, wherein the first resource unit allocation is associated with a first set of sub-channels and the second resource unit allocation is associated with a second set of sub-channels.

14. A wireless station (STA), comprising:

at least one memory; and at least one processor communicatively coupled with the at least one memory, the at least one processor operable to cause the wireless STA to:

receive, from a first wireless access point (AP) associated with a first basic service set (BSS), information indicative of an offloading of the wireless STA from the first wireless AP to a second wireless AP in accordance with a resource availability at the second wireless AP, the second wireless AP being associated with a second BSS; and receive, from the second wireless AP, a resource allocation for a peer-to-peer (P2P) session at the wireless STA in accordance with the offloading of the wireless STA from the first wireless AP to the second wireless AP.

15. The wireless STA of claim 14, wherein, to receive the information indicative of the offloading of the wireless STA from the first wireless AP to the second wireless AP, the at least one processor is further operable to cause the wireless STA to:

receive, from the first wireless AP, an indication of an association identifier (AID) value that the second wireless AP is to use to address the wireless STA, wherein receiving the resource allocation from the second wireless AP is associated with receiving the indication of the AID value.

16. The wireless STA of claim 14, wherein, to receive the information indicative of the offloading of the wireless STA from the first wireless AP to the second wireless AP, the at least one processor is further operable to cause the wireless STA to:

receive, from the first wireless AP, channel and BSS identifier (BSSID) information associated with the second wireless AP or target wake time (TWT) allocation information associated with the second wireless AP, or both, wherein receiving the resource allocation from the second wireless AP is associated with receiving the channel and BSSID information or the TWT allocation information.

17. The wireless STA of claim 14, wherein the at least one processor is further operable to cause the wireless STA to:

transmit, to the first wireless AP, a request for communication resources associated with the P2P session at the wireless STA, wherein receiving the resource allocation from the second wireless AP is in accordance with the request for the communication resources associated with the P2P session.

18. The wireless STA of claim 17, wherein the at least one processor is further operable to cause the wireless STA to:

transmit, to the first wireless AP, information associated with data traffic constraints of the wireless STA, wherein the request for the communication resources associated with the P2P session at the wireless STA is associated with the data traffic constraints of the wireless STA, and wherein the offloading of the wireless STA from the first wireless AP to the second wireless AP is associated with the data traffic constraints of the wireless STA.

19. A wireless access point (AP), comprising:

at least one memory; and at least one processor communicatively coupled with the at least one memory, the at least one processor operable to cause the wireless AP to:

receive a first request, from a first wireless station (STA), for communication resources associated with a first peer-to-peer (P2P) session between the first wireless STA and a first peer device and a second request, from a second wireless STA, for communication resources associated with a second P2P session between the second wireless STA and a second peer device; and transmit, in accordance with the first request and the second request, a first frame allocating a first duration of a transmission opportunity (TXOP) of the wireless AP to the first wireless STA and a second frame allocating a second duration of the TXOP of the wireless AP to the second wireless STA, the first duration and the second duration at least partially overlapping.

20. The wireless AP of claim 19, wherein the at least one processor is further operable to cause the wireless AP to:

transmit, via the first frame, an indication of a resource unit allocation associated with the TXOP of the wireless AP;

receive, from the first wireless STA via a first portion of the resource unit allocation, a first clear-to-send (CTS) frame associated with the first frame;

transmit, via the second frame, an indication of a second portion of the resource unit allocation associated with the TXOP of the wireless AP in accordance with receiving the first CTS frame via the first portion of the resource unit allocation; and receive, from the second wireless STA via the second portion of the resource unit allocation, a second CTS frame associated with the second frame.

21. The wireless AP of claim 19, wherein the at least one processor is further operable to cause the wireless AP to:

transmit a CTS-to-self frame via an entirety of a bandwidth that the wireless AP is to share with the first wireless STA and the second wireless STA, wherein the first frame and the second frame are associated with transmitting the CTS-to-self frame via the entirety of the bandwidth.

22. The wireless AP of claim 19, wherein the at least one processor is further operable to cause the wireless AP to:

receive, from the second wireless STA, an indication of a capability of the second wireless STA to communicate via non-primary channels, wherein the capability is associated with a device capability or an operational mode of the second wireless STA, and wherein the second frame indicates a non-primary channel in accordance with the capability of the second wireless STA.

23. The wireless AP of claim 19, wherein the at least one processor is further operable to cause the wireless AP to:

transmit, to the first wireless STA, a third frame prior to the first frame; and receive, from the first wireless STA, a clear-to-send (CTS) frame associated with the third frame, wherein a bandwidth that the first wireless STA uses for the first P2P session is derived from the CTS frame, and wherein the first frame and the second frame are associated with the bandwidth that the first wireless STA uses for the first P2P session.

24. The wireless AP of claim 19, wherein the at least one processor is further operable to cause the wireless AP to:

monitor a resource unit allocation during the TXOP of the wireless AP for P2P data frames associated with the first P2P session, wherein a bandwidth that the first wireless STA uses for the first P2P session is derived from the P2P data frames, and wherein the first frame and the second frame are associated with the bandwidth that the first wireless STA uses for the first P2P session.

25. The wireless AP of claim 19, wherein the at least one processor is further operable to cause the wireless AP to:

transmit, to the first wireless STA, an indication of a first transmit power for the first P2P session at the first wireless STA during the TXOP of the wireless AP; and transmit, to the second wireless STA, an indication of a second transmit power for the second P2P session at the second wireless STA during the TXOP of the wireless AP, wherein an allocation of the first duration of the TXOP and the second duration of the TXOP to the first P2P session and the second P2P session is associated with indicating the first transmit power for the first P2P session and indicating the second transmit power for the second P2P session.

26. The wireless AP of claim 25, wherein the at least one processor is further operable to cause the wireless AP to:

transmit a first measurement request and a second measurement request to the first wireless STA and the second wireless STA, respectively, the first measurement request indicating a first channel metric associated with transmissions by the second wireless STA to be measured and reported by the first wireless STA, and the second measurement request indicating a second channel metric associated with transmissions by the first wireless STA to be measured and reported by the second wireless STA; and receive a first measurement report and a second measurement report from the first wireless STA and the second wireless STA, respectively, the first measurement report indicating the first channel metric and the second measurement report indicating the second channel metric.

27. The wireless AP of claim 19, wherein the at least one processor is further operable to cause the wireless AP to:

transmit, via the first frame, an indication of a first resource allocation for the first P2P session in accordance with a first set of observed parameters associated with the first P2P session, the first resource allocation including at least the first duration of the TXOP of the wireless AP; and transmit, via the second frame, an indication of a second resource allocation for the second P2P session in accordance with a second set of observed parameters associated with the second P2P session, the second resource allocation including at least the second duration of the TXOP of the wireless AP.

28. A first wireless access point (AP) associated with a first basic service set (BSS), comprising:

at least one memory; and at least one processor communicatively coupled with the at least one memory, the at least one processor operable to cause the wireless AP to:

transmit, to a second wireless AP associated with a second BSS, a resource availability inquiry; and transmit, to a wireless station (STA) associated with the first BSS of the first wireless AP, information indicative of an offloading of the wireless STA from the first wireless AP to the second wireless AP in accordance with a resource availability at the second wireless AP.

29. The first wireless AP of claim 28, wherein the at least one processor is further operable to cause the first wireless AP to:

receive, from the wireless station STA, a request for communication resources associated with a peer-to-peer (P2P) session at the wireless STA, wherein transmitting the resource availability inquiry is in accordance with the request for the communication resources associated with the P2P session; and transmit, to the second wireless AP as part of a resource sharing between the first wireless AP and the second wireless AP, information associated with data traffic constraints of the wireless STA, wherein the request for the communication resources associated with the P2P session at the wireless STA is associated with the data traffic constraints of the wireless STA.

30. The first wireless AP of claim 28, wherein the at least one processor is further operable to cause the first wireless AP to:

receive, from the second wireless AP, an indication of the resource availability at the second wireless AP in accordance with transmitting the resource availability inquiry, wherein the indication of the resource availability indicates that the second wireless AP has a greater amount of communication resources available for peer-to-peer (P2P) sessions than the first wireless AP.

* * * * *